United States Patent [19]
Frey et al.

[11] Patent Number: 5,416,921
[45] Date of Patent: May 16, 1995

[54] APPARATUS AND ACCOMPANYING METHOD FOR USE IN A SYSPLEX ENVIRONMENT FOR PERFORMING ESCALATED ISOLATION OF A SYSPLEX COMPONENT IN THE EVENT OF A FAILURE

[75] Inventors: Jeffrey A. Frey, New Paltz, N.Y.; Lisa M. Goetze, Austin, Tex.; Allan S. Meritt, Poughkeepsie, N.Y.; Jeffrey M. Nick, Fishkill, N.Y.; William C. Shepard, Hyde Park, N.Y.; David H. Surman, Milton, N.Y.; Michael D. Swanson, Poughkeepsie, N.Y.

[73] Assignee: International Business Machines Corporation, Armonk, N.Y.

[21] Appl. No.: 147,351

[22] Filed: Nov. 3, 1993

[51] Int. Cl.$^6$ .............................................. G06F 11/20
[52] U.S. Cl. .................................. 395/575; 364/269.2; 364/281.9; 364/285.3; 364/DIG. 1; 371/11.3
[58] Field of Search ................ 395/575; 371/11.3; 364/269.2, 281.9, 285.3

[56] References Cited
U.S. PATENT DOCUMENTS
5,253,184 10/1993 Kleinschnitz ...................... 364/550
5,317,739 5/1994 Elko et al. .......................... 395/650

OTHER PUBLICATIONS
SA22-7203-00, Enterprise Systems Architecture/390 ESCON Channel-to-Channel Adapter.
GA23-0354-1, Using Enterprise Systems Connection Directors.
GC30-3073, Systems Network Architecture Technical Overview.

*Primary Examiner*—Charles E. Atkinson
*Attorney, Agent, or Firm*—JoAnn K. Crockatt; Peter L. Michaelson

[57] ABSTRACT

Apparatus and accompanying methods for use in preferably a multi-system shared data (sysplex (5)) environment which quickly and efficiently isolates (fences), through a pre-defined hierarchical order, failed sysplex components from accessing shared data in order to protect data integrity. Specifically, by dividing a sysplex workload into specified fence groups (FG A, FG B) and providing appropriate software and hardware fence support, fencing can occur at various distinct levels: a member-to-member level, i.e. to allow any member (220, 225, 230, 233,237) of a fence group to fully isolate any other ("target") member of that same group; a fence group level, i.e. to isolate all members of a fence group that execute on a "target" system ($200_1$, $200_2$, $200_3$); and a system level, i.e. to fully isolate an entire "target" system. Through pre-defined escalation rules (630), fencing can be escalated from a lower member level to a higher, group or system, level in the event a lower level fence can not be successfully imposed. Member level fencing is accomplished in software (1300, 1500); group and system level fencing is accomplished through dedicated hardware fencing facilities (44). An identifier (444, 464) uniquely designates each different fence group existing on a computer processing complex (CPC) ($40_1$, $40_2$, $40_3$, $40_M$) in the sysplex over the life of that CPC. Advantageously, this technique eliminates erroneous back level fencing, significantly expedites fence processing and also greatly reduces a need for human intervention.

28 Claims, 23 Drawing Sheets

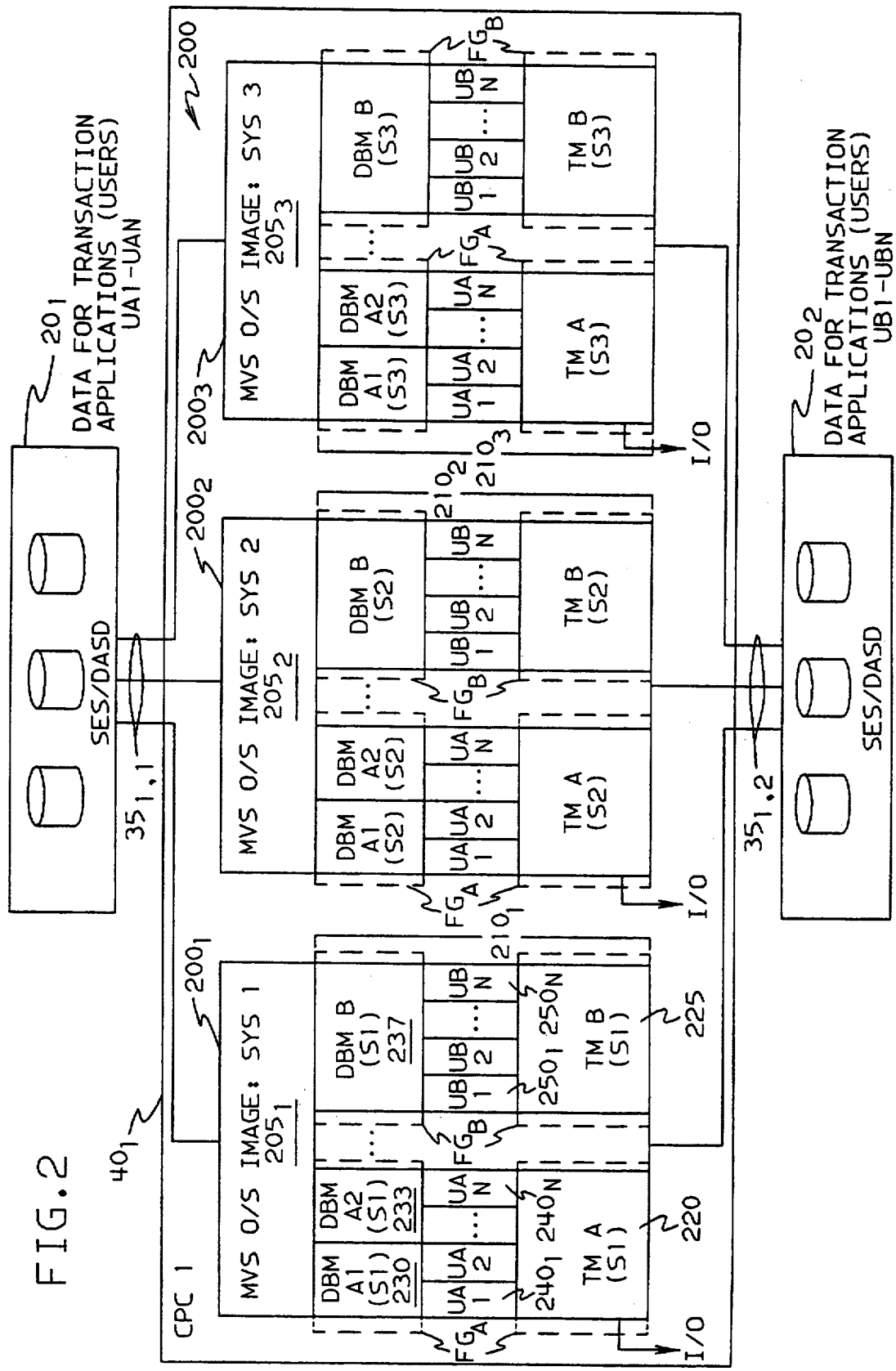

FIG. 6A

| FIG.6A |
|--------|
| FIG.6B |

FIG.6

FUNCTION DATASET: ACTIVE POLICY

600

| FENCE GROUP | MEMBER | SYSTEM | FENCE MEMBER TOKEN | AUTHOR-IZATION INDEX | STATE | SUB-SYSTEM AUTHORITY PARAMETER | |
|---|---|---|---|---|---|---|---|
| A (FG A) | DBM A1(S1) | SYS 1 | 00010001 00000007 | 03 | A | FFA7B42C | 130125 |
| A (FG A) | DBM A2(S1) | SYS 1 | 00010003 0000001A | 03 | A | FFA7B42C | 130125 |
| A (FG A) | TM A (S1) | SYS 1 | 00010002 00000002 | 03 | A | FFA7B42C | 130125 |
| A (FG A) | DBM A1(S2) | SYS 2 | 00010005 00000121 | 01 | A | FFA7BA03 | C1468A |
| A (FG A) | DBM A2(S2) | SYS 2 | 00010004 00000071 | 01 | A | FFA7BA03 | C1468A |
| A (FG A) | TM A (S2) | SYS 2 | 00010008 00000005 | 01 | A | FFA7BA03 | C1468A |
| A (FG A) | DBM A1(S3) | SYS 3 | 0001000A 00000001 | 05 | A | FFA7C132 | D41969 |
| A (FG A) | DBM A2(S3) | SYS 3 | 0001000B 00000006 | 05 | A | FFA7C132 | D41969 |
| A (FG A) | TM A (S3) | SYS 3 | 00010009 0000000A | 05 | A | FFA7C132 | D41969 |

610

| | | | | | | |
|---|---|---|---|---|---|---|
| B (FG B) | DBM B (S1) | SYS 1 | 00020001 00000003 | 01 | A | FFA7B512 69047C |
| B (FG B) | TM B (S1) | SYS 1 | 00020003 000000A7 | 01 | A | FFA7B512 69047C |
| B (FG B) | DBM B (S2) | SYS 2 | 00020007 0000005C | 02 | A | FFA7BF13 240519 |
| B (FG B) | TM B (S2) | SYS 2 | 00020002 00000007 | 02 | A | FFA7BF13 240519 |
| B (FG B) | DBM B (S3) | SYS 3 | 0002000A 00000015 | 02 | A | FFA7C002 F31794 |
| B (FG B) | TM B (S3) | SYS 3 | 00020008 00000001 | 02 | A | FFA7C002 F31794 |

— 620

FENCING ESCALATION POLICY DATA

| FENCE GROUP | MEMBER | ESCALATION FROM FENCE MEMBER TO FENCE GROUP | ESCALATION FROM FENCE GROUP TO SYSTEM |
|---|---|---|---|
| A (FG A) | DBM A1 (S1) | YES | NO |
| A (FG A) | DBM A2 (S1) | SKIP | YES |
| A (FG A) | TM A (S1) | YES | YES |
| B (FG B) | DBM B (S1) | NO | NO |

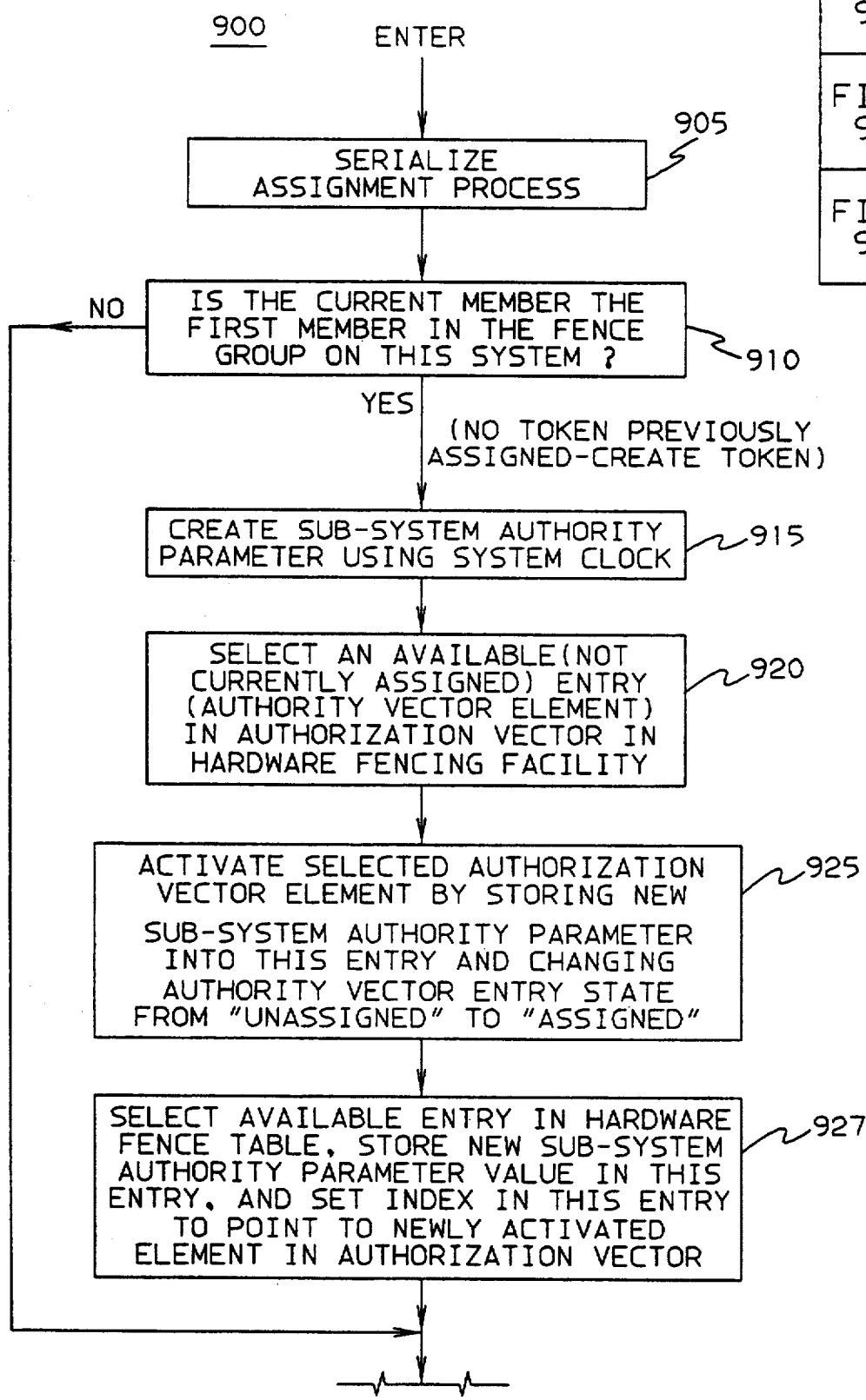

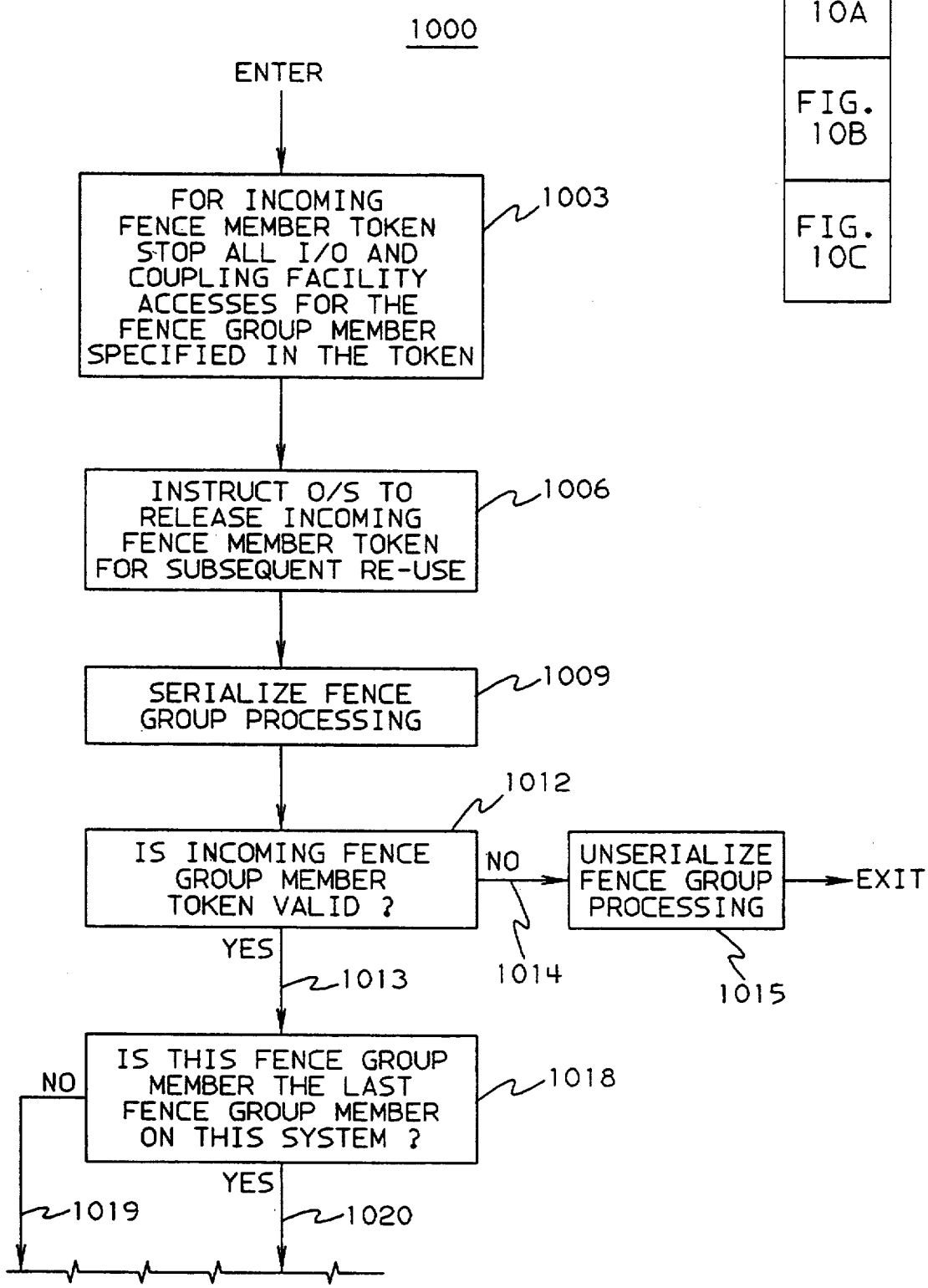

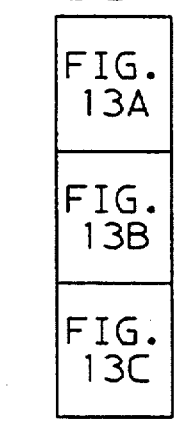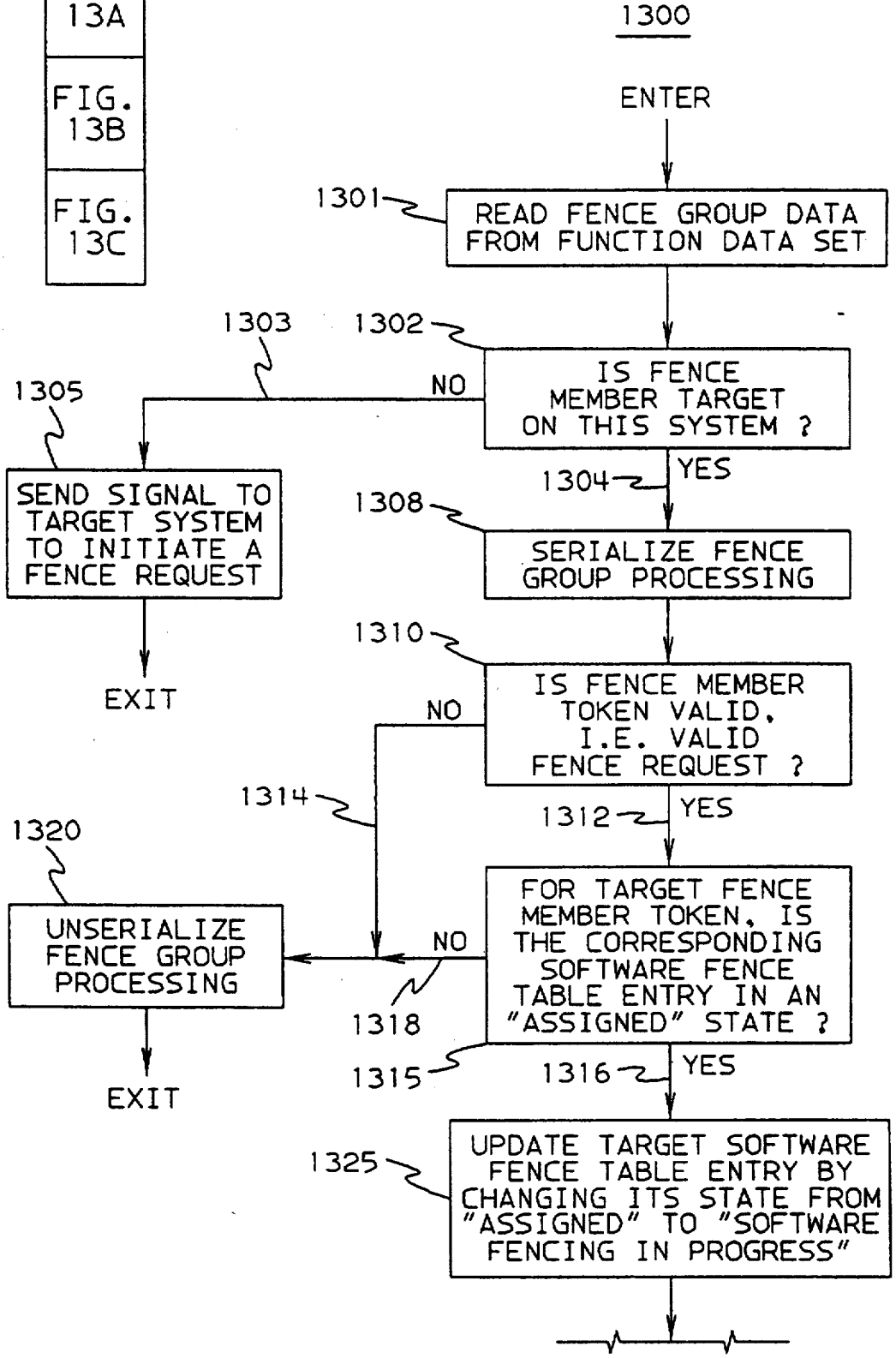

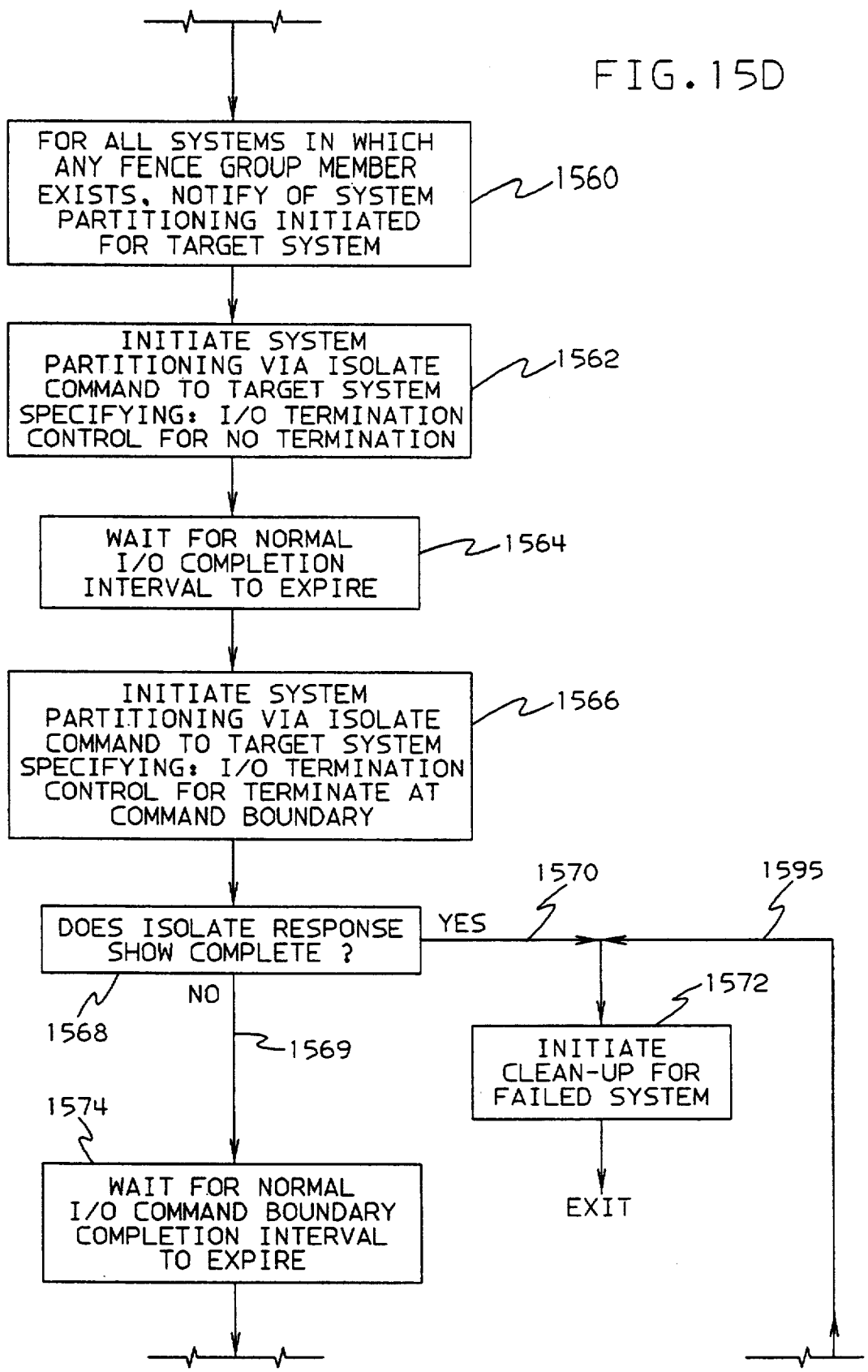

APPARATUS AND ACCOMPANYING METHOD FOR USE IN A SYSPLEX ENVIRONMENT FOR PERFORMING ESCALATED ISOLATION OF A SYSPLEX COMPONENT IN THE EVENT OF A FAILURE

BACKGROUND OF THE DISCLOSURE

The invention relates to apparatus and accompanying methods for use preferably in a multi-system shared data (sysplex) environment for quickly and efficiently isolating (fencing), through a pre-defined hierarchical order, failed sysplex components from accessing shared data.

Prior to the early-1980s, large scale computing installations often relied on using a single monolithic computer system to handle an entire processing workload. If the system failed, all processing applications in the workload were suspended until the failure was remedied. While a resulting processing delay was tolerated at first, as increasingly critical applications were processed through the system, any such ensuing delays became increasingly intolerable. Furthermore, as processing needs increased, the entire system was eventually replaced with a new one of sufficient capacity. Replacing systems in that manner proved to be extremely expensive and very inefficient. However, at that time, few workable alternatives existed, to using monolithic systems, that appreciably eliminated both these outages and an eventual need to replace the entire system.

To efficiently address this need, over the past several years and continuing to the present, computer manufacturers are providing processing architectures based on a multi-system shared data approach. Through these architectures, multiple large scale computer systems, each of which is often referred to as a computer processing complex (CPC) or a central electronic complex (CEC), are inter-connected, through, for example, a coupling facility or other inter-processor communication mechanism, to permit each such system to gain read-write access to data residing on one or more shared input/output devices, such as a direct access storage device (DASD). The resulting inter-connected computer system is commonly referred to as a "sysplex". In a sysplex, a processing workload is distributed, e.g. in a balanced fashion, among all of the inter-connected computer systems such that each computer system is responsible for processing a portion, e.g., an approximately equal portion, of the entire workload. Each of these systems executes its own portion independently of the other such systems. Generally, separate copies (instances) of an application are resident and active on more than one of the computer systems and, based upon, e.g., the processing capacity required of the application, often on all such systems. By virtue of having shared data access, if one computer system in the sysplex fails, its particular workload can be quickly and readily taken over by another such system without interrupting application processing—as would otherwise occur in a single monolithic system. Hence, the computer system in the sysplex is sized to provide sufficient additional processing capacity, for use during a failure condition, to accommodate the processing load ordinarily handled by at least one other such system. Moreover, the processing capacity of the sysplex can be readily expanded by simply adding and appropriately inter-connecting additional computer systems into the existing sysplex and/or by increasing the processing capacity, either through replacement or upgrading, of one or more of the computer systems existent in the sysplex. As a result of its inherent fault tolerance and efficient expansion potential, sysplex architectures provide an extremely high level of overall reliability while also accommodating incremental growth in a highly cost-effective manner. Given this reliability, sysplexes are particularly attractive in handling so-called critical business support applications that involve real-time transaction processing, such as, e.g., in processing banking or stock market transactions, reservation requests or courier manifest information, which can tolerate essentially no downtime.

Furthermore, certain currently available computer systems that can be readily incorporated into a sysplex, such as illustratively the Enterprise Systems 9000 Series manufactured by the International Business Machines (IBM) Corporation, can each support, if appropriately configured, multiple simultaneously active instances of operating systems (O/S). Each such instance implements a separate corresponding individual application environment. Each of these environments utilizes a separate copy of the operating system, such as the MVS O/S (MVS and IBM are registered trademarks of the International Business Machines Corporation), so as to form a so-called O/S "image" along with a copy of corresponding application program(s) and a dedicated storage area (typically a logical partition—"LPAR"). Each of these computer systems employs at least one, though depending upon its architecture, possibly more, hardware processors as a server(s) to execute the various O/S images residing on that system. Regardless of the hardware constituency of each computer system, since each O/S image presents a unique application processing environment, that environment will be hereinafter referred to as a "system". For any application executing on multiple systems, a user is typically totally unaware of the particular system on which he or she is executing that application. Ideally, through suitable O/S software, a software failure in one system that halts application processing therein, should be isolated to that system and not affect the same application(s) being processed in any other system. Application processing would then be confined to the remaining systems, all of which are collectively sized to additionally accommodate the application processing and the users heretofore handled by the failed system. Thus, by using multiple O/S images in each CPC, a sysplex should be able to provide a further degree of fault tolerance and enhanced overall reliability, particularly to software failures than through a CPC that executes a single O/S image. Using separate O/S images and corresponding copies of application programs does require additional storage and processing overhead. However, the penalty exacted for doing so is usually quite small particularly in view of the enhanced reliability resulting therefrom and the constantly declining cost of technology.

In practice, special needs arise if a sysplex is to process critical business support applications that can tolerate minimal, and often essentially no downtime. First and foremost, any system failure must not cause all the other systems to interrupt their application processing while the failure is resolved. Any such interruption would simply halt the entire application, thereby producing an intolerable result. Furthermore, to protect integrity of the shared data, once any system fails, that system needs to be completely isolated (totally inhibited) from accessing the data. This isolation must continue until both the failure is completely resolved and the failed system is once again found to be fully and properly functional. If that system were not fully isolated and could, e.g., steal a lock resource and gain access to the data in some fashion, then that system, owing to its failure, could contaminate the shared data, for one or more applications, that would subsequently be accessed by any other such system. This, in turn, could well corrupt all further processing of these applications across the entire sysplex. In addition, a human operator should not be required to isolate the failed system and, if possible, resolve the failure itself. Currently, for reasons of economy and throughput speed, many computer installations run unattended. Requiring an operator to intervene, whether locally or remotely, would simply delay the onset of application processing thereby lowering overall throughput. Furthermore, because human operators do make mistakes, they can unwittingly corrupt the shared data. In addition, operators may possess a low level of expertise which may result in corruption of the shared data. Correctly resolving system failures in a sysplex environment, particularly without adversely affecting the shared data, and in one that is performing critical business support application processing, and also deciding issues regarding data and system availability are complex and daunting tasks. Hence, these tasks should not be assigned to an operator.

In some sysplex installations, a separate service processor has been used to automatically isolate and reset a failed system. In operation, the service processor intercepts appropriate sysplex administrative screens and, through a suitable automation routine, generates commands to the sysplex, e.g. reset commands to the failed system. Disadvantageously, this approach requires the service processor, as well as its communications facilities to the sysplex, to have an extremely high availability—an availability that can not always be guaranteed. In that regard, if the service processor or its communication lines were inactive for any reason, then this approach would be unable to isolate the failed system and protect the shared data.

Given these needs, one would think—at least ideally, that to minimize any adverse impact attributable to the loss of a system, the granularity of the servers and associated systems executing thereon should be made as small as possible. In this way, a workgroup, i.e. a portion of an entire workload, would be allocated to each and every system in the sysplex. Consequently, if a server or corresponding system were to fail, then only a minimal, and generally tolerable, loss of application throughput would be apparent to a customer.

To effectively employ such granularity, a technique has been developed by the present assignee that readily permits the failed system to be automatically and completely isolated from the shared data. This technique, commonly referred to as "fencing" can be invoked to isolate any failed system—regardless of whether the failure is in the O/S image or any application executing thereon. This technique is fully described in co-pending United States patent applications both by D. A. Elko et al entitled "Interdicting I/O and Messaging Operations in a Multi-System Complex" filed Mar. 30, 1992, and assigned Ser. No. 07/860,489 and entitled "Message Path Mechanism for Managing Connections Between Processors and a Coupling Facility", also filed Mar. 30, 1992 and assigned Ser. No. 07/860,646—collectively referred to herein as the Elko et al Fencing applications; both of which are also incorporated by reference herein. Through this technique, a hardware fencing facility is incorporated within each CPC in the sysplex. A common storage device, such as a DASD, that stores shared data and provides access thereto for each CPC, maintains a table, i.e. a so-called "couple dataset" of the current status of each CPC including the systems thereon. Periodically, each CPC interrogates the table to determine whether the status of each of the CPCs has been periodically updated and therethrough ascertain whether a corresponding system is operational or has failed. If an interrogating CPC detects a system failure, such as by detecting that a status update that should have periodically occurred, in fact, did not occur (a so-called "System Status Update Missing" condition), that CPC can generate a fence request to the fencing facility associated with the CPC that contains the non-operational system. Essentially and in response to this request, the fencing facility blocks all subsequent input-/output (I/O) requests specified by the fence request and that affect the shared data, the data itself residing on either the DASD and/or a coupling facility.

In practice, customers, to best meet their own individual business needs, determine what workgroups are allocated to each system. As a result of various considerations involving system management overhead, storage overhead and the complexity of using multiple O/S images, customers exhibit a marked tendency to aggregate widely differing workgroups on a single O/S image, i.e. on a single system. Furthermore, a sysplex may be serving a wide user community for any given application. As such, the workgroups themselves that are executed on that one system, owing to their particular application mix and the specific work then executing against them, may possess widely differing response time requirements—let alone workgroup differences that occur from one system to another. In this regard, some applications, that are not particularly time sensitive, can execute on an interactive or batch basis (depending upon whether human interaction is needed or not), while critical business support applications (which, as noted, are highly time sensitive) execute on a real-time basis. Therefore, if, as is often the case, a single O/S image were to execute separate workgroups with widely differing time requirements, isolation would also need to extend to a lower level, i.e. the individual workgroups (or application(s)) themselves, than just to a system level. In this instance, if an application itself failed, then, e.g., a workgroup containing this application should be isolated ("fenced") without a necessity to isolate the entire system itself that is executing that application. As a result, the system would advantageously continue to process its remaining non-isolated workgroups, thereby providing enhanced sysplex throughput in the presence of an application or temporary system failure. To ensure needed data integrity, the time sensitive nature of critical business support applications mandates that a workgroup of these applications (or even a particular application itself) be immediately isolated in the event of its failure. However, workgroups of less time sensitive applications, could tolerate a delay (even one that is relatively long, either on the order of minutes or even hours) in accessing shared data, such as that required for the failure to be resolved, before being isolated from their shared data. Unfortunately, thusfar the art totally fails to teach how individual workgroup isolation can be accomplished.

In addition, apart from a failure occurring at an application level which requires sub-system (i.e. workload or application) fencing, hardware and other failures could occur in a sysplex that adversely affect a server or even an entire CPC. Inasmuch as such a failure, depending upon its nature, could also result in a corruption of the shared data, then the server or entire CPC, should, when necessary, be isolated from accessing the data.

Presently, the MVS O/S supports an I/O Prevention function which provides sub-system fencing, i.e. this function, when invoked, prevents a failed sub-system from invoking I/O operations. In particular, through this function, a sub-system can associate a so-called I/O Prevention identifier (IOPID) with an I/O operation. The IOPID contains a 7-bit index, into an I/O Prevention table (IOPT), and a 24-bit sequence number. The MVS O/S maintains the IOPT. Should a sub-system fail and to ensure data integrity, a functioning sub-system can request that the failed sub-system be prevented from undertaking any subsequent I/O operations. To make such a request, a functioning sub-system passes the IOPID of the failed sub-system to the MVS operating system which, in turn, determines whether the sequence number in the IOPID matches an entry in a corresponding indexed entry in the IOPT. If such a match occurs, the MVS O/S marks that IOPT entry as "not in use". Thereafter, whenever an I/O request containing that IOPID is passed to an I/O Supervisor in the MVS O/S, the Supervisor will fail that request if the corresponding IOPT entry is marked as "not in use" (i.e. the IOPID would be invalidated) or if the sequence numbers are unequal between that in the request and in the indexed IOPT entry. To completely process the request, the I/O Supervisor will also complete all active I/O operations with the failed IOPID, thereby purging the I/O devices of all such remaining requests. Consequently, once a valid I/O Prevention request against a failed sub-system has been fully processed, as set forth, then no I/O operations that specify the IOPID of the failed sub-system will be started. Employing a sequence number within the IOPID ensures that: (a) erroneous I/O Prevention requests are not honored, and (b) once a failed sub-system has had its I/O operations prevented, no further I/O operations with that IOPID will be started even if the same IOPT index value is reused.

Unfortunately, the I/O Prevention function, as presently implemented, presents two serious limitations. First, this function does not support hardware fencing. In that regard, the I/O Prevention function is software based. If the MVS O/S temporarily halts, the I/O Prevention function will simply not function at all. Second, this function is susceptible to erroneous so-called "back level" information. Specifically, a current trend in MVS computing is to run a CPC for a long period of time, e.g. on the order of weeks, without restarting the CPC and undertaking an initial program load (IPL). Given a relatively large number of different workloads and sub-systems on a CPC, the CPC may support a large number of different fenceable sub-systems that run under a single MVS O/S image. Disadvantageously, the IOPID field is only four bytes (32 bits) long. As a result, this field has proven to be just too small to contain both an sufficiently large index value and a sequence number to support a large number of different fenceable sub-systems. In that regard, the sequence number, being three bytes, is simply too short to prevent it from being exhausted and/or wrapping over the life of an MVS system, thus providing insufficient uniqueness for each fenceable sub-system. In the event the MVS O/S were to invalidate an IOPID for a given sub-system and then, due to a wrap in the sequence number, re-assign that IOPID to another sub-system (i.e. generating back level information), the IOPID for the former sub-system (being the same IOPID) would also become valid once again. As a result, I/O operations then issued by the formerly fenced sub-system would once again be permitted—clearly an undesirable condition. Also, if a IOPID assigned to a new sub-system were to wrap to a value associated with a currently fenced sub-system, then a fence and a prevention of I/O access would erroneously extend to the former sub-system. In practice, the length of the IOPID can not be easily enlarged owing to the adverse impact on existing software structures.

As one can see, the art has thusfar failed to teach a fencing technique that provides: (a) multi-level isolation, i.e. one which can function at varying levels of granularity including the application level, depending upon the type of sysplex component failure encountered, and (b) sufficient long term uniqueness for each one of a large number of fenceable entities.

Another conventional technique that provides sub-system fencing involves use of a "reserve log". Here, a protocol is established such that for any one particular sub-system to gain access to shared data, that system must first write an entry into a log. In doing so, that sub-system first obtains a so-called hardware reserve. While this sub-system holds the reserve, this sub-system effectively locks out any other sub-system from writing to the log and accessing the data. Unfortunately, this approach typically requires an I/O access, i.e. to the log, to occur prior to accessing the shared data through a coupling facility. Since an I/O access is typically several orders of magnitude slower than a coupling facility access, use of this approach can significantly slow the processing throughput of the sysplex.

Furthermore, in certain instances, the fencing technique disclosed in the Elko et al Fencing applications can also be disadvantageously quite time-consuming. Specifically, a system executing a given workgroup, depending upon the applications being executed therein, can be serving many users, for example as many as several hundred (if not more). Moreover, several workgroups could be served by this particular system. Since each user executes a process, the system can be executing quite a large number of user processes. Now, if this system, i.e. the target system, is to be fenced, all these processes would need to be simultaneously fenced through a hardware fencing facility. To do so, a CPC that generates a fence request also provides, as part of the request, a token that identifies a user process that is being executed on that system. This request, in turn, is routed through the coupling facility (which can be a so-called "structured external storage" SES device) to the fencing facility on a target CPC on which the target system resides. To actually isolate the target system, the target CPC would scan through its internal tables that list tokens associated with each and every access operation then occurring which involves the shared data storage device (e.g. a DASD or SES device). The token for each operation specifies which user process is then using that device. Such a fence request is needed for each and every token belonging to a process in the workgroup to be fenced. From a hardware perspective, the CPC would need to separately scan each and every respective I/O and SES operation it has for each and every token specified in the fence requests. Once a match is found for any one token in such a request, the status of that corresponding operation would be changed to discontinue the shared data access then being fenced and to prevent any further I/O or SES requests from being communicated, for the process being fenced, to the DASD or SES device. Unfortunately, repetitively scanning all the I/O and SES operations to locate token matches can be very time-consuming. If several hundred tokens are involved, each such an operation could consume upwards of 1 second or more. A delay of this sort in fully isolating a failed workload in processing critical business support applications may be excessively long in duration and hence permit some data corruption to occur, thereby be intolerable with these applications.

Therefore, a need currently exists in the art for a multi-level hierarchical fencing technique, specifically apparatus and an accompanying method, that can be used in a multi-system environment, such as illustratively a sysplex, and that not only provides sufficient uniqueness and granularity but also expeditiously isolates a failed sysplex component and thereby enhances the protection accorded to shared data.

In particular, in the event of a failure in a sysplex, this technique, based upon the nature of the failed sysplex component, should support complete shared data isolation at a variety of granular levels, particularly software fencing at workload or sub-system (e.g. workgroup or individual application) levels, and hardware fencing at a workload or system level. To support long term unattended CPC operation, this technique should also provide sufficient uniqueness for each one of a substantial number of fenceable entities. Furthermore, such a technique should not require operator intervention or utilize a separate service processor. Moreover, such a technique should dispense with any requirement to scan each and every active shared data operation multiple times.

We anticipate that, if such a multi-level fencing technique were to be incorporated into a sysplex, its use would advantageously increase the attractiveness of processing, inter alia, critical business support applications in a sysplex environment.

SUMMARY OF THE INVENTION

We have developed a multi-level hierarchical fencing technique, for use in illustratively a multi-system shared data (sysplex) environment, that substantially, if not totally, eliminates the deficiencies that now exist in the art in isolating a failed system or sub-system in a sysplex from accessing shared data.

Specifically, in accordance with our present inventive technique, we first define the concept of a "fence group" as being a user defined set of processes, such as various sub-systems, that collectively and exclusively utilize a common resource, e.g. (though by no means limited to) certain shared data. As it pertains to fencing, a member of a fence group is typically a lowest level process that, e.g., accesses shared data and which, should the process fail, can be fully isolated from accessing this data without adversely affecting such accesses carried on by other such processes in the group. In a sysplex, these sub-systems, typified by, for example, resource, transaction and database managers, usually reside on different systems. As such, a fence group typically extends over multiple systems with each such sub-system, regardless of where it resides, being a member of the group. Hence, in the case of shared data, a fence group would include all such managers (as well as other sub-systems) that access a common data structure, such as a database. If, for example, three of these sub-systems resided on one system, four on a second system and two on a third system, then the fence group would contain these nine sub-systems.

A fence group is typically spread across multiple systems, with each system in a sysplex executing members of multiple fence groups. Through our inventive technique, members of a specific fence group executing on a target system can be fully isolated to the exclusion of other such members (or sub-systems not situated within a fence group) —thereby effectuating workgroup isolation which the art has heretofore not taught.

In particular, our technique permits fencing to occur at various distinct levels: (a) a member-to-member level, i.e. to allow any member of a fence group to fully isolate, through imposition of a software fence, any other, so-called "target", member of that same group; (b) a fence group level, i.e. to isolate all members of a fence group that execute on a "target" system; and (c) a system level, i.e. to fully isolate an entire "target" system. Fence member isolation on a system occurs within software and specifically through resource managers within an operating system image executing on that system. Group and system level fencing occur through a hardware fencing facility that interdicts all input/output (I/O) and coupling facility accesses that emanate from that system and are destined to either an I/O system or a coupling facility, such as a structured external storage device (SES).

In a sysplex, each operating system image can detect a failure in a sub-system executing thereunder or in any other system. When a failure arises, through our inventive technique, a fence group member (a "source" member) issues a fence request against a failed "target" member on a "target" system. This request is processed by our inventive fence servicing routines that form part of the operating system image. As a result of processing this request, a resource manager that controls I/O and coupling facility accesses on behalf of the target member attempts to prevent/quiesce all such accesses in order to fully isolate this particular member. If this attempt is successful, a so-called "software" fence is effectively interposed around the target member. However, if this attempt is unsuccessful, thereby indicating that a failure lies at a higher level than a single fence group member, then a pre-defined fencing policy, specifically escalation rules therein, is consulted to determine if higher level fencing is to proceed for the target member, such as at the fence group level. A dataset (e.g. a so-called "Function" dataset), accessible to each and every system in the sysplex, stores the fencing policy which specifies the fence group members of each and every fence group on the sysplex and the corresponding escalation rules for each member. Depending upon the specific rules for a member, fencing may be escalated from the member level to either the group or system level or disallowed entirely.

If the rules permit group level fencing to occur for the target member, then the fence servicing routines request the hardware fencing facility to attempt to prevent/quiesce all I/O and coupling facility accesses on behalf of all "target" fence group members that execute on the "target" system. Alternatively, the escalation rules may specify that group level be skipped in favor of system level fencing, in which case the fencing facility will attempt to prevent/quiesce all I/O and coupling facility accesses on behalf of the entire target system. If a permissible fence can not be successfully imposed at a higher level or if escalation is completely disallowed in view of a failure of a software fence, then the fence request is failed with appropriate operator intervention being required to respond to the failure, such as by manually resetting the failed system through its corresponding CPC.

Through escalation rules, the scope of each fence is restricted to that needed to minimally isolate a failed sysplex component. Moreover, fence member and group level fencing permits a functioning system to continue processing remaining non-isolated fence group members (and sub-systems). Consequently, through use of our invention, a system exhibits significantly increased availability than that which heretofore results from using fencing techniques known in the art.

Furthermore, in accordance with our specific inventive teachings, a unique CPC-wide parameter, rather than a sequence number within an input/output prevention identifier (IOPID), is used to identify each and every fence group. This parameter, a so-called "sub-system authority parameter", is created for each fence group on a system and particularly when that group itself is first created on that system. This parameter remains unique over the life of the CPC. Use of this parameter in conjunction with hardware and software fence tables, rather than just the IOPID sequence number, advantageously eliminates erroneous back level fencing from occurring over the life of the CPC.

For each different fence group executing on a CPC, its corresponding sub-system authority parameter is stored within a corresponding authorization vector element in the hardware fencing facility for that CPC. During the course of commanding the facility to impose a group level fence, an authorization index value is supplied to this facility to point to a particular authorization vector element for the group to be fenced. As a result, the fencing facility will simply prevent/quiesce all I/O and coupling facility access operations that present this index and hence emanate from members of the group being fenced. Thus, in direct contrast to conventional isolation techniques, our inventive technique advantageously permits a granular hardware level, i.e. a group level, fence to be imposed by issuing a single command to a corresponding fencing facility, thereby greatly expediting fence processing over that heretofore possible.

Our inventive technique also provides the feature that fencing at both group and system level is accomplished in a separate hardware fencing facility without operating system participation. As such, fencing at these levels can still occur for a target system even if the target operating system image is itself not functioning, thereby increasing the reliability of the fencing actions and the protection accorded shared data in view of a failure of an operating system image.

BRIEF DESCRIPTION OF THE DRAWINGS

The teachings of the present invention can be readily understood by considering the following detailed description in conjunction with the accompanying drawings, in which:

FIG. 2 depicts a simplified multi-system portion of sysplex 5 along with hierarchical fencing according to our present inventive teachings;

FIG. 6 depicts an illustrative policy table resident in a Function dataset and which is used in implementing our inventive hierarchical fencing technique;

FIG. 9 depicts the correct alignment of the drawing sheets for FIGS. 9A-9C;

FIGS. 9A-9C collectively depict a high level flowchart of Assign Fence Group Member Routine 900 that executes within a system within sysplex 5 to establish a new fence group member;

FIG. 10 depicts the correct alignment of the drawing sheets for FIGS. 10A-10C;

FIGS. 10A-10C collectively depict a high level flowchart of Fence Group Member Termination Processing and Release Fence Group Member Routine 1000 that executes within a system within sysplex 5 to terminate fence processing and release a member from a fence group;

FIGS. 13A-13C collectively depict a high level flowchart of Software Fence Request Routine 1300 that executes within a system within sysplex 5 to process a software fence request;

FIG. 15 depicts the correct alignment of the drawing sheets for FIGS. 15A-15E; and FIGS. 15A-15E collectively depict a high level flowchart of Remote Fence Request Servicing Routine 1500 that executes within a system within sysplex 5 to process an incoming fence request from another system.

DETAILED DESCRIPTION

After considering the following description, those skilled in the art will clearly realize that the teachings of our present invention can be readily utilized to provide hierarchical fencing in computer installations that have any one of a wide variety of different architectures. Illustratively, these architectures can range from a relatively simple computer installation which utilizes a single processor that executes several applications against a single operating system (O/S) image, to a large sysplex that employs multiple computer processing complexes (multiple processors) in which each CPC concurrently executes multiple applications against multiple O/S images, the latter typified by a well known "PR/SM" environment. Through our invention, data that is shared among two or more processing entities and/or applications is protected against corruption that might otherwise result from a failure condition. In this regard, depending upon the extent of the failure (software and/or hardware) and a pre-defined policy, our inventive fencing technique automatically and incrementally enlarges the extent (in terms of software and, where necessary, hardware) of the installation that is isolated from the data in order to prevent any subsequent failure-induced corruption of the data that might otherwise arise. With this in mind and to simplify the ensuing description, we will describe our invention in an illustrative context of use within a sysplex formed of multiple computer processing complexes (CPCs) inter-connected through a structured external storage (SES) device, as described in the co-pending Elko, et al. Fencing application cited above.

Figure 1:
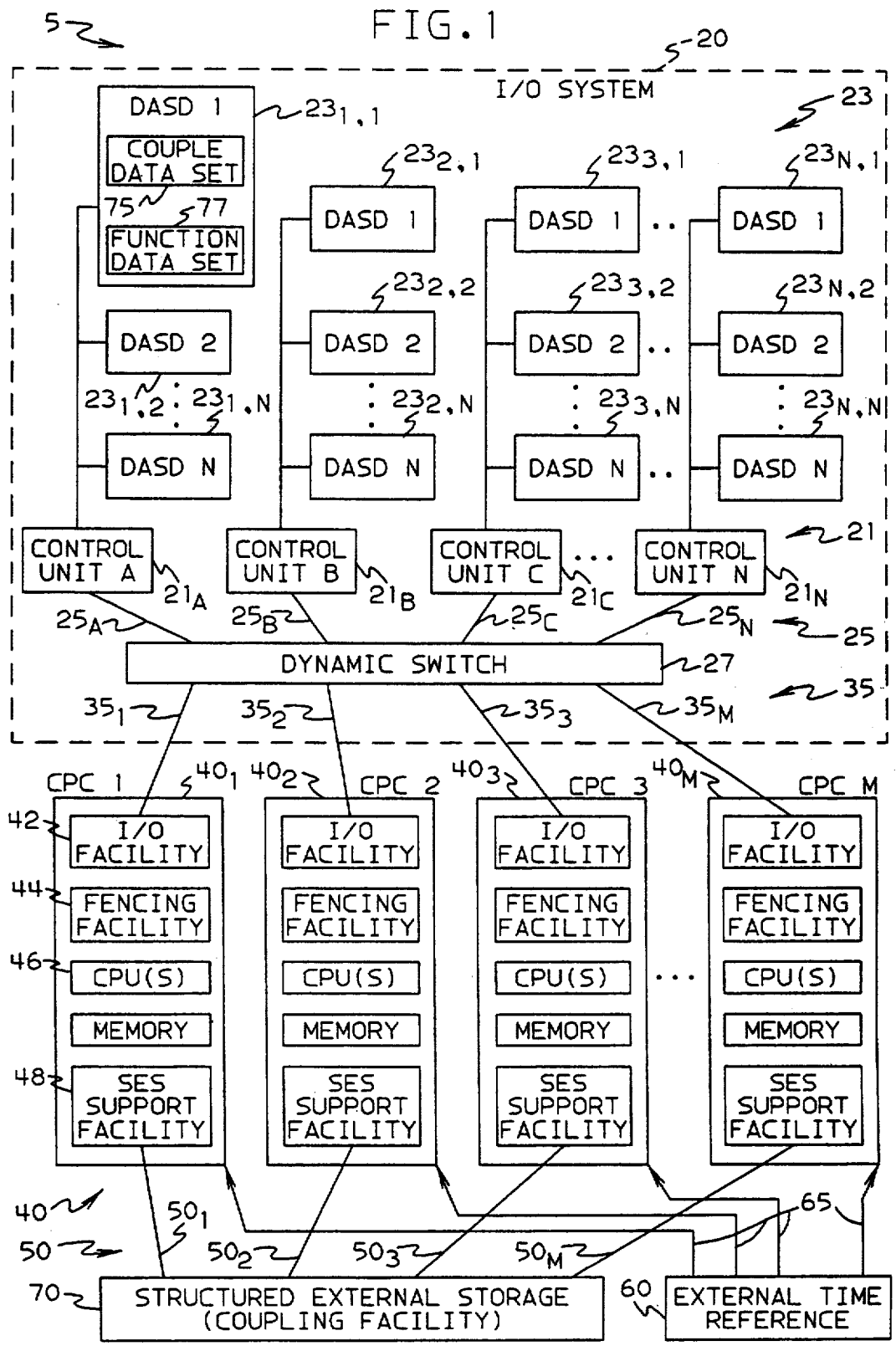
FIG. 1 depicts illustrative multi-CPC (central processing complex) sysplex 5 that incorporates our present invention for isolating a failed sysplex component.

FIG. 1 depicts illustrative multi-CPC (central processing complex) sysplex 5 that incorporates our present invention for isolating a failed sysplex component.

As shown, sysplex 5 is formed of multiple CPCs 40, specifically CPCs $40_1$, $40_2$, $40_3$, ..., $40_M$, all of which are capable of accessing input/output (I/O) system 20 and SES device 70. Each of the CPCs may be an IBM system that follows the Enterprise Systems Architecture/390 Principles of Operation as described in IBM Publication No. SA22-7201-00.

I/O system 20, which provides mass storage of program and data for use by the entire sysplex, contains multiple direct access storage devices (DASDs) 23 which are selectively connected to requesting CPCs through dynamic switch 27 and channel paths 35. In particular, illustratively N DASDs are controlled through a corresponding control unit. Each DASD is typically a hard disk based storage unit that provides read/write storage space. One such unit is the IBM 9340 Direct Access Storage sub-system. For further details concerning shared DASD and the 9340 sub-system in particular, the reader is referred to: *IBM 9340 Direct Access Storage Sub-system Reference*, IBM Publication No. GC26-4647. In addition, further details regarding I/O attachments are contained in: *IBM 370 Extended Architecture*, IBM Publication No. SA22-7085.

Here, DASDs $23_{1,1}$, $23_{1,2}$, ..., $23_{1,N}$ are connected to and controlled by control unit A, also designated by reference numeral 21A; DASDs $23_{2,1}$, $23_{2,2}$, ..., $23_{2,N}$ are connected to and controlled by control unit B ($21_B$); DASDs $23_{3,1}$, $23_{3,2}$, ..., $23_{3,N}$ are connected to and controlled by control unit C ($21_C$); and DASDs $23_{N,1}$, $23_{N,2}$, ..., $23_{N,N}$ are connected to an controlled by control unit D ($21_D$). As one can appreciate, both the number of DASDs connected to each control unit, as well as the number of control units themselves, is not critical and can vary widely based upon the requirements of the sysplex. Control units 21 are, in turn, connected through communication paths 25, specifically paths $25_A$, $25_B$, $25_C$, ..., $25_N$ for control units $21_A$, $21_B$, $21_C$, ..., $21_N$, respectively, to dynamic switch 27. This switch dynamically establishes a bi-directional communication path between a requesting CPC and a control unit. This switch, of which its detailed functioning is not relevant here, may be an "ESCON Director" dynamic switch available from the IBM Corporation in Armonk, N.Y.

SES facility 70 provides a so-called coupling facility to communicate information from one CPC to another. To the extent relevant here, facility 70 basically serves as a conduit (transport facility) to facilitate message passing between individual CPCs. In addition to providing a inter-CPC conduit, SES facility 70 also provides common storage which is accessible by all the CPCs and performs operations requested by programs executing within any of the CPCs. For detailed information on a SES device, the reader is referred to a co-pending United States patent application from D. A. Elko et al and entitled "Method and Apparatus for Coupling Data Processing Systems" filed on Mar. 30, 1992 and assigned Ser. No. 07/860,803 and which is also incorporated by reference herein.

"Couple dataset" 75 stores status and other information for each CPC in the sysplex that can communicate (couple) with any other such CPC. This dataset resides within any one of the DASDs, such as illustratively here DASD $23_{1,1}$. Furthermore, another dataset referred to herein as "Function dataset" 77 stores information that defines, as will be discussed in detail below, each fence group in the sysplex and accompanying escalation policy data that delineates when fencing actions should be escalated from one level to another and how the escalation is to proceed. This dataset also resides on any DASD, here illustratively DASD $23_{1,1}$. Both of these datasets are separate data structures and are independently accessible to any CPC.

SES facility 70 communicates with CPCs 40 through channel paths 50, specifically through illustrative channel paths $50_1$ for CPC $40_1$, channel paths $50_2$ for CPC $40_2$, channel paths $50_3$ for CPC $40_3$ and channel paths $50_M$ for CPC $40_M$. To simplify the drawing and the ensuing discussion, sysplex 5 is shown and discussed as containing only one SES facility; however, the sysplex may contain multiple SES facilities, each with its own I/O channels and message paths connected to all or a subset of CPCs $40_1$, $40_2$, ..., $40_M$.

External time reference 60 provides sysplex time information for various functions such as for writing time stamps of control information into a log to document recovery from failures, backing out of undesired operations and for audit trails. As it pertains to the present invention, the sysplex time data provided by reference 60 is used in generating a sub-system authority parameter which is used in both fence tables and fence tokens, all as discussed in detail below. In operation, time reference 60 synchronizes, through fiber optic interconnect cables 65, the individual time clocks (not shown) of each of the CPCs $40_1$, $40_2$, ..., $40_M$ to a precision equal to or greater than a duration of a shortest externally visible operation performed by each CPC.

Where necessary, time reference 60 compensates for differences in propagation times caused by unequal cable lengths within cables 65 in order to maintain proper inter-CPC synchronization.

As shown at a high level, all of the CPCs are identical; hence, we will only address CPC $40_1$ in detail. This CPC contains central processing unit(s) (CPU(s)) 45, memory 46, I/O facility 42, fencing facility 44 and SES support facility 48.

Each CPU within CPUs 45 executes one or more instances ("images") of an operating system, such as the MVS O/S currently available from IBM Corporation, to provide separate corresponding application environment(s). In this regard, each CPC can be appropriately configured to run in a so-called "native" mode through which it executes one single O/S image or in a so-called "PR/SM" environment in which it executes multiple MVS O/S images wherein a system administrator partitions available processor storage (memory 46) and CPU(s) 45 among a desired number of application environments. In fact, one CPC can be executing in native mode, while another CPC is executing in a PR/SM environment. Our present invention is applicable to and can be readily used with either of these modes.

Memory 46 (processor storage) provides local high speed storage of program and data for execution by CPU(s) 45. This memory typically includes appropriate cache memory. Each O/S image resides within a dedicated storage area within memory 46.

I/O facility 42 provides appropriate I/O channels to establish bi-directional communication between CPC $40_1$ and I/O system 20. Facility 42 establishes this communication by executing a so-called channel program that is formed of well known channel control words (CCWs).

As a result of establishing communication between, e.g., CPC $40_1$ and the I/O system, I/O commands and data can be sent from this CPC, through dynamic switch 27, to a specific control unit within I/O system 20 to read information from or write information to on one of the DASDs attached to this control unit. Similarly, bi-directional communication is provided between SES device 70 and, for example, CPC $40_1$ through SES support facility 48. Information that is to be written into or read from the coupling facility (SES) to I/O system 20 must first be directed through a CPC and its processor storage en route to the I/O system. SES support facility 48 utilizes message operations as described in co-pending United States patent applications from D. A. Elko entitled "Message Path Mechanism for Managing Connections between Processors and a Coupling Facility" filed on March 30, 1992 and assigned Ser. No. 07/860,646 and "Communicating Messages Between Processor and a Coupling Facility" filed Mar. 30, 1992, and assigned Ser. No. 07/860,380; both of which are assigned to the present assignee hereof and are incorporated by reference herein. In fact, though facilities 42 and 48 are shown separately for ease of understanding, these facilities are implemented through and are part of a common conventional channel sub-system.

In essence and in conventional use, fencing facility 44 is a dedicated hardware component that, upon receipt of an appropriate fence request typically from other CPCs (e.g. from CPC $40_2$, $40_3$, . . . or $40_M$), isolates ("fences") an operating system image from accessing both I/O system 20 and SES 70. The facility accomplishes this by interdicting I/O and SES accesses and message operations that emanate from the failed system and are intended for either the I/O system or the SES. When fenced, the failed system is prevented from executing operations against shared data to which that system would otherwise have access—this data being stored on either the I/O system or the SES. Inasmuch as facility 44 executes its instructions independently of any instruction executed within this image and by CPUs 45, then, in the event this system were to fail, either due to abnormality in an application executing thereunder or in the O/S image itself, facility 44 would then be invoked by any other O/S image in the sysplex to fence the failed image. Through this operation, fencing facility 44 ensures the integrity of this data by preventing any errant operation generated by the failed system itself or through a recovery process executed thereon from propagating to and corrupting this data.

Conventionally speaking and as it pertains to fencing, each O/S image periodically updates its current status information that is stored in couple dataset 75. System failure can be conventionally detected in various ways. For example, a resource manager within an interrogating O/S image can detect when an address space terminates or an application executing against this image terminates. Alternatively, a transaction manager, such as CICS provided by IBM and operating within an MVS O/S image, can detect if an application "stalls", i.e. it fails to execute on schedule. Through either instance, appropriate routines within the MVS O/S image can generate a fence request to the fencing facility in the appropriate CPC containing the failed system, i.e. a "target" fencing facility. In addition, during normal execution, each and every O/S image periodically reads the status information for every other image. In the event a system, for whatever reason, and hence its O/S image did not update its status information when it should have, any other, i.e. an interrogating, O/S image would then generate a "System Status Missing" message for the failed image in the fence group. In essence and in response to this message, the interrogating O/S image could issue an appropriate fence request to the target fencing facility. This request would be transported through SES 70 to the target fencing facility. This facility, in turn, would execute this request thereby purging all existing I/O requests and message operations for the failed system from I/O system 20 and SES 70 and interdicting any further such requests or operations that this failed system may issue. The interrogating (and/or remaining) system(s) could then appropriately take over all or a portion of the workload then being handled by the failed system. This interdiction will continue until such time as the failed system is returned to proper operation and re-initialized into the sysplex. In certain PR/SM environments, the interrogating O/S image, could issue appropriate PR/SM commands to the failed system in an attempt to automatically reset a logical partition that contains the failed system and thereby return that system to proper service. In connection with this operation, the interrogating O/S image could issue appropriate PR/SM commands to take over the storage that had been in use by the logical partition then being reset. For a detailed description of fencing, and particularly how these fencing functions are accomplished through the fencing facility and the CPCs and the necessary interactions therebetween, the reader should refer to the following co-pending United States patent applications, both by D. A. Elko et al, both assigned to the present assignee and both of which are incorporated by reference herein: "Interdicting I/O and Messaging Operations in a Multi-System Complex", Ser. No. 07/860,489 filed Mar. 30, 1992; and "Message Path Mechanism for Managing Connections Between Processors and a Coupling Facility", Ser. No. 07/860,646 also filed Mar. 30, 1992 (both of which are hereinafter collectively referred to as the "Elko et al Fencing applications").

While the fencing technique thusfar described and implemented by fencing facility 44 (henceforth referred to as the "basic" technique) does protect shared data from an O/S system failure, we found that this technique possesses various shortcomings which limit its utility.

First, if an application were to fail but its associated O/S image remained operational, the basic technique would fence out the entire application environment (i.e. the entire "system")—even though the O/S image is still fully capable of processing its remaining applications. Second, for any system and particularly a workload that executes a large number of user processes thereon, the basic methodology tends to consume a significant amount of time to fully fence a system. In critical business support applications, this time can be excessive and, due to intervening access requests that occur prior to the completion of a fence operation, allow the shared data to become corrupted. Third, when used in conjunction with a conventional Input-/Output Prevention identifier (IOPID), this basic technique may be susceptible to erroneous back level fencing particularly in sysplexes that run over long periods without an intervening CPC restart and initial program load (IPL).

In accordance with the teachings of our invention, we have developed a hierarchical fencing technique that advantageously eliminates these deficiencies.

FIG. 2 depicts a simplified multi-system portion of sysplex 5 that incorporates hierarchical fencing according to our present inventive teachings. For simplicity, this figure shows three separate, though identical, systems $200_1$, $200_2$ and $200_3$, all executing on a common CPC, here illustratively CPC $40_1$ (CPC 1)—thus providing a PR/SM environment. Each system includes an identical MVS O/S image $205_1$, $205_2$ and $205_3$ (also noted as images: SYS 1, SYS 2 and SYS 3, respectively) for systems $200_1$, $200_2$ and $200_3$, respectively, and provides a corresponding application environment $210_1$, $210_2$ and $210_3$. Clearly, sysplex 5 can utilize many more systems with these systems being distributed among various CPCs as desired by a system administrator. Furthermore, for purposes of clear illustration, systems $200_1$, $200_2$ and $200_3$ each execute the same workload—though, in actuality, the images on any sysplex will likely execute widely varying workloads of different applications. In any event, as shown and specifically with reference to system $200_1$, the workload illustratively contains: database managers DBM 230, 233 and 237 (also designated as DBM A1, DBM A2 and DBM B, respectively), transaction managers TM 220 and TM 225 (also designated as TM A and TM B, respectively) and transaction applications $240_1$, ..., $240_n$ and $250_1$, ..., $250_n$ (also designated as transaction applications UA 1, UA 2, ..., UA n and UB 1, UB 2, ..., UB n). Each database manager is typified by the DB2 or IMS programs, both of which execute under the MVS O/S and are currently available from the IBM Corporation. Database managers DBM A1 and DBM A2 and transaction manager TM A collectively serve illustrative transaction applications (data users) UA 1, UA 2, ..., UA n. Database manager DBM B and transaction manager TM B collectively serve illustrative transaction applications UB 1, UB 2, ... UB n. Although the number (n) of transaction applications is depicted as being the same for all of the database managers, this is merely illustrative and, in practice, is ordinarily not the case. Transaction managers TM A and TM B are each typified by the CICS or IMS programs which also execute under the MVS O/S; both of which are currently available from the IBM Corporation. Essentially and to the extent relevant here, each of the transaction managers schedules transactions generated by its respective network attached users for subsequent processing; while the database managers control access to shared data that supports these transaction applications. Inasmuch as our inventive fencing technique requires that each sub-system be uniquely identified within the Function dataset, as described below, then each sub-system shown in FIG. 2 also carries, as a suffix, the name in parenthesis of the O/S system on which it executes, e.g. database manager DBM A1 executing on O/S image SYS 1 (image $200_1$) can be fully identified as "DBM A1 (S1)". The same identifying convention is used with all the other sub-systems.

Though the shared data for all of transaction applications UA 1-n and UB 1-n resides on either the SES facility or the I/O system (DASD), to simplify the drawing and facilitate understanding, this data is depicted as residing within separate SES/DASD portions. Specifically, the shared data for transaction applications UA 1-n and UB 1-n is depicted as residing in corresponding SES/DASD portions 201 and 202 which themselves are accessed through corresponding channel paths $35_{1,1}$ and $35_{1,2}$.

As stated above, our invention provides multi-level hierarchical fencing. We define a "fence group" as representing a single set of user processes that is exclusively sharing a set of resources, e.g. here certain data. We refer to the user processes (users) within that group as "fence members". Through a preferred embodiment of our invention, fencing can proceed along three hierarchical levels, which in order of increasing breadth are: (a) member-to-member fencing, i.e. fencing an identified user process, (b) fencing a set of all identified users (a "group") which are located on a common system and are all sharing a common resource, and (c) fencing an entire system. Software fencing implements the first, most granular, level; the other two increasingly higher level (and more extensive) fences are established through hardware fencing. At the lowest level, a member of any fence group can request that, through the MVS operating system and specifically fence servicing routines as discussed in detail below in conjunction with FIGS. 9A–9C, 10A–10C, 12, 13A–13C and 15A–15E, a software fence be imposed against any other member of the same group. However, the former member can not request that a fence be imposed against a specific member of another group. Nevertheless, through escalation as discussed below, a fence request can be extended, where failure conditions on a system warrant and as permitted by a pre-defined escalation policy, to expand a fence from one level, e.g. a software fence against a target member of a fence group on this system, to a successively higher level(s) through hardware fencing to encompass all members of that fence group which execute on the system or the entire system itself.

In particular, for the portion of sysplex 5 shown in FIG. 2, a fence group consists of those specific processes that directly interact with shared data, in this case the data utilized by the transaction applications UA 1-n and UB 1-n and stored within SES/DASD portions $20_1$ and $20_2$. Inasmuch as this data is utilized by two separate groups of transaction applications, two separate fence groups are shown: fence group A (FG A) which consists of database managers DBM A1 and DBM A2 and transaction managers TM A that all interact with the data, stored on SES/DASD portion $20_1$, for transaction applications UA 1-n; and fence group B (FG B) which consists of database manager DBM B and transaction managers TM B that all interact with the data, stored on SES/DASD portion $20_2$, for transaction applications UB 1-n. Since the processes that access shared data on SES/DASD portion $20_1$ execute on all three systems, i.e. separate instances of database managers DBM A1 and DBM A2 exist on all three systems $200_1$, $200_2$ and $200_3$, fence group A encompasses all these systems. Similarly, since separate instances of database manager DBM B and transaction manager TM B are found on each of these systems, FG B also extends over all three systems. As discussed below, a new member(s) can be added to a fence group and a current member(s) can be deleted therefrom at any time through appropriate fence servicing routines, discussed in detail below, that execute as part of each MVS O/S image.

Thus, a fence group can be viewed as a divisible portion of the entire workload executing on a given set of systems; hence, a fence group can be viewed as defining a corresponding "workgroup". Even if one fence group is isolated on a system through our inventive fencing technique, that system (assuming it is still operational) remains available to process other workgroups within its workload, apart from the workgroup that is fenced.

An application itself, such as UA 1, does not own or directly access (interact with) its shared data. Rather these functions are relegated to sub-systems, such as either a database manager and/or a transaction manager. Given this, if the sub-systems that form a fence group were completely fenced, i.e. totally inhibited from accessing their shared data, then, a priori, the applications themselves that rely on these sub-systems to access this data would themselves also be completely prevented from both accessing and potentially corrupting this data. For that reason, there is typically no need to extend a fence group to a lower granular level than a sub-system to encompass either a particular application or group of applications.

As noted above, at the lowest level of fencing granularity, i.e. the sub-system level, our inventive technique permits any one member of a fence group to cause a software fence to be established around any other member (a "target" member) of that fence group. As such, any instance of database manager DBM A1, such as DBM A1 (S1), in fence group A can request that a software fence be established around any other member in this group, such as, for example, database manager DBM A1 (S2) or DBM A1 (S3), or either instance of transaction manager TM A (TM A (S1) or TM A (S2)).

Should the imposition of member level fencing fail, then, through hardware fence facilities located within appropriate CPC(s), an entire fence group on the target system containing that target member, such as illustratively all the members of FG A executing on system $200_1$, could itself be fenced. Fencing at this level isolates all fence group members that execute on the target system while advantageously permitting this system to process unrelated workgroups. Isolating only the workgroup encompassed by the fence members on the target system rather than just isolating the entire system itself advantageously increases the availability of this system, particularly to other workgroups executing against this system, which, in turn, increases the throughput of the sysplex. In that regard, any one system can be executing workgroups that collectively form part of quite a number of different fence groups. If any one workgroup on the system is isolated, the system will continue to process the remaining workgroups in its workload. Hence, available processing capacity will be far less adversely impacted by fencing at this level than if the entire target system were isolated—as would otherwise occur in the absence of our present invention.

If this level of fencing succeeds, then all members of the fence group on the target system, including the target user, are completely fenced. This fence operation will fail if the operation times out before it completes or if the fencing facility on the target system is not active. As noted above, this fencing operation would be attempted where it is permitted under the escalation policy. This policy, discussed in greater detail with FIG. 6 below, could alternatively specify that this level of fencing is to be skipped in favor of a next higher level, i.e. system fencing, or that no fencing above member level is to be permitted for this fence group member.

In any event, in order for a group fence to be effective, the fencing facility that handles each target system on which a fence group member resides must have been activated when that system initialized. Furthermore, to fully invoke such a fence operation, connectivity must exist through SES 70 between a system that issues the fence request, such as system $200_1$, and every target system, such as systems $200_2$ and $200_3$, on which a member of the fence group resides.

Now, if for any reason a request to isolate a fence group were to fail, hardware fencing can be escalated, if the escalation policy so permitted, to fence (isolate) an entire system, such as illustratively system $200_1$. Fencing at this level partitions a target system out of the sysplex. In order to perform system level fencing without requiring an operator to respond after the target system has been reset, the fencing facility on the target system must have been activated when the target system initialized. Also, as with group level fencing, connectivity must exist through SES 70 to the fencing facility from a system that issues the fence request to the target system. If the fencing facility that serves the target system is not active, then this fence request will fail and an operator will be prompted to indicate when the target system has been reset. Hence, a system level fence is complete when either the target system has been fully isolated through a successful hardware fence operation or has been reset by the operator.

Our inventive technique utilizes an IOPID but differently than that which is conventionally used. To fully understand this, first consider a conventional IOPID and its use, then our inventive fencing IOPID.

Figure 3A:
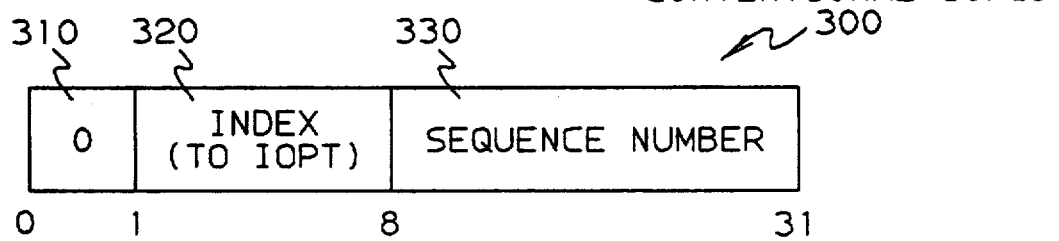
FIG. 3A depicts a conventional input/output prevention identifier (IOPID) that is supported by the MVS operating system.

FIG. 3A depicts a conventional IOPID that is supported by the MVS operating system. This identifier, which is four bytes (32 bits) long, contains three fields: a zero bit in one-bit field 310, a seven-bit index value in field 320 and a three-byte (24-bit) sequence number in field 330. Such an identifier is provided by an MVS O/S image for each I/O operation it undertakes. The index value points to an entry within an I/O Prevention Table (IOPT) maintained by the O/S image. Conventionally, in the event a sub-system (e.g. such as a transaction manager) within an application environment were to fail, a functioning sub-system can supply the IOPID for the failed sub-system to the MVS O/S image, and specifically to an I/O Supervisor therein, to fail any further I/O requests that are made by the failed sub-system.

Figure 3B:
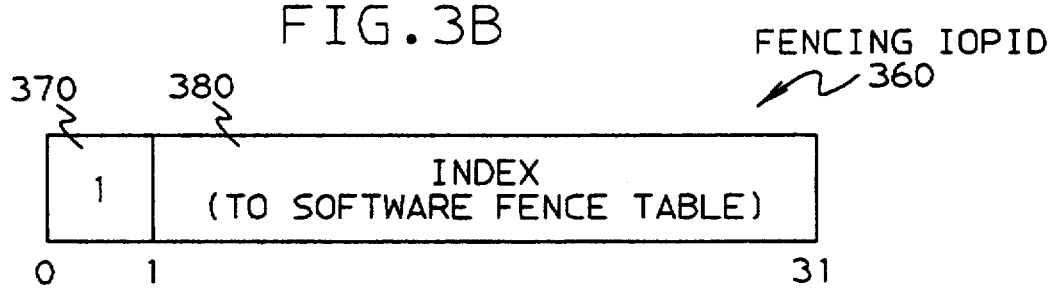
FIG. 3B depicts a fencing IOPID according to our inventive teachings.

To maintain proper compatibility with the existing I/O Prevention function and the I/O Supervisor as presently provided in the MVS O/S, we have maintained our fencing IOPID, as shown in FIG. 3B, at four bytes. However, rather than just accessing an I/O Prevention Table in conjunction with validating an I/O operation, as is conventionally done, we utilize, as described in detail below, the IOPID, as a "fencing IOPID" to form a fence token As part of our inventive teachings and as described below, the fencing IOPID is assigned by fence servicing routines within an MVS O/S image and merely serves as an index into a software fence table for either establishing a fence of appropriate granularity or releasing such a fence. To enable an MVS O/S image to differentiate an IOPID as either a conventional IOPID or a fencing IOPID, the latter contains a one, rather than a zero, stored in one-bit field 370, i.e. the first bit in the IOPID. Furthermore, rather than having a seven-bit index followed by a three byte sequence number as in a conventional IOPID, the fencing IOPID merely contains a 31-bit index, in field 380, following the first bit. The value of the index points, as a relative address, to a single entry in a software fence table. Since our inventive technique does not rely on the fencing IOPID to uniquely identify each granular fenceable entity within a CPC, advantageously our technique is not susceptible to so-called "back level" fencing through IOPID reassignment—as might occur with use of a conventional IOPID in a sysplex.

Figure 4:
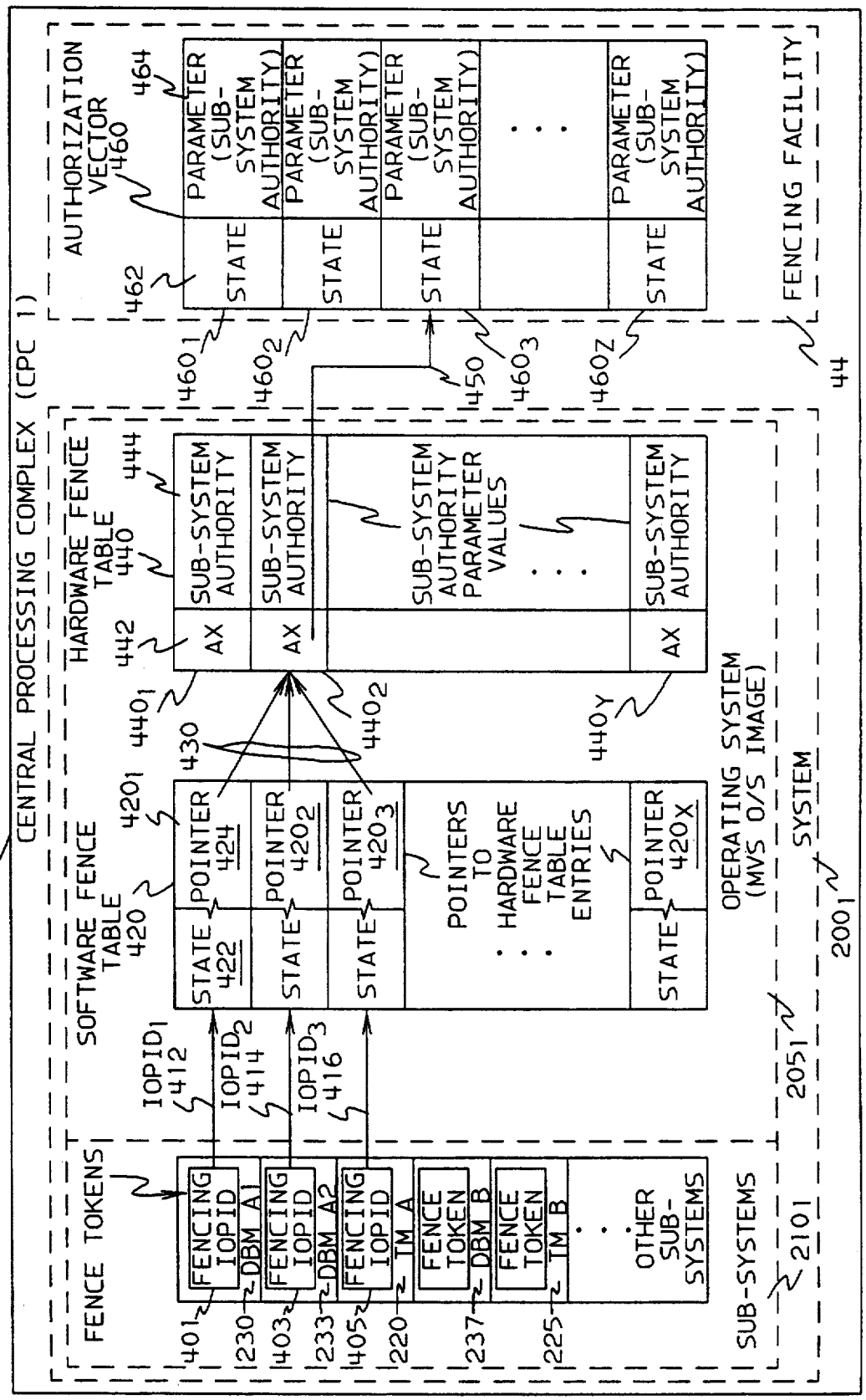
FIG. 4 diagrammatically depicts, at a simplified high level, relationships between illustrative fence group members, a software fence table, a hardware fence table and an authorization vector, all of which are used to implement our inventive hierarchical fencing technique on any CPC within sysplex 5.

FIG. 4 diagrammatically depicts, at a simplified high level, relationships between illustrative fence group members, a software fence table, a hardware fence table and an authorization vector, all of which are used to implement our inventive hierarchical fencing technique on any CPC within sysplex 5.

A typical system in sysplex 5 (see FIG. 1), such as illustratively system $200_1$ shown in FIG. 4, provides an application environment, e.g. environment $210_1$, that executes against an MVS O/S image, such as image $205_1$. This environment encompasses a variety of sub-systems that directly interact with shared data, such as database managers DBM A1, DBM A2 and DBM B (230, 233 and 237, respectively) and transaction managers TM A and TM B (220 and 225, respectively). When a sub-system is initially incorporated as a member into a fence group, the fence servicing routines assign two unique tokens to this member: a fence token and a fence member token. The fence token permits this particular sub-system to be fenced by other members of the fence group. This token, as shown by fence tokens 401, 403 and 405 for respective sub-systems 230, 233 and 220, contains a fencing IOPID. The fence member token uniquely identifies each member sub-system in a fence group. For a member sub-system that belongs to a fence group, its fence member token (not specifically shown) typically contains three values: (a) a value identifying this fence group on its system (e.g. fence group 1, 2, 3 and so forth), followed by (b) a number representing the position of the member within the fence group (e.g.

member 1, 2, 3 and so forth), and (c) a sequence number representing the number of times, including the present, that this member has been assigned as "active" in the fence group (for each subsequent assignment of this fence member within a fence group, the sequence number is incremented by one prior to being stored in the associated fence member token for every other such fence member assignment). As discussed below, to initiate a fence operation against a target member of a fence group, the initiating member must supply not only the fence member token of the target member but also its own fence member token in order to authenticate the request. The sequence number appearing in the fence member token is used, by the fence servicing routines, as a check to validate the fence member token prior to establishing a software fence.

In any event, once both tokens are assigned to each member sub-system, the MVS O/S image stores these tokens in local system memory (e.g. within local storage 758 depicted in FIG. 7 and discussed in detail below) for subsequent use by this member in requesting access to shared data and/or initiating a fence operation. The MVS O/S image also stores these fence member tokens in a commonly accessible dataset, e.g. within Function dataset 77 (see FIG. 1), for subsequent access by any O/S image. As discussed below, the MVS O/S image that assigned these tokens communicates the fence token to each and every other system, on this and other CPCs, on which any other member of this fence group resides. This, in turn, allows any other member sub-system of the fence group, that resides on any other system, to fence the new member sub-system.

By incorporating a common though unique identification of an entire fence group on a system, through a sub-system authority parameter, and utilizing that parameter in the manner discussed below, our inventive methodology advantageously permits a entire group on a system to be fenced on the basis of a single granular hardware fence request. This sharply contrasts with conventional fencing where a separate fence request would need to be issued and processed for each and every fence group member in order to fence the entire group, and hence, in turn, consume a significant amount of processing time. Advantageously, use of our inventive methodology simplifies fencing and, in the case of processing a granular hardware fence request, significantly decreases the processing time needed to establish such a granular hardware fence by processing only one fence request instead of potentially many.

During the token assignment process, the MVS O/S image determines whether a fence group, to which a sub-system is being assigned, exists or not. If the fence group does not exist, then the O/S image establishes a new fence group. In doing so, the O/S image creates a value of the sub-system authority parameter for this particular fence group and particularly a value that is unique over the life of the CPC which executes this image. Once this value is created, it is permanently associated with the fence group.

To digress somewhat, since CPC-wide uniqueness is the only requirement for a value of the sub-system authority parameter, a suitably unique value can be generated in one of several illustrative ways. First, a system clock, which is synchronized throughout the sysplex to external time reference 60 (see FIG. 1), generates an ever increasing time value. Given the operation of a "Store Clock" instruction in the MVS O/S and that of an underlying system clock itself, such a time value when combined with a system identifier will provide the requisite uniqueness. In this instance, the high order six bytes of the system clock, along with a one byte system identifier concatenated to it, can be used as a sub-system authority parameter value. Alternatively, a sufficiently unique value for the sub-system authority parameter can be formed, by any MVS I/O image, by concatenating together: a system identifier number (a number identifying the associated system on which the sub-system executes), a system sequence number stored on the coupled dataset, and a sequence number that is incremented each time a new sub-system authority parameter value is assigned for a sub-system executing on that system. Regardless of the manner through which this parameter value is generated, the size of this parameter is sufficiently large that its value will not wrap or be exhausted during the life of the CPC.

In any event, by imparting CPC-wide uniqueness to each fence group on a CPC, a unique association is formed among a fence token, the member sub-systems in the fence group and entries in the software and hardware fence tables, as well as with an authorization vector element (discussed in detail below) for the fence group. Not only does this association prevent erroneous back level fencing or erroneous back level shared data I/O accesses from occurring, this association also permits a particular workgroup containing this member to be completely fenced on its associated system while permitting other workgroups to execute on this system—thus enhancing system availability. Furthermore, a sub-system is required to permanently stop using a fencing IOPID before that fencing IOPID is re-assigned. This, coupled with the uniqueness of the sub-system authority parameter resident within the hardware fence table and with software and hardware fencing states—as described below, ensures that once a sub-system is fenced, that sub-system will remain fenced with no I/O or coupling facility accesses into shared data being permitted therefrom.

Now, returning to FIG. 4, the MVS O/S image, illustratively image $205_1$, stores two distinct tables: software fence table 420 (having entries $420_1$, $420_2$, ..., $420_x$) and hardware fence table 440 (having entries $440_1$, $440_2$, ..., $440_y$).

Software fence table 420 contains one entry for each member sub-system that executes on this system and resides in any fence group. In addition, for every such member, its fence member token is stored on a commonly accessible dataset, e.g. the Function dataset. Having entries for all the members of a common fence group in the Function dataset permits any one member of that group, regardless of where that member executes, to initiate a software fence request against any other member of that same group.

Specifically, as an example, if five member sub-systems, such as sub-systems 230, 233, 237, 220 and 225 (database managers DBM A1 and DBM A2, transaction manager TM A, database manager DBM B, and transaction manager TM B, respectively) as shown in FIG. 4, executed within system $200_1$—regardless of whether these members were situated in one, two or more fence groups, then five entries, a different one for each corresponding sub-system, would reside within the software fence table. For the example shown in FIG. 2 and discussed above, the five sub-systems shown in FIG. 4 would be organized into two fence groups: FG A and FG B that both encompass fence group members executing on three systems. FG A contains nine members on these systems; FG B contains six members on these systems. Accordingly, software fence table 420 would contain five entries: three for FG A and two for FG B. In addition, the three entries for FG A would all possess an identical, though unique, value, associated for FG A, for the sub-system authority parameter on system $200_1$. Similarly, the two entries for FG B would also possess an identical, though unique, value, associated with FG B, for their sub-system authority parameters on system $200_1$. Additionally, Function dataset 77 would contain fifteen entries for fence group members in the two fence groups. For each fence group member on each system, the Function dataset specifies, inter alia: the fence member token for each such member, the identification of the system which executes that member, the assigned sub-system authority parameter and the authorization index.

Each entry, such as entry $420_1$, in the software fence table contains two fields: a state field, such as field 422, and a pointer field, such as field 424.

As noted above, the MVS O/S image, specifically the fence servicing routines therein, assigns each sub-system a fence token formed of a fencing IOPID. The fencing IOPID contains a 31-bit index that points to a corresponding entry in the software fence table. As shown, each of the five specific sub-systems 230, 233, 220, 237 and 225, is assigned a corresponding fence token, of which the index values in the fencing IOPIDs ($IOPID_1$, $IOPID_2$ and $IOPID_3$) for the first three sub-systems point, as represented by lines 412, 414 and 416, to entries $420_1$, $420_2$ and $420_3$, respectively in the software fence table. Each software fence table entry can exist in one of four states, as discussed below in conjunction with FIGS. 5 and 11. Suffice it to say at the moment that, for any entry, state field 422, shown in FIG. 4, indicates whether that entry is assigned or not and whether the sub-system associated with that entry is currently being fenced or not.

In order for a member sub-system to request access to shared data—whether on shared DASD or in the SES, that member must present its fence token to its MVS O/S image as part of its I/O request. In turn, the I/O sub-system in the image accesses the corresponding software fence table entry pointed to by the fence token and determines whether the state of the entry indicates that the member sub-system is not fenced. If the member is active, the I/O Supervisor permits the access to proceed. Alternatively if a software level fence has been successfully imposed against this member, then only this target member sub-system is fenced. In this case, the I/O supervisor will fail all access requests emanating from this member.

In requesting a software fence, a requesting sub-system passes its fence member token to the MVS O/S image under which it executes, specifically to the fence servicing routines therein, along with the fence member token of the sub-system to be software fenced. The fence servicing routines will read the Function dataset and locate the fence member entry of the target sub-system. If the requesting member is a valid member of the same fence group as the target member, the MVS O/S image will then establish a software fence around the target sub-system. In doing so, the MVS O/S image will purge all shared data access requests for the target sub-system and notify, via a fence group exit, all resource managers on the target system that the target sub-system is being fenced. As such, each such resource manager will either purge or complete all pending shared data accesses for the target sub-system and thereafter fail any further such access requests emanating from the target sub-system, and suitably notify the MVS O/S image.

As one can appreciate, software fencing requires the MVS O/S image on the system to be active and operational. However, this level of fencing advantageously does not require the hardware fencing facility to exist or be active on the system having the fenced member sub-system. Furthermore, at this level, SES connectivity between the requesting and target sub-systems is also not needed.

Each software fence table entry in table 420 also points, through e.g. pointer field 424 in entry 420$_1$, to a corresponding entry in hardware fence table 440. Through use of the hardware fence table, a granular hardware fence can be established, through the fencing facility, for an entire fence group.

In particular, hardware fence table 440 stores one entry for each different fence group that executes on the system, e.g. system 200$_1$. Each entry in the hardware fence, such as illustratively entry 440$_1$, contains two fields: authorization index (AX) field 442 and sub-system authority parameter field 444. The authorization index field contains a pointer to a corresponding authorization vector element in authorization vector 460 located within fencing facility 44. Each authorization vector element, as discussed in detail below, contains data that identifies a separate granular hardware fenceable entity, in this case a fence group executing on the CPC, e.g. CPC 40$_1$. Authorization vector 460 contains a sequentially numbered set of separate elements 460$_1$, 460$_2$, 460$_3$, . . . 460$_z$. Each of these elements contains a one-byte field, e.g. field 462 in element 460$_1$, which specifies a current state of this element and a 7-byte externally program settable parameter field, e.g. field 464 in element 460$_1$.

At the inception of each fence group as stated above, the fence servicing routines in an MVS O/S image, for a system on which an initial member sub-system of that group resides, create a new value for the sub-system authority parameter and a new entry in the software fence table for this member. In addition, these routines also create a new entry in the hardware fence table for this fence group by assigning a then unassigned value to this group. The O/S image sets the pointer in the new entry in the software fence table for this fence group to point to this new entry in the hardware fence table. Also, the MVS O/S image stores the value of the sub-system authority parameter for this group within this hardware fence table entry. Furthermore, the MVS O/S image also instructs the fencing facility to assign an available (previously unassigned) authorization vector element to this fence group. This is accomplished, through the MVS O/S image and within the fencing facility, by changing the state of this element from "UNASSIGNED" to "ASSIGNED", setting the authorization index (AX) field of the new hardware fence table entry to point to this new element and storing the sub-system authority parameter into the program settable parameter field within this element. As additional members are added to the fence group and hence additional fence member entries are created in the software fence table, the pointer in each of these additional entries is set to point to the single entry in the hardware fence table for this particular group. Through these operations, a unique association is formed within the MVS O/S image and the fencing facility that identifies each fence group and its corresponding members such that any member of this group can be software fenced and the entire group fenced on a granular hardware basis. For the sub-systems specifically shown in FIG. 4, database managers DBM A1 and DBM A2 and transaction manager TM A are all part of a common fence group, FG A. As such, each entry for these sub-systems points, as symbolized by lines 430, to a common entry, e.g. entry 440$_2$, in hardware fence table 440. Hardware fence table entry 440$_2$, in turn, points, as represented by line 450, to a corresponding single vector element, e.g. element 460$_3$, in authorization vector 460 situated within fencing facility 44. Entry 460$_3$ stores the sub-system authority parameter for FG A. Through this association, the fencing facilities, in both a local CPC, e.g. 40$_1$, that contains system 200$_1$, and in all other CPCs that execute members of this fence group, can establish a granular hardware fence to completely isolate FG A on system 200$_1$. Once a granular hardware fence is completely established around this fence group, in a manner discussed in detail below, the fencing facility, i.e. facility 44, in the associated CPC, simply fails every subsequent I/O and coupling facility access operation, into either shared DASD or SES, that presents a fence token that contains the sub-system authority parameter value for FG A.

In implementing a granular hardware fence and to the extent relevant here, a requesting system issues a fencing facility "Isolate Using Index" (IUX) command, via the coupling facility (SES), to a fencing facility on a target CPC. This command includes an index value into the authorization vector to point to the particular authorization vector element that corresponds to the fence group that is to be fenced. This command also contains an "I/O Termination Control" field, the value of which specifies whether all I/O or coupling facility accesses, even including those pending or in progress, are to be terminated, or whether the latter accesses are to continue to completion with only subsequently issued accesses being inhibited. Now, once an IUX command is received at a fencing facility, that facility accesses the authorization vector element specified by the index value in the IUX command, insures the authority parameter specified on the command matches the value in the authorization vector element and changes the state field of that element from "ASSIGNED" to "GRANULAR HARDWARE FENCE IN PROGRESS" (IUX-active). Once the authorization vector element is no longer in an "ASSIGNED" state, the fencing facility will fail any subsequent I/O and coupling facility accesses that present an authorization index for the fenced authorization vector element; hence, the fencing facility has established its portion of the requested fence. If no I/O termination has been requested, the IUX command simply completes. However, if I/O termination has been requested, the fencing facility also starts a termination process for all I/O and coupling facility access operations, either into the shared DASD or the coupling facility, associated with this authorization vector element. This essentially entails using the incoming authorization index field in the command and comparing this value with that present in every pending or in process I/O or coupling facility access into shared data. If a match is found for any of these accesses, then the value of the I/O Termination Control field in the command specifies whether that access is permitted to complete or not. If this control field specifies "command boundary" termination, the fencing facility permits this access to occur up to the next command boundary in a channel program. Alternatively, if immediate I/O termination is specified, then the fencing facility abruptly terminates all such pending or in progress I/O and coupling facility requests. As such, the fencing facility will then change the state field of the particular authorization vector element, for the fence group now fenced, from "GRANULAR HARDWARE FENCE IN PROGRESS" (IUX-active) to "GRANULAR HARDWARE FENCE COMPLETE" (IUX-complete). The fencing facility will also respond to subsequent fence commands for the target authorization index, via the coupling facility, to the requesting system stating that the requested fence has been successfully established. This fence will remain in place until such time when an MVS O/S image requests the authorization vector element to be released, as discussed below in conjunction with FIG. 11, or a system reset occurs. The reader is referred to the Elko et al Fencing applications for a detailed explanation of the operation of fencing facility 44, including its use of the authorization vector and the manner through which this facility is instructed, by an MVS O/S image, to initiate fencing operations.

Figure 5:
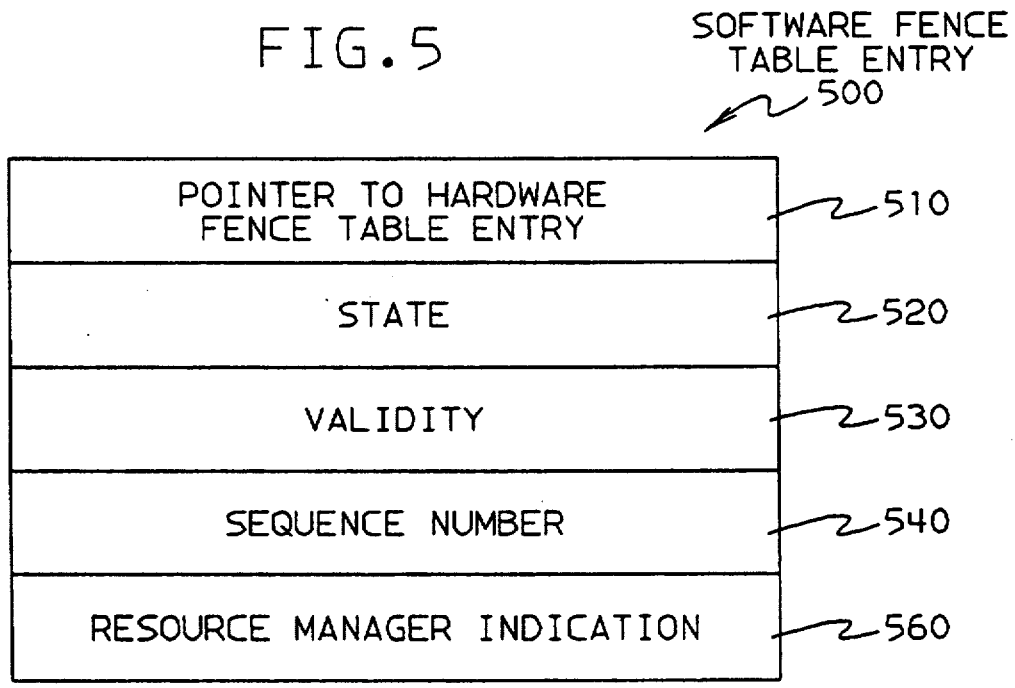
FIG. 5 depicts an illustrative entry in software fence table 420 shown in FIG. 4.

FIG. 5 depicts an illustrative entry in software fence table 420. This entry is formed of five fields: pointer field 510, state field 520, validity field 530, sequence number field 540 and resource manager indication field 560.

Pointer field 510 stores a pointer, as described above, to a single corresponding entry in the hardware fence table. As indicated in FIG. 4 and discussed above, multiple software table entries can point to the same hardware fence table entry in order to fence, through a single granular hardware fence operation, multiple sub-systems (i.e. a fence group), on a common CPC, that all share data.

Figure 11:
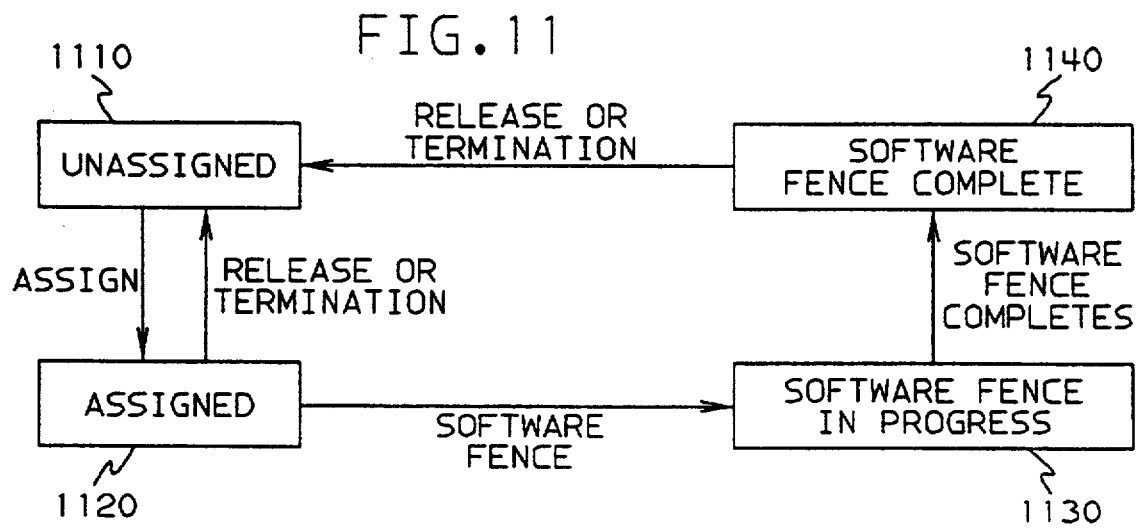
FIG. 11 depicts a state diagram of any entry in software fence table 420 shown, e.g., in FIG. 4.

State field 520, shown in FIG. 5, indicates the state of the entry in the software fence table and, where appropriate, the state of the corresponding sub-system. Through the status of the state field, the MVS O/S image can prevent I/O operations of a sub-system in a manner which is similar to that conventionally provided in the MVS operating system. Any software fence table entry can exist in one of four states, as shown in FIG. 11: "UNASSIGNED" state 1110, "ASSIGNED" state 1120, "SOFTWARE FENCE IN PROGRESS" state 1130 and "SOFTWARE FENCE COMPLETE" state 1140. An entry in the software fence table can only be assigned to a sub-system and incorporated into a fence group, thereby yielding a corresponding fence token, if that entry then exists in the "UNASSIGNED" state. Once a sub-system is incorporated into a corresponding fence group, that entry is said to be "assigned" to that component and thus has its state changed by the fence servicing routines from "UNASSIGNED" to "ASSIGNED". Once an entry, and hence the corresponding fence token, is assigned to a sub-system, the state can only be changed back to "UNASSIGNED" if the sub-system is released from the fence group. Such a release can happen either prior to the occurrence of a fence request targeted to that member or after the fence has been established therefor. Apart from being released, an entry and the associated fence token can both be unassigned from a corresponding sub-system and fence group upon an explicit request by that sub-system to be deleted from the fence group or upon termination of the sub-system itself. In both of these cases, the sub-system must have permanently stopped using the fence token and will not undertake any subsequent I/O or SES operations using the same fencing IOPID. With this in mind, once a sub-system is software fenced, that sub-system remains fenced until it acquires a new corresponding entry in the software fence table and hence a new fence token. Now, whenever a fence request has been issued against a target member, the state of the corresponding entry in the software fence table is then changed by the fence servicing routines from "ASSIGNED" to "SOFTWARE FENCE IN PROGRESS". Once this request completes and a software fence is completely established against that member, the fence servicing routines changes the state of the corresponding entry in the software fence table from "SOFTWARE FENCE IN PROGRESS" to "SOFTWARE FENCE COMPLETE". Prior to undertaking an I/O or coupling facility request from a fence group member, the MVS O/S image, specifically an I/O sub-system or coupling facility access service routine therein, will accept the fence token for this member and determine, through state field 520, as shown in FIG. 5, in the corresponding entry in the software fence table, whether this member is fenced, i.e. prevented from accessing shared data, or not and will accordingly accept or fail an I/O or coupling facility request therefrom.

Validity field 530 in entry 500 shown in FIG. 5, is appropriately set by the fence servicing routines, to merely signify whether this entry is valid or not. Doing so enables the fence servicing routines to readily determine which entries are in use. Those entries with a "1" stored in the validity field are valid and in use; those with a "0" stored in this field are not in use. In that regard, a fencing operation can only be initiated against a target fence group member if the corresponding software fence table entry for that member is valid.

Sequence number field 540 is merely an appropriately incremented number that imparts sufficient uniqueness to each software table entry. Specifically, during initialization of the O/S image, the sequence number in each entry in the software fence table is set to zero. Thereafter, whenever an entry is selected and assigned to a member, the sequence number is read from that entry, incremented by one and stored back into that entry. Thereafter, as that entry is released and then re-assigned, the sequence number is incremented by one, and so at each subsequent re-assignment. Use of this sequence number readily permits software fence table entries to be re-assigned but with sufficient uniqueness imparted to each such entry.

Within entry 500, resource manager indication field 560 specifies whether a fence group member, identified by this entry, is a resource manager or not. This field is set, as described below, by the fence servicing routines when this member is first incorporated into a corresponding fence group. A resource manager is assigned its own specific software fence token. A resource manager accesses shared data on behalf of multiple clients. The need to differentiate between fence group members based upon whether they are resource managers or not arises in situations where accesses for several different user processes are combined into one physical I/O or coupling facility operation. Assigning a unique software fence token to a resource manager permits all user processes that undertake common I/O or coupling facility accesses through that manager to continue normal operation, by virtue of having presented the fence token of the resource manager for these accesses, if another fence group member is fenced. In particular, to implement a software fence against a fence group member that is not a resource manager, the MVS O/S image, in conjunction with the fence servicing routines, notifies the resource manager(s) in the fence group on the target system that this member is being fenced. As such, the resource manager(s) must complete or purge all I/O and coupling facility accesses on behalf of this member. Thereafter, the resource manager(s) will prevent all subsequent I/O and coupling facility accesses that involve this member from being processed. Once these steps are taken, the resource manager(s) provides a fence exit response to the MVS O/S image. Once the image has received such exit responses from all resource managers, on the target system in the target fence group, then the fence operation is complete. However, the resource manager will permit I/O or coupling facility accesses to be processed for non-fenced members of that group. Alternatively, if the system is not operational or is temporarily stopped, then a hardware fence is initiated against the system in which case both a fence group member and all resource managers in the system which serve it are simultaneously fenced. This increases integrity of the shared data by halting all I/O and coupling facility requests issued by a resource manager on behalf of the fenced member.

Figure 14:
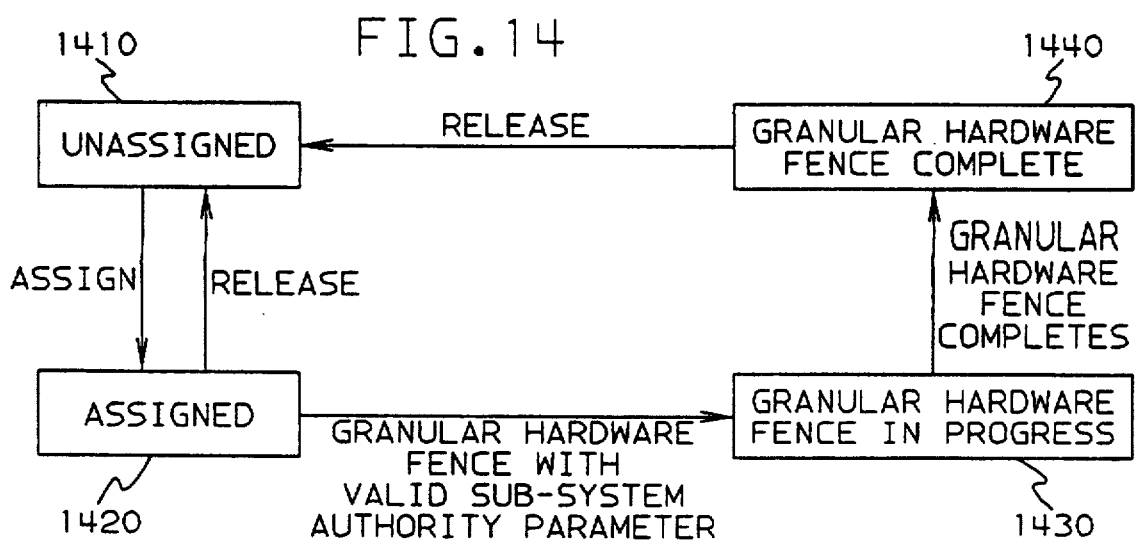
FIG. 14 depicts a state diagram of any authorization vector element in, e.g., fencing facility 44 shown in FIG. 4.

As discussed below and evident in FIG. 14, each authorization vector element in the fencing facility has a similar set of states to that of a software fence table entry. This facilitates single system communication on authorization vector element reassignment.

As shown, an authorization vector element can exist in one of four states: "UNASSIGNED" state 1410, "ASSIGNED" state 1420, "GRANULAR HARDWARE FENCE IN PROGRESS" state 1430 and "GRANULAR HARDWARE FENCE COMPLETE" state 1440. That element can only be assigned to a fence group, if that element then exists in the "UNASSIGNED" state. Once assigned, that element has its state changed from "ASSIGNED" to "UNASSIGNED" by commands processed by the fencing facility. Once an element is assigned to a fence group, the state can only be changed back to "UNASSIGNED" if that element is released. Such a release can happen only when all the sub-systems in the fence group on the system have themselves explicitly released their fence tokens (i.e. these sub-systems have been explicitly released from the fence group) or have terminated. When a granular hardware fence is initiated, as discussed above through issuance of an IUX command to the fencing facility, this facility changes the state of the associated authorization vector element from "ASSIGNED" to "GRANULAR HARDWARE FENCE IN PROGRESS". Thereafter, in view of the granular hardware fence state of this authorization vector element, fencing facility 44 will simply fail any subsequent I/O and SES access operations, into shared data, that present an authorization index for this fence group and a sub-system authority parameter value that matches that stored in the corresponding authorization vector element for the fence group and pointed to by the supplied authorization index. Once the granular hardware fence has been established, i.e. all pending or in process I/O or coupling facility accesses have either completed or have been terminated, the fencing facility changes the state of the associated authorization vector element to "GRANULAR HARDWARE FENCE COMPLETE". The authorization vector element will remain in the "GRANULAR HARDWARE FENCE COMPLETE" state until this element is released through the specific fashion noted above.

As noted above, the Function dataset, resident on a shared DASD and accessible to each and every system in the sysplex, stores information which defines each fence group in the sysplex and accompanying escalation policy data. This data delineates when fencing actions should be escalated from one level to another and how the escalation is to proceed. Storing the information in this commonly accessible dataset permits the fence servicing routines in each MVS O/S image to obtain the fence member token, sub-system authority parameter and authorization index for any fence group in the sysplex, and the location of each member in that group, in the event any system on the sysplex needs to initiate fencing action against that group.

In particular, FIG. 6 depicts illustrative table 600 resident in the Function dataset for the illustrative fence groups shown in FIG. 2 and discussed above. Table 600, as shown in FIG. 6, delineates, inter alia, each fence group in the sysplex, here assumed to be FG A and FG B, and for each such group lists its fence group members, and for each such fence group member: the system on which that member executes, the fence member token, the authorization index, the state of the corresponding entry in the Function dataset and the sub-system authority parameter value. To facilitate unique access into the table, each fence group member must have a unique name within its fence group. For example, FG A is listed, in data 610, as containing nine unique members: DBM A1 (S1), DBM A2 (S1), TM A (S1), DBM A1 (S2), DBM A2 (S2), TM A (S2), DBM A1 (S3), DBM A2 (S3) and TM A (S3). For illustrative fence group member DBM A1 (S1), data 610 specifies the corresponding system as SYS 1, the corresponding fence member token as 00010001 00000007, the corresponding authorization index as 03, the state of the corresponding Function dataset entry as active ("A"), and the sub-system authority parameter as FFA7B42C 130125; and so on for other such members. Inasmuch as the members of FG A collectively reside on three different systems and hence point to entries in three different hardware fence tables, the nine members of FG A have three different authorization indices and sub-system authority parameter values. Similar entries, to that shown in data 610, exist, as data 620, for the six fence group members in fence group FG B. Each entry in the Function dataset can exist in any one of the following states: "ACTIVE", "UNASSIGNED" or "FENCED", with the state thereof being changed as described in detail below.

In addition, table 600 contains escalation policy data 630. In general, this data specifies, for each lowest level fenceable entity (here a fence group member), whether the scope of fencing can be escalated to a higher level(s) and to what particular fencing level(s). If, as here, the lowest level fenceable entity is an individual fence group member, fencing can occur, if permitted and as discussed above, to two higher levels: an entire fence group on a particular system that contains that member, and the entire system that executes members of that fence group. Given this, certain permissible fencing policy actions (escalation rules) can be defined, starting at a member level: escalating to a fence group level but no further; escalating first to a fence group level and then, if necessary, to a system level; and no escalation at all. If no escalation is selected, then a request for higher level fencing would simply be failed. In addition, if desired, a fencing level, specifically the fence group level, can be intentionally skipped, with fencing being escalated from a fence member directly to a system level. Not every fence group needs to have a predefined set of escalation rules. In this case, the default chosen for each escalation rule is simply "NO". Using "NO" as a default value ensures that the scope of a fencing action can not extend beyond a single target fence group member without the knowledge and permission of a system administrator. Once a fencing policy, i.e. the escalation rules, are appropriately defined by the system administrator, the administrator instructs an operator to activate the fencing policy that contains these escalation rules. Only after the policy is activated will the administrative definitions contained therein be actively and dynamically used to establish fences and fencing decisions in a sysplex. Of course, an operator has the capability to deactivate an active fencing policy or make a different defined administrative policy definition the active policy. Consequently, the operator can dynamically change the active fencing policy over time in a non-disruptive manner to respond to changes in availability requirements of the installation.

Now, with respect to data 630, although fence groups FG A and FG B collectively contain fifteen separate members and hence this data could contain fifteen or fewer entries, to simplify the figure, data 630 is specifically shown as containing only four such illustrative entries. Hence, the other entries would take the default policy of no escalation. As shown, fencing for member DBM A1 (S1) in fence group FG A is permitted to be escalated to a fence group level, i.e. to encompass FG A on SYS 1, but proceed no further. Alternatively, for member DBM A2 (S2) in this same fence group, group level fencing is skipped for this member with fencing proceeding directly from the member level to the system level. Furthermore, for member TM A (S1) in fence group FG A, fencing is permitted to escalate from the member level to the fence group level, and, if necessary, escalate further to the system level. Lastly, for member DBM B (S1) in fence group FG B, fencing escalation is not permitted at all.

Figure 7:
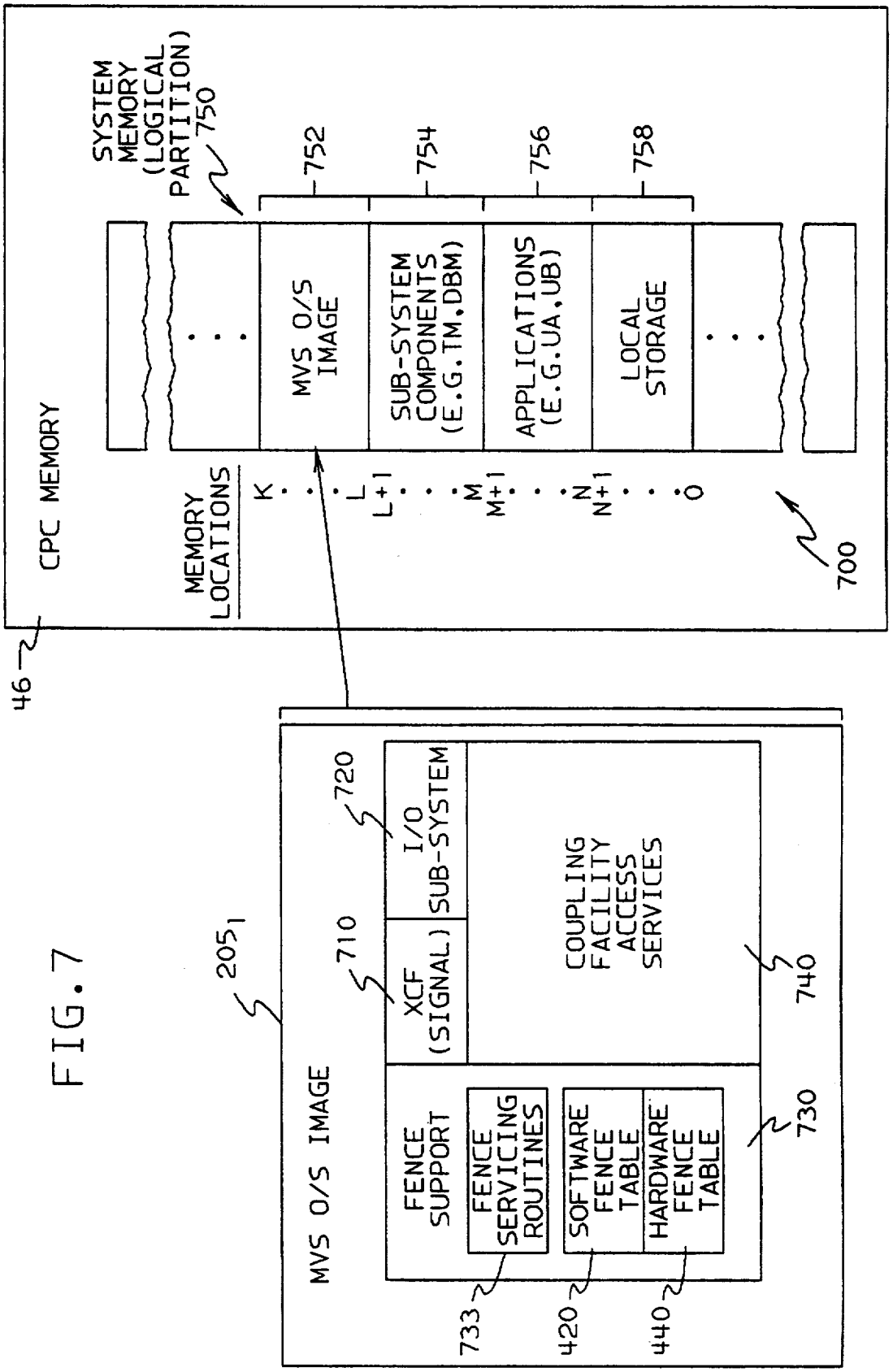
FIG. 7 depicts various MVS operating system components that are used, in conjunction with a coupling facility, in implementing our inventive fencing technique and a memory map for a typical system executing within a CPC.

FIG. 7 depicts various MVS operating system components that are used, in conjunction with a coupling facility, in implementing our inventive fencing technique and memory map 700 for a typical system executing within a CPC, e.g. CPC $40_1$.

An MVS O/S image, e.g. image $205_1$, particularly one designed to access a coupling facility, such as SES 70 (see FIG. 1), contains, among other components not relevant here, XCF component 710, I/O sub-system component 720, fence support component 730 and coupling facility access services component 740. XCF component 710 provides a signaling ability to one, i.e. a source, program executing in a sysplex to transfer information to another such program, i.e. a target program, over a link, regardless of where the source and target programs are located and the specific coupling technology, e.g. a conventional CTC (channel-to-channel) link or a SES, then being used in the sysplex. Since this component is well known, for the sake of brevity, this component will not be discussed in any further detail. For such details, the reader is referred to: *Application Development Reference Services for Authorized Assembler Language Programs*, IBM Publication No. GC28-1648. In addition, for details concerning a CTC link, the reader is referred to: *IBM Channel-to-Channel Adapter*, IBM Publication No. SA22-7091. In any event, any one of a variety of transport mechanisms, such as a SES or a CTC link, that can communicate a message, on an inter-program basis, to a target program can be used in conjunction with my inventive fencing technique to transport a software fence request. I/O sub-system component 720 is conventional and controls access to I/O attachments and controls data and control passing between these attachments and O/S image $205_1$. Coupling facility access services component 740 controls access to and message and control passing between SES 70 (see FIG. 1) and O/S image $205_1$. Inasmuch as the details of components 720 and 740, shown in FIG. 7, are also not relevant to the present invention, they will not be discussed in any detail herein.

Fence support component 730 contains software fence table 420, hardware fence table 440 and fence servicing routines 733, these routines being discussed in further detail below in conjunction with FIGS. 9A-9C, 10A-10C, 12, 13A-13C and 15A-15E. In essence, routines 733, shown in FIG. 7, assign sub-system(s) that execute against image 2051 to a user specified fence group(s); terminate fence processing and release a member(s) from fence group(s); issue, when needed, appropriate software level fence requests to other systems; and execute software fence requests that originate within routines 733 and, through fencing facility 44 (see FIG. 1), higher level fence requests that originate within routines 733 either within image $205_1$ or in another such image in the sysplex.

As shown in memory map 700 in FIG. 7, available CPC memory (CPC memory 46 as shown in FIG. 1) is divided into logical partitions with one such partition, here for example partition 750 shown in FIG. 7, being allocated to each system thereby forming a system memory. The partition is simplistically shown as a sequence of memory locations having increasing memory addresses. These locations store: MVS O/S image itself, e.g. image $205_1$, in illustrative memory locations k through l that collectively form memory space 752, sub-system components (e.g. transaction and database managers) in illustrative memory locations l+1 through m that collectively form memory space 754, application software (e.g. transaction applications UA and UB) in memory locations m+1 through n that collectively form memory space 756; with local temporary storage being assigned to illustrative memory locations n+1 through o which collectively forms memory space 758; where k, l, m, n and o are all integer memory addresses. While being illustrative, this memory map is grossly simplified particularly with respect to the manner in which the operating system image is stored. In that regard, the O/S image is shown as occupying contiguous locations in a logical partition; though in reality it does not and has a far more complex layout than that shown.

Figure 8:
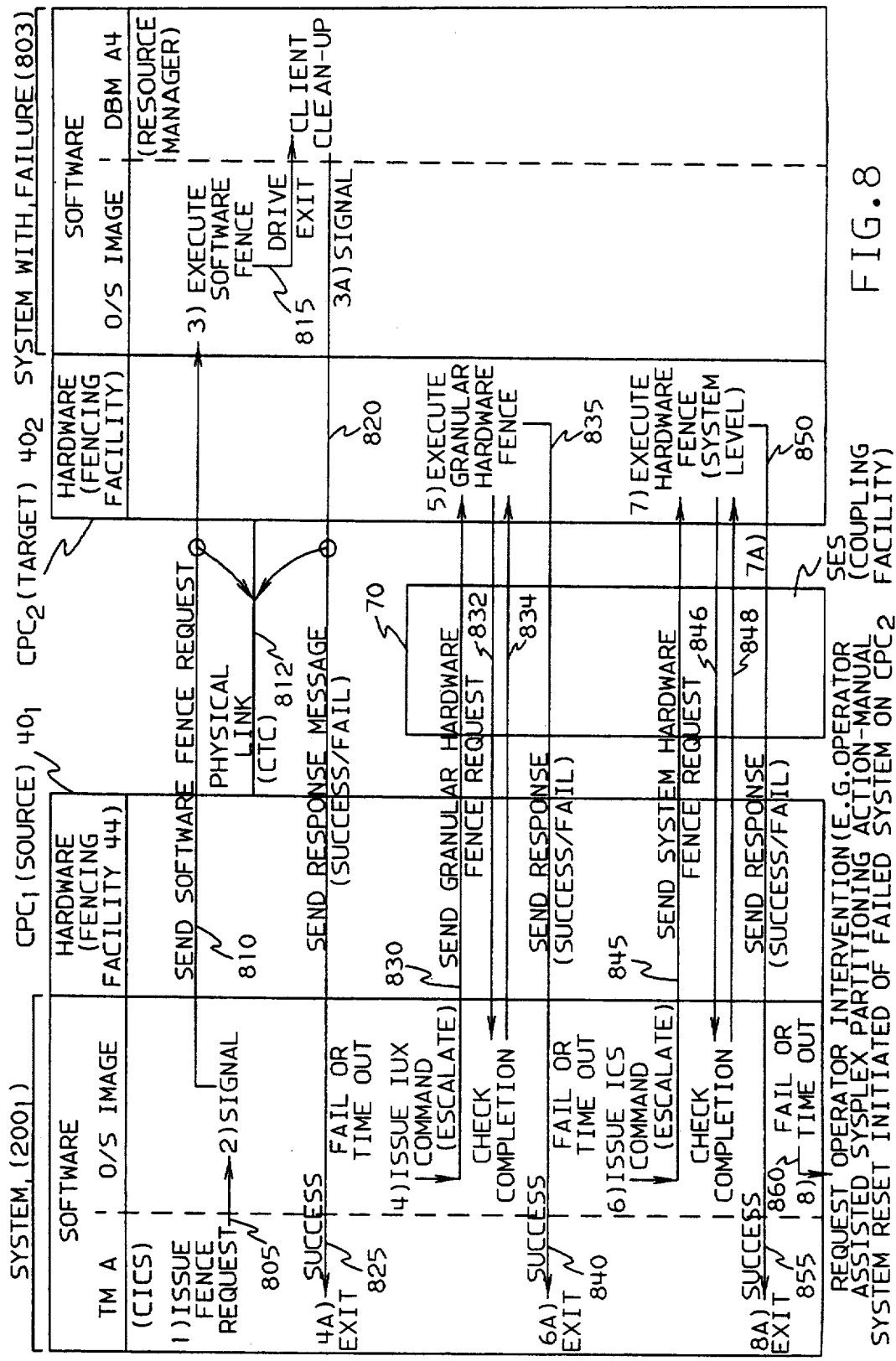
FIG. 8 diagrammatically depicts, at a high and simplified level, illustrative inter-system communication that occurs within sysplex 5 to effectuate our inventive hierarchical fencing technique including fencing escalation.

With the above in mind, FIG. 8 diagrammatically depicts, at a high and simplified level, illustrative inter-system communication that occurs within sysplex 5 to effectuate our inventive hierarchical fencing technique including fencing escalation.

Since every fence request originates on a CPC, consider CPC 1 (CPC $40_1$) as a source CPC; since every fence request is targeted to a CPC and particularly a member, system or sub-system thereon, consider CPC 2 (CPC $40_2$) as a target CPC. Furthermore, assume a fence group extends across these two CPCs and encompasses fence group member TM A, which can be a CICS or IMS transaction manager, executing in system $200_1$ and fence group member DBM A4 executing in system 803. As will be discussed below in conjunction with the fence servicing routines, fencing actions extend to each and every CPC in a sysplex where a member of a fence group resides. However, to simplify the figure and the ensuing discussion we will only consider a sysplex, in conjunction with FIG. 8, as containing just two CPCs: source CPC $40_1$ and target CPC $40_2$.

If sub-system TM A detects, as described above, that sub-system DBM A4 has failed, e.g. stalled, the former issues, as symbolized by ①) and through the fence servicing routines, a software fence request against sub-system DBM A4. This request is directed, as symbolized by line 805, to the associated source MVS O/S image on system $200_1$. Since target sub-system DBM A4 resides on a different CPC than source CPC $40_1$, O/S image $200_1$ fabricates an inter-program message, as symbolized by ②, containing this fence request and directs this message, as symbolized by line 810 over illustratively a CTC signaling link, e.g., physical link 812, to the target CPC. Once this message reaches the MVS O/S image on target system 803, that image, through its fence servicing routines, attempts to execute a software fence, as symbolized by ③, against sub-system DBM A4. This entails preventing/quiesing all current and subsequent I/O and coupling facility accesses that would otherwise emanate from sub-system DBM A4. This attempt may require further compliance of various sub-system/system components which are resource manager members of the same fence group. If any of these sub-systems or components is not operational or otherwise unable to process the software fence request, the request fails.

While processing the fence request, control is given through a driven exit, as indicated by line 815, to a clean-up process. This clean-up entails, for example, notifying all other resource manager members in the fence group on the target system that sub-system DBM A4 is being fenced. The resource manager clean-up process prevents/quiesces all current and subsequent I/O and coupling facility accesses for sub-system DBM A4 now being fenced. Once the clean-up process is complete, a response message, here symbolized by 3A , is communicated back from the target MVS O/S image, via the CTC link and as symbolized by line 820, to the source MVS O/S image. In the meantime, once the source O/S image issues a fence request, this O/S image then waits a pre-defined amount of time, i.e. a time-out interval, for a response to arrive back from the target system. The amount of time in this interval is empirically chosen to be sufficiently responsive to fence requests. The value of this interval may be: hardcoded into the MVS O/S image, an installation specified external values, a function of other values or the like. If this response arrives within the time-out interval and indicates that the software fence was successfully established, then the fencing operation is completed and execution exits from the fence servicing routines, as indicated by 4A and line 825. Alternatively, if a response did not arrive during the time-out interval or the response that did arrive indicated that the fence request failed, then the source MVS O/S image, specifically the fence servicing routines, will consult the active fencing policy (see FIG. 6 and discussed in detail below) stored within the Function dataset) to determine whether fencing escalation is permitted for the member being fenced, here DBM A4, to a granular hardware (fence group) or hardware system level.

If there is no explicit escalation rule for this fence group member or if the escalation rule is "NO" for hardware fencing, whether at the fence group or system level, the fence request is simply failed by MVS O/S image $205_1$ without further processing. Alternatively, if the escalation rule for this fence group member is SKIP, the fence request continues with determining whether hardware fencing at the system level is permitted. If this level fencing is permitted, fencing occurs at this level. Otherwise, if the escalation rule for this particular fence group member indicates "YES" for group level fencing, i.e. granular hardware fencing, then fencing proceeds at this particular level.

Now, assuming granular hardware fencing is explicitly permitted by the policy, particularly the escalation rules, then, in view of the failure of the software fence attempt, escalation is attempted to the fence group level. In the example shown in FIG. 8, to request a granular hardware fence around a fence group containing member DBM A4, O/S image $205_1$ issues an IUX command, as symbolized by ④, to the fencing facility on the target CPC. As noted above, this command specifies an index value, into the authorization vector in this target fencing facility, that points to the particular authorization vector element corresponding to the fence group that is to be fenced. This command is communicated, as symbolized by line 830, through SES 70 to the fencing facility on the target CPC. Of particular note, the IUX command is implemented by a micro-coded function within a fencing facility in a CPC, thus not requiring O/S image participation in its execution. In response to this command, this fencing facility will attempt to prevent, as symbolized by ⑤, all future I/O and coupling facility accesses for all the members of the fence group being fenced on the target CPC. As discussed above, pending and in-progress I/O and coupling facility accesses will either be permitted to complete or be terminated in accordance with a value then specified in an I/O Termination Control field situated within this command. The target fencing facility will also return, as symbolized by line 832, a suitable response message back, via the SES, to the source MVS O/S image to indicate that the fencing facility has initiated these operations. If this response message is not received by the source MVS O/S image, the fencing request is failed.

Once the source O/S image receives this response message from the target CPC, that image will again wait a pre-determined amount of time, i.e. another time-out interval, to permit all in-progress I/O and coupling facility accesses to complete normally. Once this interval has expired, the source O/S image will send another granular hardware fence request, as symbolized by line 834, via the SES to the target fencing facility. In response to this request, the target fencing facility terminates any remaining I/O and coupling facility accesses that are then in-progress for all the fence group members that execute in the target system and are situated in the fence group being fenced. Again, the source MVS O/S image waits a pre-determined amount of time for the fence request to complete. Completion of this request is received, via line 835 and the SES, from the target fencing facility. If the response, as symbolized by 5A , occurs within this time interval and indicates that this fence operation was successfully completed, then granular hardware fencing is complete. As such, execution exits from the fence servicing routines, as indicated by 6A and line 840. Alternatively, if the response did not occur within this interval or indicated that the granular hardware fence operation failed, source MVS O/S image 205₁, specifically the fence servicing routines therein, will again consult the active fencing policy stored within the Function dataset to determine whether fencing escalation is permitted for the member being fenced, here DBM A4, from a granular hardware fence to a system level (i.e. system partitioning).

At the system level, if there is no explicit escalation rule for this fence group member or if the escalation rule therefor is "NO" or "SKIP" for system partitioning, the fence request is simply failed by MVS O/S image 205₁ without further processing. Alternatively, if the policy specifies "YES" for system level fencing, then fencing proceeds at this level.

Now, assuming system partitioning is explicitly permitted by the fencing policy, then, in view of either the failure of the granular hardware fence attempt or a policy specification to skip the granular hardware fence, escalation is attempted to the system level. In the example shown in FIG. 8, to request a system level fence around the target system executing member DBM A4, O/S image 205₁ issues an Isolate Channel Sub-system (ICS) command, as symbolized by ⑥ in FIG. 8, to the fencing facility on the target CPC. This command is communicated, as symbolized by line 845, through SES 70 to the fencing facility on the target CPC. Of particular note, the ICS command is also implemented by a micro-coded function within a fencing facility in a CPC, thus not requiring O/S image participation in its execution. In response to this particular command, as symbolized by ⑦, the target fencing facility attempts to prevent all future I/O and coupling facility accesses on the target CPC for the system being fenced. The target fencing facility also returns, as symbolized by line 846, a suitable response message back, via the SES, to the source MVS O/S image to indicate that the fencing facility has initiated these operations. If this response message is not received by the source MVS O/S image, the fencing request is failed.

Once the source O/S image receives the response message from the target CPC, that image will again wait a pre-determined amount of time, i.e. another timeout interval, to again permit all in-progress I/O and coupling facility accesses issued by the system being fenced to complete normally. Once this interval has expired, the source O/S image will send another system level hardware fence request, as symbolized by line 848, via SES 70 to the target fencing facility. In response to this request, the target fencing facility terminates any remaining I/O and coupling facility accesses that are then in-progress for the entire system being fenced and then performs an I/O reset of this system. Once these operations are performed, the target fencing facility returns a completion message back, via SES 70 and as symbolized by line 850, to the source MVS O/S image. Again, the source MVS O/S image waits a pre-determined amount of time for this completion message to be received, from the target fencing facility. If the response, as symbolized by 7A, occurs with this time interval and indicates that this fence operation was successfully completed, then system level hardware fencing is complete. As such, execution exits from the fence servicing routines, as indicated by 8A and line 855. Alternatively, if the response did not occur within this interval or indicated that the system level hardware fence operation failed, then no further policy-driven fencing escalation exists. As such, source MVS O/S image 205₁, specifically the fence servicing routines therein, will seek operator intervention, as symbolized by ⑧ and line 860, to perform a sysplex partitioning to remove the target system from the sysplex. As part of this task, the operator will be required to manually perform, on CPC 40₂, a system reset on the target system and to manually acknowledge to the target MVS O/S image that this action has been performed.

At this point, with the above hardware and operational descriptions in mind, we will now describe the fence servicing routines in detail. These routines are: Assign Fence Group Member Routine 900 (shown in FIGS. 9A-9C) which establishes a new fence group member; Fence Group Member Termination Processing and Release Fence Group Member Routine 1000 (shown in FIGS. 10A-10C) which terminates fence processing and releases a member from a fence group; Fence Group Member Notification Routine 1200 (shown in FIG. 12) which notifies all fence group members of a new fence group event; Software Fence Request Routine 1300 (shown in FIGS. 13A-13C) which processes a software fence request; and Remote Fence Request Servicing Routine 1500 (shown in FIGS. 15A-15E) which processes an incoming fence request from another system, i.e. a source system. Although these routines execute on each and every system that is able to access shared data, for a frame of reference in facilitating understanding, these routines will be specifically discussed in the context of executing under a specific source MVS O/S image, illustratively image 205₁ shown in FIG. 7, in a corresponding system, here system 200₁.

Figure 9B:
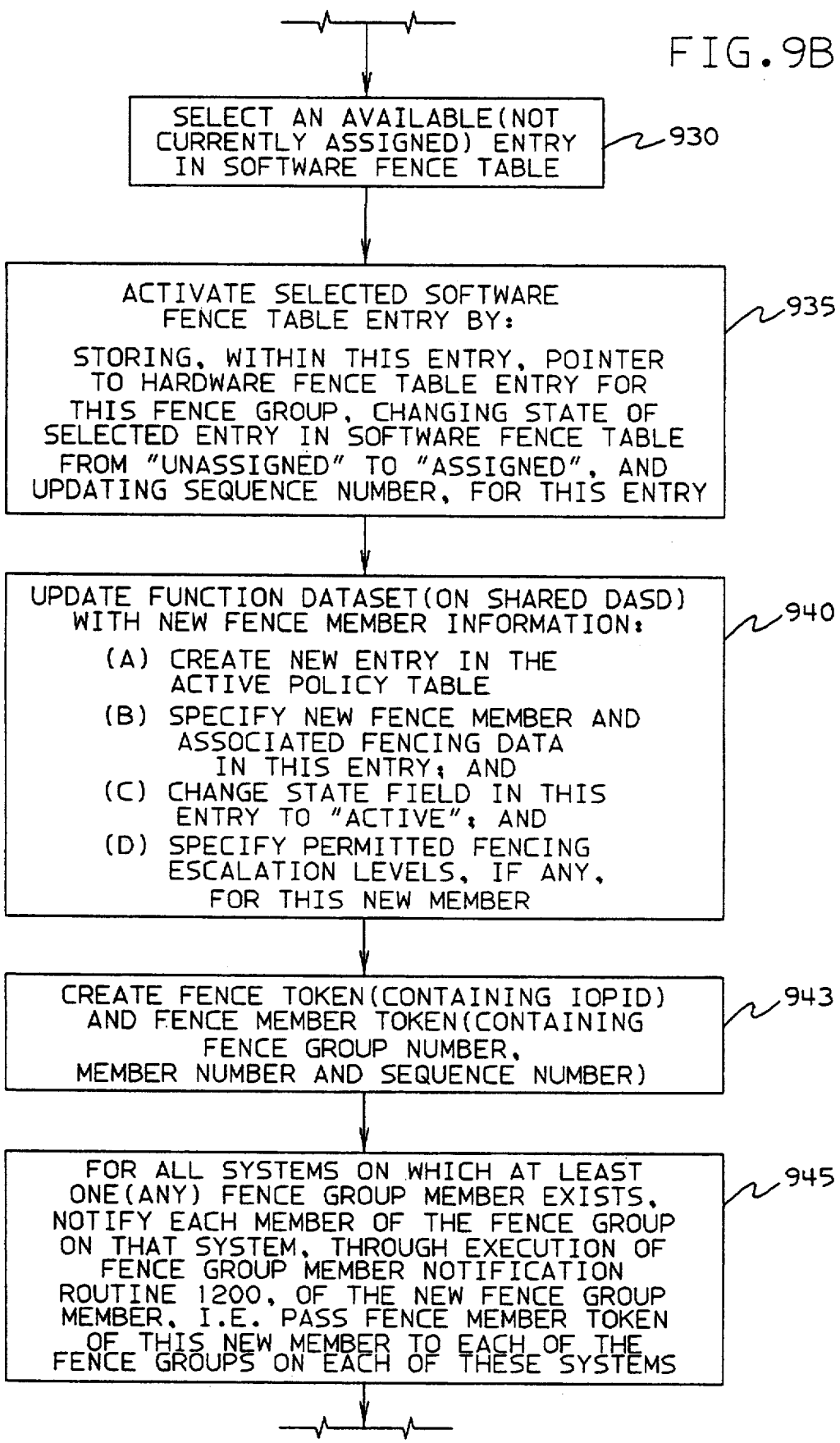
Figure 9C:
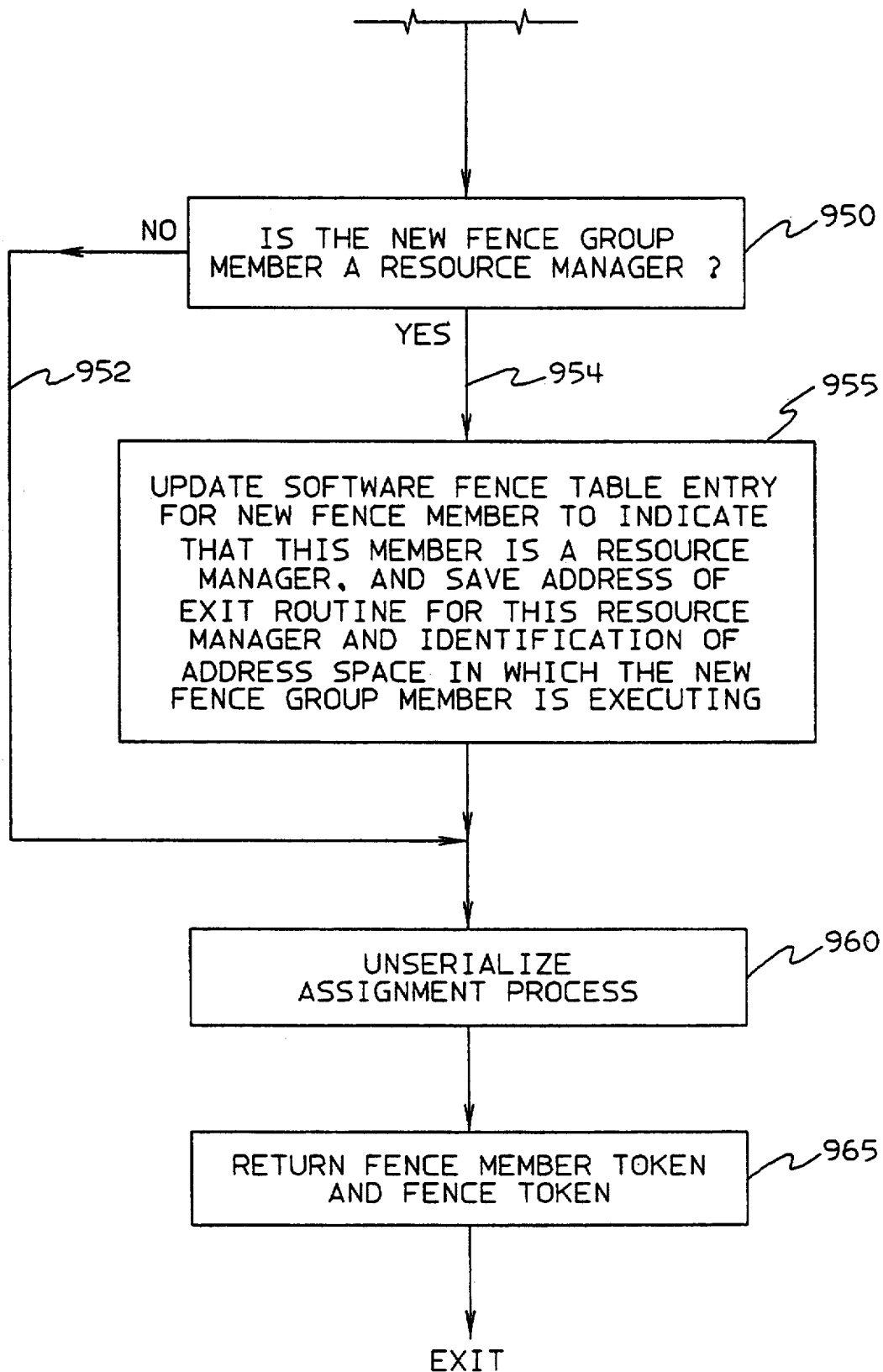

A high level flowchart of Assign Fence Group Member Routine 900 is collectively depicted in FIGS. 9A-9C; for which the correct alignment of the drawing sheets for these figures is shown in FIG. 9. As noted above, this routine establishes a new fence group member.

Specifically, upon entry into routine 900, execution first proceeds to block 905. This block, when executed, serializes all pending assignment requests that are to execute on MVS O/S image 205₁. This ensures that, for any number of sub-systems then requesting assignment to a fence group, only one of these requests is processed at that time. Consequently, only one update is made to a corresponding software fence table, hardware fence table and fencing facility authorization vector at a time thereby preserving the integrity of the data stored therein. After all pending requests have been serialized, execution proceeds to decision block 910. This decision block, when executed, determines whether the current requesting member to be added to a desired fence group is to be the first member of this group on the system, here system 200₁, where routine 900 is being executed. If this current member is to be the first member in the fence group, then execution proceeds, via YES path 914 emanating from decision block 910, to block 915. This latter block, when executed, creates a sub-system authority parameter value for this fence group. This value is created, as discussed above, using the system clock. Once this parameter value has been created, execution proceeds to block 920. This latter block selects an available (unassigned) entry (here an element) in the authorization vector in the hardware fencing facility, e.g. facility 44 shown in FIG. 4. After this element has been selected, block 925, shown in FIGS. 9A-9C, is executed. This block activates the selected element by storing the newly created sub-system authority parameter value for this new fence group into this element and changing the status of this element, as stored in the state field thereof, from "UNASSIGNED" to "ASSIGNED". As discussed in detail above, only one element exists in the authorization vector for each fence group that will access shared data through fencing facility 44. Once execution for block 925 completes, execution then proceeds to block 927. Block 927, when executed, first selects an available entry in the hardware fence table. As discussed above, one such entry in the hardware fence table is used for each fence group that encompasses system $200_1$. Once such an entry is selected in the hardware fence table, thereafter, the newly created sub-system authority parameter value is stored within this selected entry. Then, the index in this entry is set to point to the selected element in the authorization vector in the hardware fencing facility. Thereafter, execution proceeds to block 930. Execution also proceeds to block 930, via NO path 912 that emanates from decision block 910, in the event that the fence group already exists, in which case the current requesting member will not be the first member in this fence group.

Block 930, when executed, selects an available entry in the software fence table which will correspond to the current requesting member. As discussed above, one entry exists in the software fence table for each and every member of every fence group that has members executing within system $200_1$. As an aside, the software fence table is created at system initialization to contain an arbitrary number of entries which are sufficiently numerous to specify a relatively large number of fence group members on a single system. In any event, once an appropriate entry has been selected, execution proceeds, as shown in FIGS. 9A-9C, to block 935. This particular block, when executed, activates the selected entry in the software fence table by storing a pointer, within this entry, to the corresponding hardware fence table entry for the fence group that is to contain the current requesting member; changing the state of the new entry from "UNASSIGNED" to "ASSIGNED"; changing the validity field in this entry to indicate this entry is valid and in use; and updating the sequence number, as discussed above, in this new entry to reflect this current requesting member. Once these operations have occurred, execution proceeds to block 940. This block, when executed, updates the Function dataset to reflect that the current requesting member has been assigned to a particular fence group. This updating entails: (a) creating a new entry in the active policy table for this member; (b) appropriately completing this entry to reflect the fence group to which this member is assigned, and for the member itself: the system on which this member executes, the authorization index for this member, the fence member token and the sub-system authority parameter value; (c) changing a state field in this entry to indicate that this entry is active; and (d) specifying permitted fencing escalation levels, if any, for the new member.

Once the Function dataset has been updated, execution proceeds to block 943. When executed, block 943 creates the fence token (containing the IOPID for this new member) and the fence member token (containing the fence group number, member number and appropriate sequence number —all as discussed in detail above). Once these tokens are created, execution proceeds to block 945. This block, when executed, notifies each member of the fence group, regardless of the particular system on which that member executes, through execution of Fence Group Notification Routine 1200, that a new member, i.e. the current requesting member, has joined the fence group. This notification includes passing the fence member token of the new member to the fence group on each of these systems.

Thereafter, execution proceeds to decision block 950. This block, when executed, determines if the new fence group member, i.e. the current requesting member, is a resource manager. If it is a resource manager, then execution proceeds, along YES path 954 emanating from this block, to block 955. This latter block updates the software fence table, specifically the entry for this new member, to indicate that this member is a resource manager. In addition, an address of an exit routine, which is capable of initiating quiesce/termination of all I/O and coupling facility accesses issued by this resource manager for a fence group member, is also saved. In addition, an identification of an address space in which the new fence group member is executing is also saved. Once these operations are complete, execution proceeds to block 960. Execution also reaches block 960, via NO path 952 that emanates from decision block 950, in the event the current requesting member is not a resource manager. Block 960, when executed, unserializes the assignment process, thereby freeing any assignment requests and processes that were delayed through the serialization which occurred through execution of block 905. Once block 960 has executed, execution proceeds to block 965 which returns the fence member token and the fence token for the new fence group member. These tokens are stored by the MVS O/S image and new fence group member for subsequent use in undertaking I/O and SES accesses and initiating fence requests. After both of these tokens are returned, execution exits from routine 900.

Figure 10B:
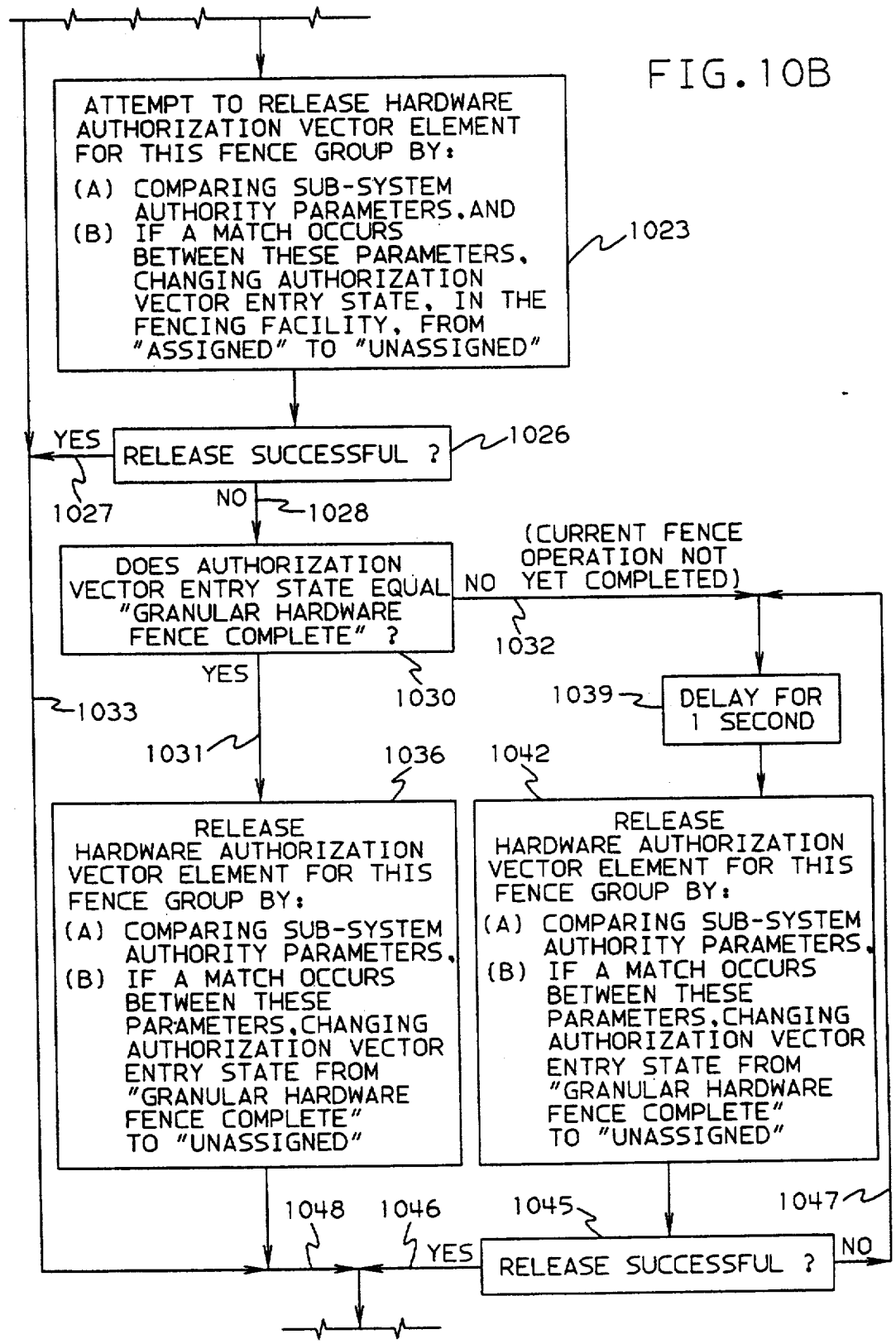
Figure 10C:
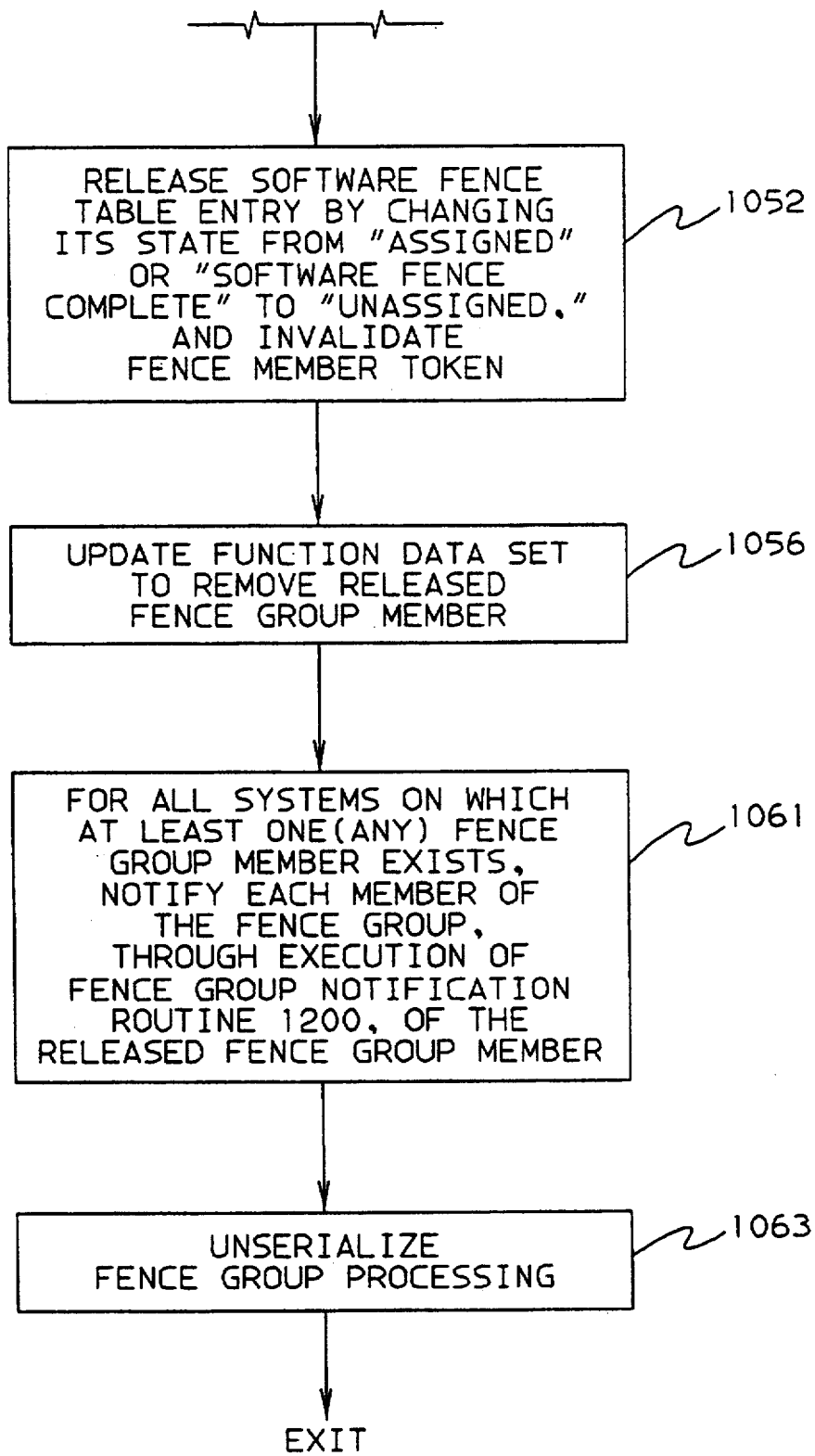

A high level flowchart of Fence Group Member Termination Processing and Release Fence Group Member Routine 1000 is collectively depicted in FIGS. 10A-10C; for which the correct alignment of the drawing sheets for these figures is shown in FIG. 10. As noted above, routine 1000 is used to terminate fence processing and release a member from a fence group. Such a member may be one that no longer needs to access shared data, thereby eliminating any subsequent need to be fenceable and, by so doing, preventing unnecessary fencing from occurring.

Specifically, upon entry into routine 1000, execution first proceeds to block 1003. This block, when executed, stops all I/O and coupling facility accesses for the fence group member that is to be released, i.e. for the particular member specified in an incoming fence member token supplied to this routine. Once all such accesses have been quiesed, execution proceeds to block 1006. This block, when executed, instructs MVS O/S image $205_1$ to release the incoming fence member token. Once this occurs, execution proceeds to block 1009 which, when executed, serializes the processing of all pending release requests that are to execute on MVS O/S image $205_1$. This ensures that, for any number of sub-systems then requesting release of a member from a fence group, only one of these requests is processed at that time. Consequently, only one update is made to a corresponding software fence table, hardware fence table and fencing facility authorization vector at a time thereby preserving the integrity of the data stored therein. After all pending requests have been serialized, execution proceeds to decision block 1012. Decision block 1012 determines, through querying the Function dataset, whether the incoming fence member token is valid. If this token is not valid, execution proceeds, via NO path 1014, to block 1015. This latter block when executed merely unserializes the fence group processing. Thereafter, execution exits from routine 1000.

Alternatively, if the fence member token for the member to be released is valid, then execution proceeds, via YES path 1013 emanating from decision block 1012, to decision block 1018. This latter decision block determines whether the fence group member to be released is the last member in its fence group on the system, e.g. system $200_1$, where routine 1000 is executing. If this member is the last member of its fence group on the system where routine 1000 is executing, i.e. there are no other active members in this group, then execution proceeds, via YES path 1020 emanating from decision block 1018, to block 1023. This latter block, when executed, attempts to release the authorization vector element, for this fence group, held by fencing facility 44. To do so, block 1023: (a) compares the sub-system authority parameter value stored in a hardware fence table entry for this fence group (the group being that which contains this member identified by the fence member token) against a sub-system authority parameter value stored in an authorization vector element pointed to by the authorization index value stored in this hardware fence table entry; and (b) if a match exists, changes the state of the associated authorization vector element in the fencing facility from "ASSIGNED" to "UNASSIGNED". Thereafter, execution proceeds to decision block 1026 which routes execution based upon whether the authorization vector element was successfully released or not. If this release was not successful, then execution proceeds, along NO path 1028 emanating from decision block 1026, to decision block 1030. This latter decision block, queries the fencing facility, to determine whether the state of the authorization vector element being released is "GRANULAR HARDWARE FENCE COMPLETE". If the element is in this state, then decision block 1030 routes execution, via YES path 1031, to block 1036. This latter block, when executed, attempts to release this authorization vector element by: (a) comparing the sub-system authority parameter value stored in a hardware fence table entry for this fence group against a sub-system authority parameter value stored in an authorization vector element pointed to by the authorization index value stored in this hardware fence table entry; and (b) if a match exists, changing the state of the associated authorization vector element from "GRANULAR HARDWARE FENCE COMPLETE" to "UNASSIGNED". If, however, the authorization vector element to be released does not exist in the "GRANULAR HARDWARE FENCE COMPLETE" state, hence a current fencing operation involving this fence group has not yet completed, then decision block 1030 routes execution, via NO path 1032, to block 1039. Block 1039, when executed, merely waits a pre-defined, though arbitrary, time interval, typically one second, for the fencing operation to complete and hence the state of the authorization vector element to be changed to "GRANULAR HARDWARE FENCE COMPLETE". Once this interval has expired, execution proceeds to block 1042 which once again attempts to release this authorization vector element. Block 1042, similar to block 1036: (a) compares the sub-system authority parameter value stored in a hardware fence table entry for this fence group against a sub-system authority parameter value stored in an authorization vector element pointed to by the authorization index value stored in this hardware fence table entry; and (b) if a match exists, changes the state of the associated authorization vector element from "GRANULAR HARDWARE FENCE COMPLETE" to "UNASSIGNED". Once block 1042 completes its execution, execution proceeds to decision block 1045 to determine whether this authorization vector element was successfully released. If the release did not succeed, the decision block 1045 merely routes execution, via NO path 1047, back to block 1039 to wait another interval and then perform, via block 1042, another release attempt, and so on until the release succeeds. Once the authorization vector element is successfully released, execution proceeds, via YES path 1046 emanating from decision block 1045, to block 1052.

Execution also reaches block 1052 from two other paths. First, if the authorization vector element for this fence group was successfully released as a result of the operation of block 1026, then execution proceeds, via both YES path 1027 emanating from decision block 1026 and paths 1033 and 1048, to block 1052. Second, execution also reaches block 1052, via both NO path 1019 emanating from decision block 1018 and paths 1033 and 1048, if the fence group member being released is not the last member in its fence group.

When executed, block 1052 releases the corresponding software fence table entry for the member being released. This is accomplished by changing the state of this entry from either "ASSIGNED" or "SOFTWARE FENCE COMPLETE" to "UNASSIGNED" and invalidating the corresponding fence member token. Once these operations have occurred, execution proceeds to block 1056 which, when executed, updates the Function dataset by changing the state of the entry in this dataset from "ACTIVE" or "FENCED" to "UNASSIGNED", thereby effectively deleting the entry associated with the released fence group member. Thereafter, block 1061 notifies each member of the fence group, regardless of the particular system on which that member executes, through execution of Fence Group Notification Routine 1200, that an existing member, i.e. the current requesting member, has been released from the fence group. This notification includes passing the fence member token of the released member to the fence group on each of these systems. Once this notification has been initiated, execution proceeds to block 1063, when executed, unserializes the fence group processing, thereby freeing any pending release requests that were delayed through the serialization which occurred through execution of block 1009. Execution then exits from routine 1000.

Figure 12:
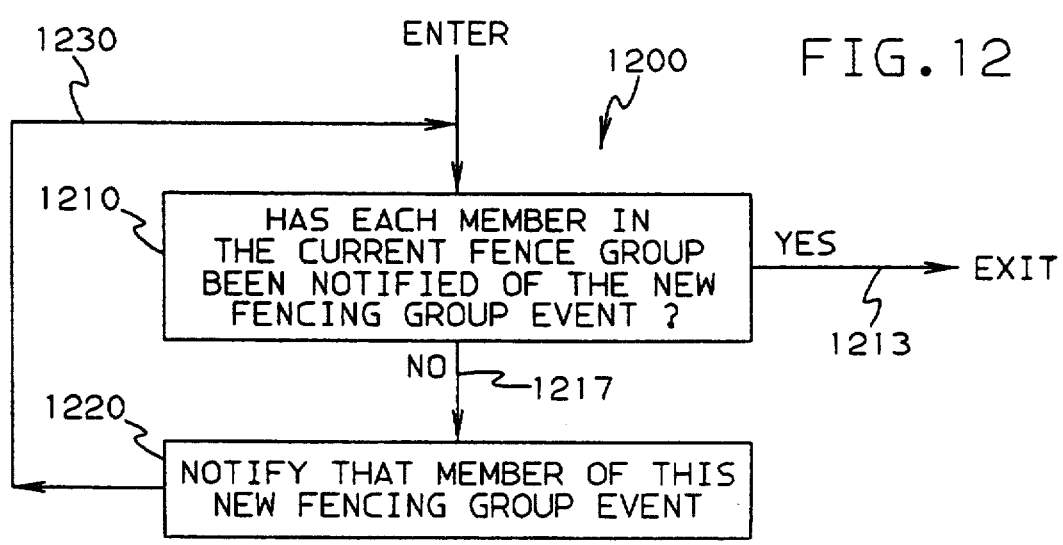
FIG. 12 depicts a high level flowchart of Fence Group Member Notification Routine 1200 that is executed within routines 900, 1000, 1300 and 1500 shown in FIGS. 9A-9C, 10A-10C, 13A-13C and 15A-15E, respectively.

FIG. 12 depicts a high level flowchart of Fence Group Member Notification Routine 1200. As stated above, this routine notifies all fence group members of a current fence group of a new fencing event, such as the addition of a new fence group member or the release of an existing member.

Upon entry into routine 1200, execution first proceeds to decision block 1210. This block determines whether each member in the fence group on the system where routine 1200 is executing, e.g. system $200_1$, has been notified of the new fencing event. If any one member has not been notified, then execution passes, via NO path 1217, to block 1220. This latter block then executes to notify that member of the event, after which execution loops back, via path 1230, to decision block 1210, and so on to notify all other such remaining members. Once all the members in the fence group on the system where routine 1200 is executing have been notified of this event, then execution exits from routine 1200, via YES path 1213 that emanates from decision block 1210.

Figure 13B:
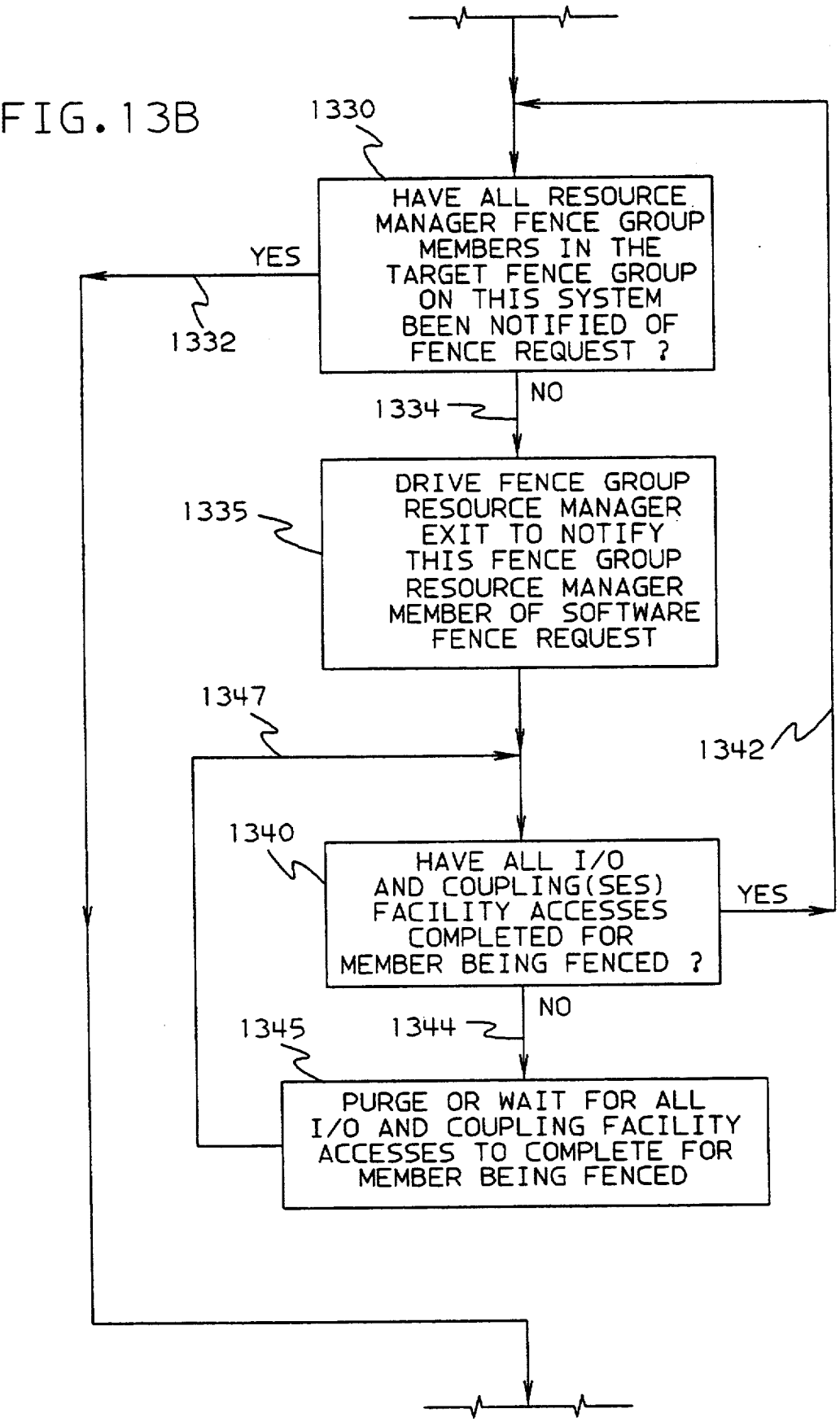
Figure 13C:
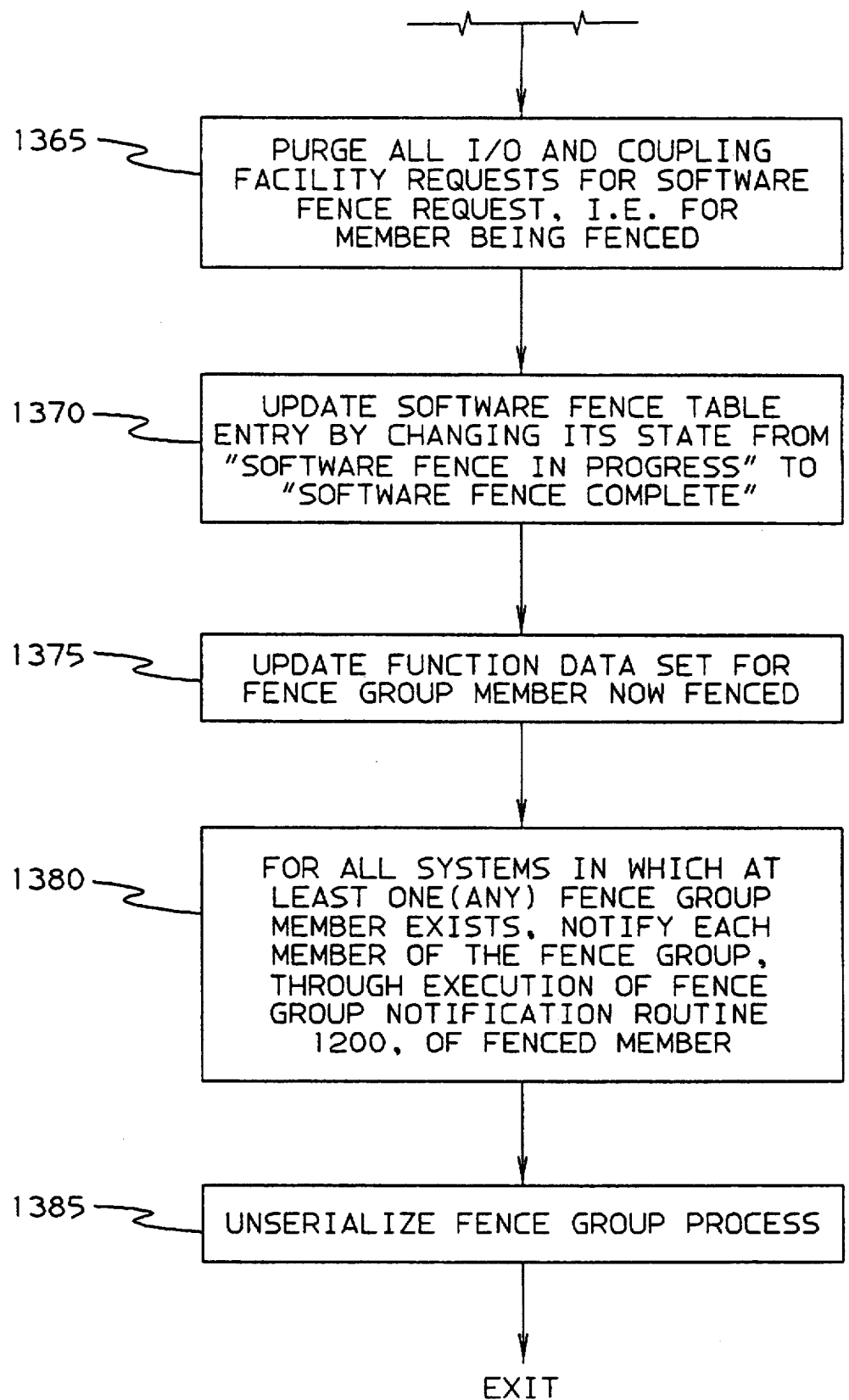

A high level flowchart of Software Fence Request Routine 1300 is collectively depicted in FIGS. 13A–13C; for which the correct alignment of the drawing sheets for these figures is shown in FIG. 13. As stated above, this routine processes a software fence request.

Specifically, upon entry into routine 1300, execution first proceeds to block 1301. This block, when executed, reads the data for the fence group, in which a member is to be fenced, from the Function dataset. Thereafter, execution proceeds to decision block 1302 which determines, from this data, whether the member that is to be fenced executes on the present system, i.e. system $200_1$. If this member resides on a different system, then execution proceeds, via NO path 1303 emanating from decision block 1302, to block 1305. This latter block, when executed, sends a signal to the proper target system on which the fence group member resides to initiate a software fence request against this member. Thereafter, execution exits from routine 1300.

Alternatively, if the fence group member to be fenced resides on the present system, then decision block 1302 routes execution, via YES path 1304, to block 1308. This latter block, when executed, serializes all pending software fence requests that are to execute on MVS O/S image $205_1$. This ensures that for any number of sub-systems then requesting a software fence, only one of these requests is processed at that time. Consequently, only one update is made to a corresponding software fence table, hardware fence table and authorization vector at a time thereby preserving the integrity of the data stored therein. After all pending requests have been serialized, execution proceeds to decision block 1310. This decision block, when executed, determines, through information read from the Function dataset, whether the fence request is valid. This determination is made by checking whether the fence member tokens of the initiating and target members, contained in the software fence request, are valid for the particular initiating member and target member to be fenced. This check entails determining first whether, from information read from the Function dataset, the fence member entries, for these members are active, and then, if they are active, comparing the sequence number in each of the fence member tokens in the software fence request against the corresponding sequence numbers stored in the Function dataset entries for these members. If either entry is not active or either pair of sequence numbers does not match, then the fence member token is not valid, hence the software fence request itself is not valid. In this case, fencing proceeds no further. Consequently, execution is routed, via NO path 1314 emanating from decision block 1310, to block 1320. This latter block, when executed, unserializes all pending software fence requests, thereby freeing any such requests that were delayed through the serialization which occurred through execution of block 1308. Once this occurs, execution exits from routine 1300. Alternatively, if the fence member token in the software fence request is valid and hence the underlying fence request is valid, then decision block 1310 directs execution, via YES path 1312, to decision block 1315. This latter decision block determines whether the corresponding software fence table entry for the member to be fenced is currently in the "ASSIGNED" state. As discussed above in conjunction with FIG. 11, a software fence can only be established against an active fence group member that has not yet been fenced, i.e. as signified by the software fence table entry for that member then being in the "ASSIGNED" state. If the software fence table entry for the member being fenced is not in the "ASSIGNED" state, then fencing can not proceed against this member. In this case, decision block 1315 routes execution, via NO path 1318, to block 1320 to unserialize fence processing and thereafter provide an exit point from routine 1300.

Alternatively, if the software fence table entry is in the "ASSIGNED" state, thereby indicating that a software fence can be imposed against the desired member, decision block 1315 routes execution, via YES path 1316, to block 1325. This latter block, when executed, updates the software fence table to change the status of this entry from "ASSIGNED" to "SOFTWARE FENCE IN PROGRESS". Thereafter, execution proceeds to decision block 1330.

Blocks 1330–1345 notify all the resource managers situated within this fence group on the system where the target fence group member executes of the member to be fenced. The fence group resource manager then either purges or waits for all I/O and coupling facility accesses to complete on behalf of this particular member. For the sake of simplicity, these resource managers are shown as executing in a sequential and synchronized fashion, i.e. one resource manager does not start its operations until the operations of a prior resource manager have completed, and so forth. However, in practice, the resource managers execute, with respect to each other, in a parallel and asynchronous fashion. The exit routine of each resource manager is given control through an asynchronous work unit scheduled such that the storage areas that manager had when it joined the fence group are addressable.

With the above simplification in mind, block 1330 determines whether each and every resource manager in the fence group on this system, e.g. system $200_1$, has been notified of the current software fence request. If any such resource manager has not been notified, then execution proceeds, via NO path 1334 emanating from decision block 1330, to block 1335. This latter block, when executed, drives an exit of one of these fence group resource managers, that has yet to be notified, of the current software fence request, thereby notifying this resource manager and requesting a response therefrom. Thereafter, execution proceeds to decision block 1340. In this decision block, the resource manager determines whether all I/O and coupling facility accesses have completed for the desired fence group member that is now being fenced. If these accesses have not yet completed, decision block 1340 routes execution, via NO path 1344, to block 1345. This latter block, when executed, either purges all I/O and coupling facility accesses on behalf of the desired member, i.e. those originated with the IOPID of the resource manager, or waits for these accesses to complete. Once these accesses have either been purged or have completed, execution loops back, via path 1347, to decision block 1340 to effectively determine if any such pending or in-progress I/O or coupling facility accesses now remain on behalf of the desired member. If no such accesses remain, i.e. all these accesses have either been purged or have completed, then execution loops back to decision block 1330, via YES path 1342 that emanates from decision block 1340.

Once all the resource managers have been notified of the current software fence request and have appropriately responded, execution proceeds, via YES path 1332 emanating from decision block 1330, to block 1365. At this point, no pending or in-process I/O or coupling facility accesses exist for the desired fence group member from resource managers. These accesses, as discussed above, have either been purged or allowed to complete by their respective resource managers. Block 1365, when executed, purges all I/O and coupling facility accesses that have an IOPID of the desired fence group member now being fenced. Once these requests have been purged, the software fence is completely established against the desired member. Execution then proceeds to block 1370. This particular block, when executed, updates the software fence table entry for the desired, now fenced, member to change its status from "SOFTWARE FENCE IN PROGRESS" to "SOFTWARE FENCE COMPLETE". Thereafter, execution proceeds to block 1375 to update the Function dataset entry for this member to indicate that this member is now fenced, specifically by changing the state field of the entry in the Function dataset, as described above in conjunction with FIG. 6, from "ACTIVE" to "FENCED".

Once the Function dataset is appropriately updated, execution proceeds to block 1380. This block notifies each member of the fence group, regardless of the particular system on which that member executes, through execution of Fence Group Notification Routine 1200, that the desired member has now been fenced. This notification includes passing the fence member token of this member to the fence group members on each of these systems. Once this notification has completed, execution proceeds to block 1385, when executed, unserializes the fence group processing, thereby freeing any pending software fence requests that were delayed through the serialization which occurred through execution of block 1308. Execution then exits from routine 1300.

Figure 15A:
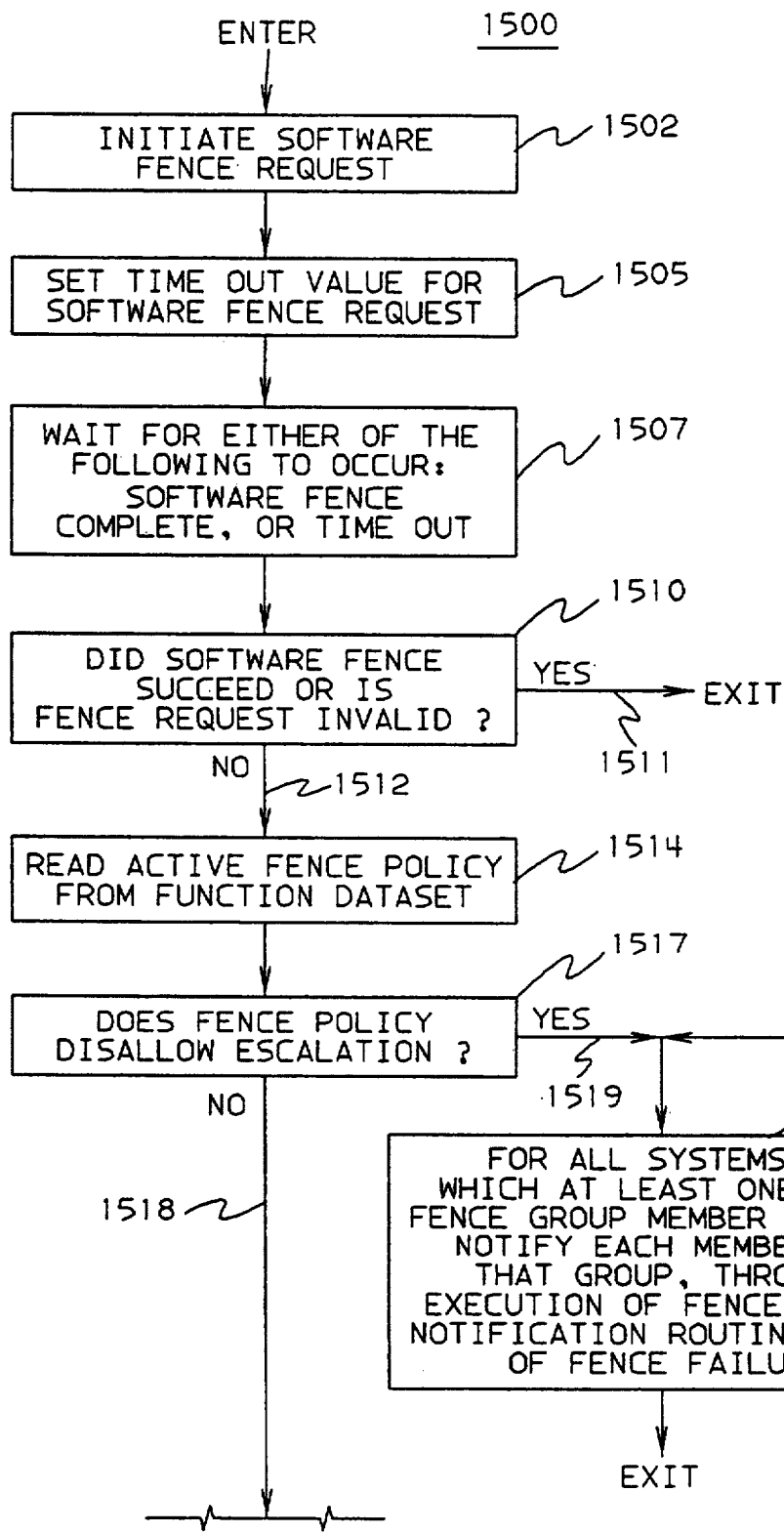
Figure 15:
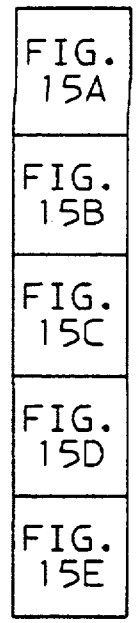
FIG. 15 depicts the correct alignment of the drawing sheets for FIGS. 13A-13C.
Figure 15B:
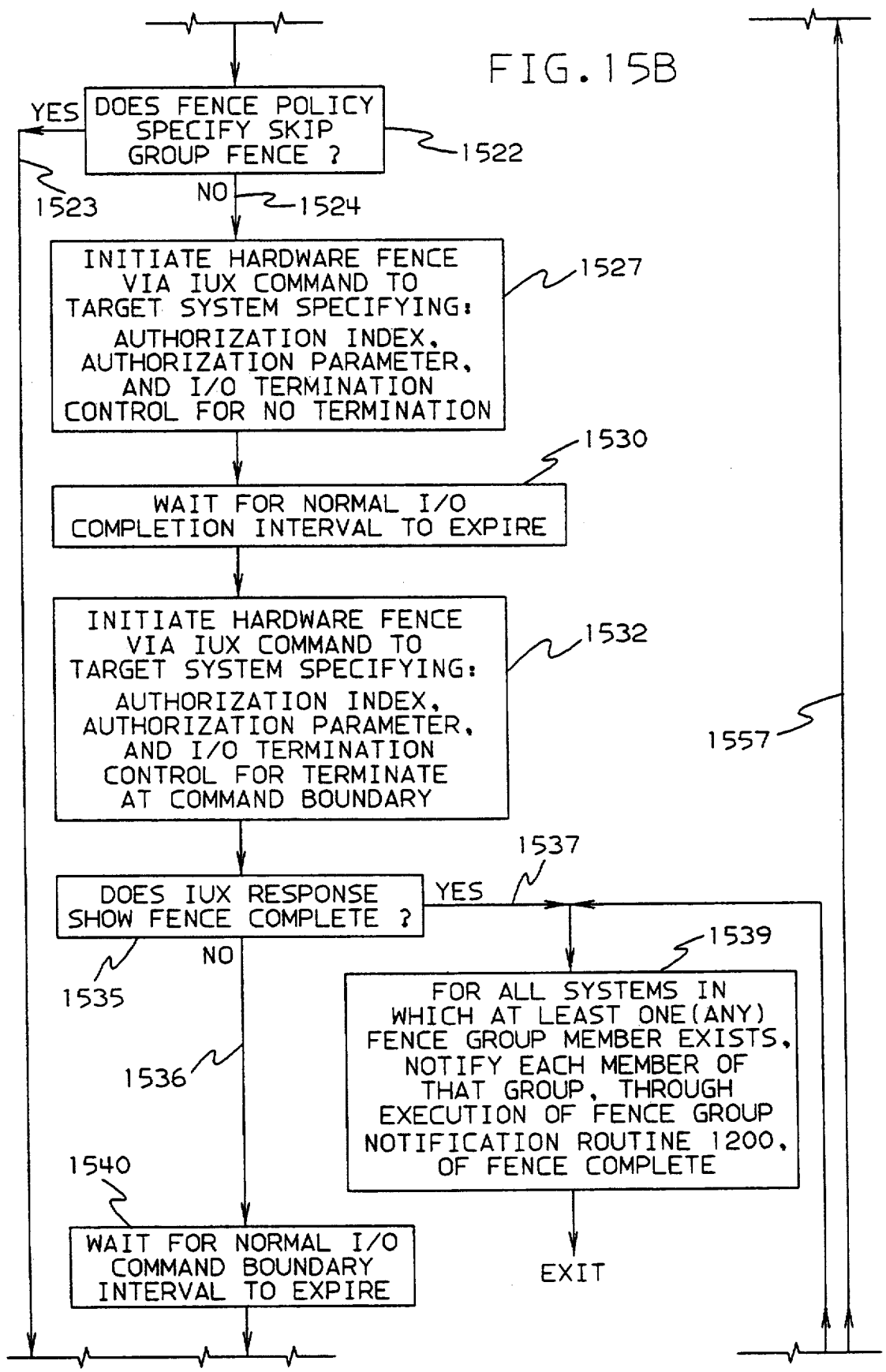
Figure 15C:
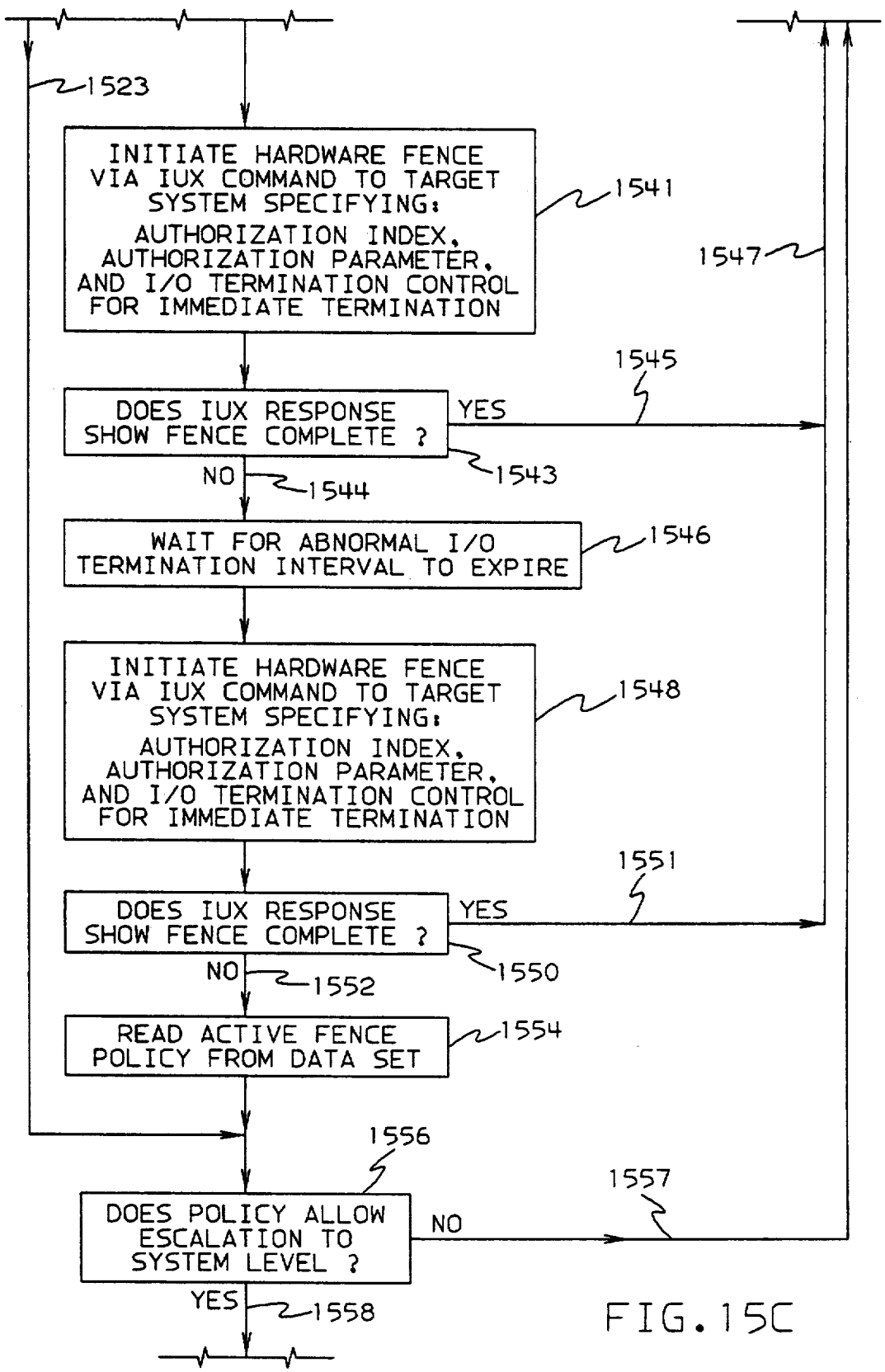
Figure 15E:
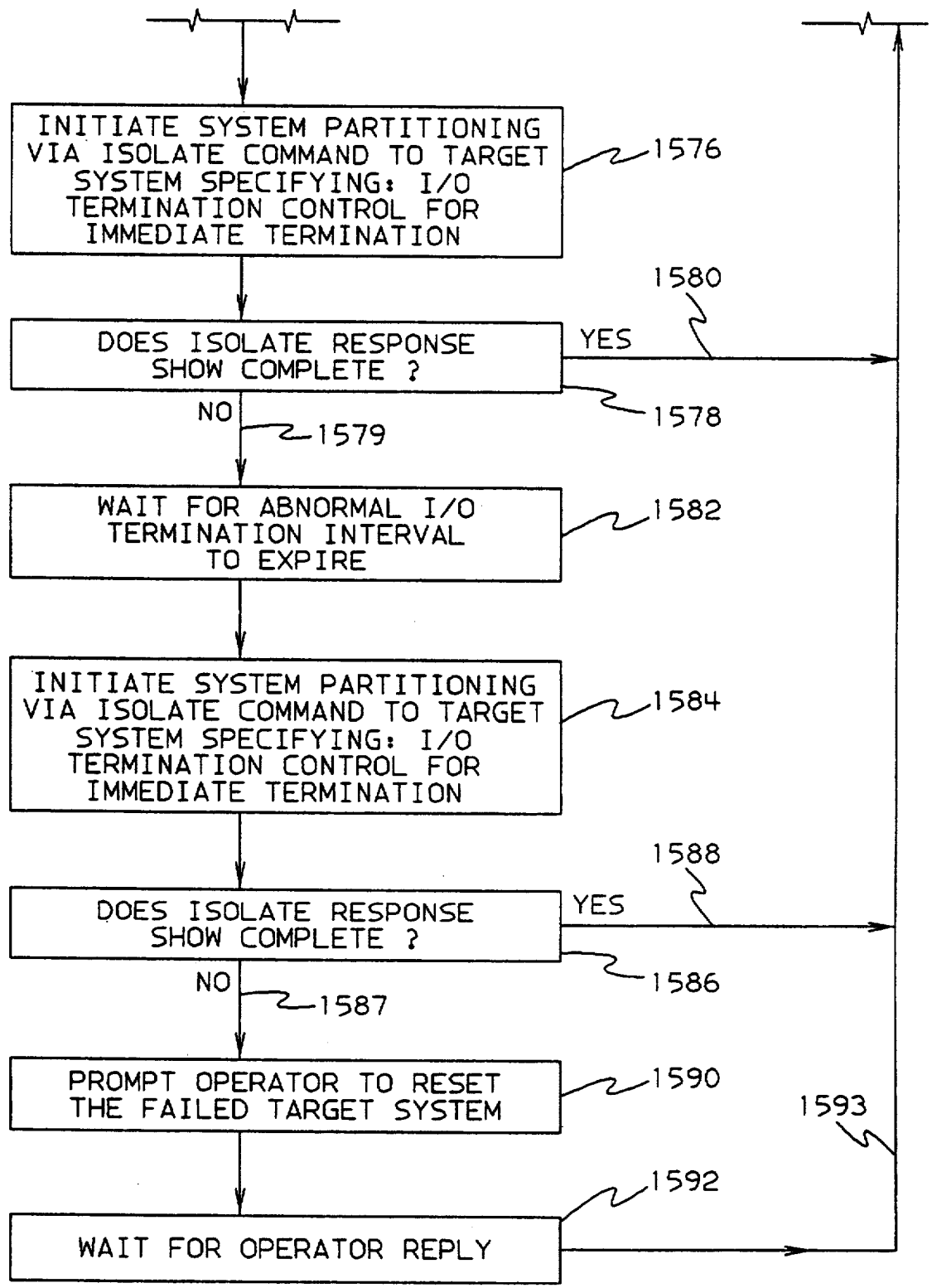

Lastly, a high level flowchart of Remote Fence Request Servicing Routine 1500 is collectively depicted in FIGS. 15A-15E; for which the correct alignment of the drawing sheets for these figures is shown in FIG. 15. As stated above, routine 1500 processes an incoming fence request from a fence group member. For purposes of simplifying the following description and facilitating understanding, consider the fence request as originating at system $200_2$ with O/S image $205_2$, as shown in FIG. 2, and targeted to a fence group member on system $200_1$ executing under O/S image $205_1$.

Specifically, upon entry into routine 1500, as shown in FIGS. 15A-15E, execution first proceeds to block 1502. This block, when executed, initiates a software fence request, i.e. a software fence request is issued against a specified sub-system specified in the incoming software fence request. Thereafter, block 1505 executes to appropriately set the time-out interval for use in processing the software fence request. This interval is used, inter alia, within block 1305, as discussed above, in Software Fence Request routine 1300 shown in FIGS. 13A-13C. Once this interval is set, execution proceeds, as shown in FIGS. 15A-15E, to block 1507. This block, when executed, waits for either of two events to occur: a software fence complete message, (generated by the MVS O/S image in response to successful imposition of a software fence by routine 1300) or the expiration of the time-out interval, having a duration which was set as described above. Once either of these events occurs, execution proceeds to decision block 1510. This decision block, determines based upon these events, whether the software fence was successful. If this fence was successfully imposed or the underlying request therefor was determined to be invalid, then execution merely exits from routine 1500, via YES path 1511 emanating from decision block 1510.

Alternatively, if the software fence request was valid but did not succeed, either because the time-out interval expired or the software fence was not successfully imposed, then decision block 1510 routes execution, via NO path 1512, to block 1514. This latter block, when executed, reads the active fence policy data from the Function dataset, and specifically the fencing escalation data for the fence group member against which a software fence was to be imposed. Once this data is read, then execution proceeds to decision block 1517. This decision block determines, based upon this data and specifically the fencing escalation policy data therein, whether fencing escalation is not permitted (disallowed) for this particular fence group member. If all such escalation is disallowed, then decision block 1517 routes execution, via YES path 1519, to block 1520. This latter block, when executed, notifies each member of the fence group, regardless of the particular system on which that member executes, through execution of Fence Group Notification Routine 1200, that an attempt to impose the fence has failed. This notification includes passing the fence member token of this member to the fence members on each of these systems. Once this notification has completed, execution merely exits from routine 1500.

If, on the other hand, escalation is permitted (to either higher level, i.e. fence group or system level), then execution proceeds, via NO path 1518 which emanates from decision block 1517, to decision block 1522. This latter decision block determines, based upon the fencing escalation policy data read from the Function dataset, whether fence group level fencing (i.e. fencing of fence group members that execute on system $200_1$) is to be skipped in favor of fencing at the system level. If fence group level fencing is permitted, then decision block 1522 directs execution, via NO path 1524, to block 1527.

Blocks 1527-1550 attempt to impose fence group level fencing. In particular, block 1527, when executed, initiates a granular hardware fence by issuing an IUX command, as described above, to the fencing facility and which specifies the appropriate authorization index (AX) and sub-system authority parameter values for the fence group members that execute on the target system, i.e. system $200_1$. As discussed above, the authorization index and the sub-system authority parameter are constant across all of these members. In addition, the I/O termination control in this command is set for "NO" termination. With the termination control set for "NO", all in-process I/O and coupling facility accesses for these fence group members are permitted to complete, though no new accesses are permitted. Once the IUX command is issued, execution then proceeds to block 1530 which waits a pre-defined amount of time required for an I/O or coupling facility access to normally complete. Once this time expires, execution proceeds to block 1532. This block initiates a granular hardware fence, by again issuing an IUX command to the fencing facility, with the same authorization index and sub-system authority parameters, but this time with the I/O Termination control set for command boundary termination. To understand this type of termination, one must realize that I/O operations are undertaken through well-known channel programs formed of channel control words (CCWs). One such program usually initiates several I/O transfers, in sequence, over a single I/O channel. Termination on a command boundary specifies that a currently executing CCW in a channel program, and its underlying I/O transfer, is allowed to complete; however the next CCW in sequence is not permitted to execute in that channel program. With respect to coupling facility accesses, each access is separately, i.e. atomistically, specified. Channel programs or the like are not used in connection with a coupling facility. Hence, the present coupling facility access will be allowed to complete; however a subsequent access issued by system $200_1$ for any of these fence group members will not be permitted, by the hardware fencing facility, to reach the coupling facility. Once this IUX command has been issued, execution proceeds to decision block 1535 to check the corresponding response from the fencing facility. In particular, if decision block 1535 indicates that the granular hardware fence was completely established, then this decision block routes execution, via YES path 1537, to block 1539. This latter block, when executed, notifies each member of the fence group, regardless of the particular system on which that member executes, through execution of Fence Group Notification Routine 1200, that a granular hardware fence was successfully imposed against each member of the fence group executing on system $200_1$. This notification includes passing the fence member token of this member to the fence members on each of these systems. Once this notification has completed, execution merely exits from routine 1500.

If, however, the granular hardware fence was not completely established, then decision block 1535 routes execution, via NO path 1536, to block 1540. This latter block, when executed, waits a pre-defined amount of time, typically on the order of about 30 msec, normally required for I/O operations to complete. Once this time expires, execution proceeds to block 1541. This latter block again initiates a granular hardware fence, by issuing an IUX command to the fencing facility, with the same authorization index and sub-system authority parameters, but this time with the I/O Termination control set for immediate termination. This type of termination immediately halts all in-process I/O and coupling facility accesses. Once this command is issued to the fencing facility, execution proceeds to decision block 1543 which determines, based upon a response from the fencing facility, whether a granular hardware fence was completely established. If this response indicates that the hardware fence was completely established, then decision block 1543 routes execution, via YES path 1545 and path 1547, to block 1539.

Alternatively, if the response from the fencing facility indicates that a granular hardware fence was not completely established as a result of the IUX command issued through block 1541, then decision block 1543 routes execution, via NO path 1544, to block 1546. This latter block, when executed, waits a relatively long pre-defined interval, here on the order of about 1 sec, required for abnormal I/O termination to complete. Once this interval has expired, execution proceeds to block 1548. This block again initiates a granular hardware fence, by issuing an IUX command to the fencing facility, with the same authorization index and sub-system authority parameters, and with the I/O Termination control set for immediate termination. Once this command is issued to the fencing facility, execution proceeds to decision block 1550 which determines, based upon a response from the fencing facility, whether a granular hardware fence was now completely established. If this response indicates that the hardware fence was now completely established, then decision block 1550 directs execution, via YES path 1551 and path 1547, to block 1539. However, if the granular hardware fence was not completely established, then execution proceeds, via NO path 1552 emanating from decision block 1550, to block 1554. This latter block again reads the active fence policy from the Function dataset and particularly the fencing escalation data for the fence group member specified in the incoming fence request. Once this data has been read, execution proceeds to decision block 1556. Execution also reaches decision block 1556 if the fencing escalation policy data specified that fence group level fencing is to be skipped in favor of system level fencing. In this case, execution proceeds directly to this decision block, via YES path 1523 that emanates from decision block 1522.

Decision block 1556 determines, based upon the fencing escalation policy data just read from the Function dataset, whether system level fencing (i.e. fencing of entire system $200_1$) is permitted. If escalation to system level fencing is not permitted, then decision block 1556 routes execution, via NO path 1557, to block 1520. However, if system level fence escalation is permitted, then decision block 1556 routes execution, via YES path 1558, to block 1560.

Blocks 1560–1586 attempt to impose a system level fence. In particular, block 1560, when executed, signals each of the other systems on which a member of the fence group resides that partitioning is being initiated against system $200_1$. Once each of these other systems and fence group members has been notified, execution proceeds to block 1562. This block, when executed, initiates partitioning against system $200_1$ by issuing an ICS command, to the fencing facility, against this system and with the I/O Termination Control set for no termination. Thereafter, block 1564, when executed, waits a pre-defined amount of time required for an I/O or coupling facility access to normally complete. Once this time expires, execution proceeds to block 1566. This block again initiates partitioning against system $200_1$ by issuing an ICS command, to the fencing facility, against this system but now with the I/O Termination Control set for command boundary termination. Thereafter, execution proceeds to decision block 1568 which determines, based upon a response from the fencing facility, whether a system level hardware fence was completely established. If this response indicates that the hardware fence was completely established, then decision block 1568 directs execution, via YES path 1570, to block 1572. This latter block, when executed, initiates a conventional "clean-up" process for de-allocating sysplex resources held by system $200_1$, such as, e.g. releasing reserves held by the system and notifying all group members in the fence group that the system has been partitioned out of the sysplex. The ICS command itself initiates a reset of the partitioned system; therefore, no such reset needs to be initiated as part of this "clean-up" process.

If, however, the response from the fencing facility to the isolate (specifically ICS) command indicates that the system level hardware fence was not completely established, then decision block 1568 directs execution, via NO path 1569, to block 1574. This latter block, when executed, waits a pre-defined, again on the order of about 30 msec, amount of time normally required for command boundary I/O termination to complete. Once this particular interval of time has elapsed, execution then proceeds to block 1576. This particular block again initiates system partitioning against system $200_1$ by issuing an ICS command, to the fencing facility, against this system but now with the I/O Termination Control set for immediate I/O termination. Thereafter, execution proceeds to decision block 1578 which, based upon a response from the fencing facility, determines whether a system level fence was completely established against system $200_1$. If this fence was successfully established, then decision block 1578 routes execution, via YES path 1580 and path 1595, to block 1572.

Alternatively, if the hardware fence was not completely established as a result of the ICS command issued through block 1576, then decision block 1578 routes execution, via NO path 1579, to block 1582. This latter block, when executed, waits a relatively long pre-defined interval, here again on the order of about 1 sec, required for abnormal I/O termination to complete. Once this interval has expired, execution proceeds to block 1584. Block 1584, when executed, again initiates system partitioning against system $200_1$ by issuing an ICS command, to the fencing facility, against this system and again with the I/O Termination Control set for immediate I/O termination. Thereafter, execution proceeds to decision block 1586 which, based upon a response from the fencing facility, determines whether a system level fence was completely established against system $200_1$. If this fence was now successfully established, then decision block 1586 routes execution, via YES path 1588 and path 1595, to block 1572. If, however, the system level fence was not successfully completed against system $200_1$, then execution proceeds, via NO path 1587 emanating from decision block 1586, to block 1590. This latter block, when executed, prompts the system operator to manually reset the failed system, i.e. system $200_1$. Once this prompt is issued, execution proceeds to block 1592 which, when executed, merely waits for a reply from the operator indicating that in fact this system has been reset. Once this response is provided, execution proceeds, via paths 1593 and 1595, to block 1572 to initiate a "clean-up" process for this system.

While we have described and shown our inventive technique in terms of three-level hierarchical fencing with the highest level being system fencing, our technique could well be extended to implement even higher levels of fencing, specifically CPC fencing, i.e. isolation, when warranted (by both an underlying failure condition and escalation policy), of an entire CPC as well as fencing of an entire sysplex and even higher. However, fencing at these levels is generally not needed. In particular, through the ability of our invention to quickly isolate each system on a CPC and the infrequent failure of multiple systems on the same CPC, fence processing for each system generally suffices, as the highest level of fencing, and thus renders CPC level fencing unnecessary. As to sysplex and higher level fencing, as one can now appreciate, fencing is useful among separate instances of an application(s) that all share common data.

If data were to be shared among such instances that execute on different sysplexes, then appreciable differences in inter-processor propagation time, caused by physical distances (if greater than just a few kilometers at most) between the sysplexes, might produce unacceptable I/O and/or coupling facility access delays, thereby slowing overall performance. Fencing would be subject to these same delays. Therefore, to minimize these delays and thus ensure an appropriately high level of performance, we do not envision data sharing as occurring beyond a single sysplex. Accordingly, in practice, application instances will probably exist no higher than at the system level within a single sysplex, thereby necessitating only system level fence support as the highest fencing level.

Furthermore, while we anticipate that most fence groups will be formed of sub-systems that collectively and exclusively access shared data—the context in which fence groups have been described above, a fence group does not need to be so limited. In fact, a fence group can be established to encompass a set of processes that exclusively utilizes any sysplex resource(s). What is essential is exclusivity and divisibility; namely, if a portion of the workload represented by the fence group is isolated on each associated system on which a fence group member resides, all these systems must still be able to process the remainder of their workloads. This, in turn, allows these systems, and hence the entire sysplex, to still meet availability requirements in view of a process, e.g. sub-system, failure. Hence, if established properly, the user processes that constitute one fence group will not affect or interact with those that constitute any other fence group, thereby permitting one such group to be fully isolated while the other(s) continue being processed.

With this in mind, one can easily envision scenarios, such as in, e.g., computer integrated manufacturing, where a common computer system, such as even a sysplex, is used to process a workload in which interrelated tasks are grouped together into separate fence groups. Consider, for example, a sysplex being used to control a manufacturing environment having several disparate automated assembly lines that are not interdependent. One fence group can be illustratively defined to encompass the user processes that are interfaced to various sensors and actuators that provide real-time control of production stations located along the first assembly line (or a self-contained divisible portion thereof). The next fence group can be illustratively defined for the user processes for production stations along the second assembly line, and so forth. Clearly, if one of these fence groups is isolated due to a failure of one of the user processes therein, processing will continue for the control tasks undertaken by the other fence groups. Of course, the users processes that will constitute a fence group are highly installation dependent and may even vary over time within a single installation based upon changing user requirements.

Although a preferred embodiment, which incorporates the teachings of the present invention, has been shown and described in detail herein, those skilled in the art can readily devise many other varied embodiments that still incorporate our inventive teachings.

We claim:

1. In a computer having a resource shared by a plurality of processes, said processes executing on a plurality of different systems, a method for-isolating a failed component in said computer from said resource comprising the steps of:

in a first one of said plurality of different systems that executes a process in a fence group, wherein the fence group is defined as all processes, in said plurality of processes, that collectively and exclusively utilize said resource wherein each of said processes in the fence group executes on a corresponding one of said systems and is a different member of the group, the steps of:

issuing, whenever any one member in the group fails to properly execute on a second one of said systems, a fence request against the failed one member;

in said second one of the systems:

attempting, in response to said fence request, to impose a fence around said failed one member to completely isolate, through software, said member from utilizing the resource; and if, as a result of said attempting step, the fence could not be imposed against the failed one member, escalating said fence, as specified in accordance with pre-defined escalation rules, to completely isolate either all members of said fence group which execute on said second system or said second system in its entirety from utilizing said resource.

2. The method in claim 1 further comprising the step, in collectively all of said systems that execute members of said fence group, of: organizing all of said processes that collectively and exclusively utilize said resource into the fence group.

3. The method in claim 2 wherein said resource is pre-defined data.

4. The method in claim 3 wherein the first and second ones of the system are the same or different ones of said systems.

5. The method in claim 4 wherein said computer further comprises an input/output (I/O) system for storing information and a hardware fencing facility, said I/O system being responsive, through said fencing facility, to commands issued by each of said systems to access said information, said escalation step comprising the steps of:

consulting pre-defined escalation rules to determine whether said fence can be imposed at a fence group level for said failed one member, and generating, if said consulting step reveals for the failed one member that a fence can be imposed at the fence group level, a single granular hardware fence request to said fencing facility to prevent any of said commands issued by the members of the fence group situated on the second system from reaching said I/O system.

6. The method in claim 5 wherein said I/O system has a function dataset commonly accessible to all of said systems and wherein said function dataset stores said escalation rules, said consulting step comprising the step of:

obtaining the escalation rules for said failed one member from the function dataset.

7. The method in claim 6 wherein said organizing step, for a given process executing on a third one of said systems, comprises the steps of:

if a desired fence group does not exist to encompass the given process, creating said desired fence group, through the third one of said systems, to encompass said given process as a member thereof, wherein said creating step comprises the steps of:

establishing a parameter value for said desired fence group, wherein the parameter value is unique over a lifetime of said computer; and forming, using said parameter value, a unique association, within the third one of said systems, said function dataset and said fencing facility, that identifies all the members of said desired fence group to each of said systems; or if said desired fence group does exist, adding said given process as a member to said desired fence group, said adding step comprising the step of:

extending the association for the desired fence group, through the parameter value therefor, to encompass the given process as a member of the desired fence group.

8. The method in claim 7 wherein the fence group comprises a resource manager, as a member thereof, wherein said resource manager has its own fence member token and wherein the method comprises the step, in said resource manager, of performing I/O accesses or accesses through an external structured external storage device using said fence member token.

9. The method in claim 8 further comprising the step of in the resource manager, in the event said fence is imposed, preventing or quiescing all I/O and structured external storage device accesses on behalf of the fence group member being fenced.

10. The method in claim 7 wherein said third system further includes a software fence table and a hardware fence table, and said hardware fencing facility has an authorization vector, said software and hardware fence tables having corresponding pluralities of software and hardware fence table entries and said vector having a plurality of elements, wherein said organizing step further comprises the steps of:

assigning an available one of said software fence table entries to said given process; said software fence table storing a different corresponding entry for each different member of every fence group executing on the third system;

if said given process member is a first member executing on said third system in the desired fence group:

assigning an available one of the hardware fence table entries to the desired fence group; said hardware fence table storing a different corresponding entry for each different fence group that has a member which executes on the third system;

assigning an available one of the authorization vector elements to the desired fence group; said authorization vector having a different corresponding element for each different fence group that has members which access the data through the fencing facility;

setting the available one software fence table entry to point to the available one hardware fence table entry; and storing, into corresponding fields within the available one hardware fence table entry, both the parameter value for the desired fence group and an index value, said index value pointing to the available one authorization vector element; and storing the parameter value for the desired fence group within the available one authorization vector element; or if said given process is not the first member executing on said third system in the desired fence group:
  setting the available one software fence table entry to point to a corresponding hardware fence table entry previously assigned to the desired fence group.

11. The method in claim 10 wherein the function dataset also has a plurality of entries for fence group members, the association forming step further comprising the step of:
  assigning an available one of the entries in the function dataset to the given process; and
  setting said available one entry in the function dataset to specify said given process as a member of the fence group and provide the corresponding parameter value therefor; and
  said organizing step further comprises the step of:
    storing, if desired, escalation rules for said given process within the function dataset.

12. The method in claim 11 wherein said escalation rules for said given process specify whether escalation is permitted from a member level fence to a fence group level fence and from a fence group level fence to a system level fence, and whether the fence group level fence is to be skipped in favor of the system level fence.

13. The method in claim 10 wherein said attempting step comprises the steps of:
  determining, in response to the fence request, whether a corresponding entry in the software fence table in said second one system is assigned to the failed one member and does not indicate that a fence has been imposed against said failed one member; and
  if said corresponding entry is so assigned and does not indicate that the fence has been so imposed:
    notifying an operating system component within said second one system to prevent any subsequent I/O requests from being communicated external to said operating system on behalf of said failed one member and to purge or complete all I/O requests on behalf of the failed one member that are then in progress or pending;
    changing said corresponding entry in the software fence table for said second one system and a corresponding entry in the function dataset for the failed one member to both indicate that a fence has been imposed against said failed one member; and
    notifying all remaining members of the fence group containing said failed one member that the fence has been imposed against said failed one member.

14. The method in claim 10 wherein said issuing step comprises the step of incorporating first and second fence member tokens into said fence request, said first fence member token identifying a member of the fence group, executing on said first system, which issues the fence request and said second fence member token identifying the failed one member of the fence group against which the fence is to be imposed.

15. The method in claim 10 further comprising, for each member of a fence group requesting access into said data, the steps of:
  in a corresponding one of the systems within which said each member executes:
    providing an I/O prevention identifier (IOPID) in conjunction with an I/O request in order to determine whether said access into the data can proceed; said IOPID containing a pointer to a corresponding entry in a software fence table, situated in said corresponding one system, for said each member;
    accessing an entry, in the software fence table situated within said corresponding one system, for the member identified by the IOPID; and
    ascertaining from the accessed entry whether the member has been fenced or not and, in response thereto, further processing or failing the I/O request, respectively.

16. In a computer having a resource shared by a plurality of processes, said processes executing on a plurality of different systems, apparatus for isolating a failed component in said computer from said resource comprising:
  in a first one of said plurality of different systems that executes a process in a fence group, wherein the fence group is defined as all processes, in said plurality of processes, that collectively and exclusively utilize said resource wherein each of said processes in the fence group executes on a corresponding one of said systems and is a different member of the group:
    means for issuing, whenever any one member in the group fails to properly execute on a second one of said systems, a fence request against tho failed one member:
  in said second one of the systems:
    means for attempting, in response to said fence request to impose a fence around said failed one member to completely isolate, through software, said member from utilizing the resource; and
    means for escalating the fence, as specified in accordance with pre-defined escalation rules, and if said attempting means could not impose the fence against the failed one member, to completely isolate either all members of said fence group which execute on said second system or said second system in its entirety from utilizing said resource.

17. The apparatus in claim 16 further comprising means for organizing all of said processes that collectively and exclusively utilize said resource into the fence group.

18. The apparatus in claim 17 wherein said resource is pre-defined data.

19. The apparatus in claim 18 wherein the first and second ones of the system are the same or different ones of said systems.

20. The apparatus in claim 19 wherein said computer further comprises:
  a hardware fencing facility; and
  an input/output (I/O) system for storing information, said I/O system being responsive through said fencing facility, to commands issued by each of said systems to access said information; and
  wherein said escalation means comprises:
    means for consulting pre-defined escalation rules to determine whether said fence can be imposed at a fence group level for said failed one member, and
    means for generating, if said consulting means reveals for the failed one member that a fence can be imposed at the fence group level, a single granular hardware fence request to said fencing facility to prevent any of said commands issued by the members of the fence group situated on the second system from reaching said I/O system.

21. The apparatus in claim 20 wherein said I/O system comprises a function dataset commonly accessible to all of said systems and wherein said function dataset stores said escalation rules, and wherein said consulting means comprises means for obtaining the escalation rules for said failed one member from the function dataset.

22. The apparatus in claim 21 wherein said organizing means comprises:
   means for creating a desired fence group to encompass a given process as a member thereof and executing on a third one of said systems if said desired fence group does not exist wherein said creating means comprises, on said third system:
      means for establishing a parameter value for said desired fence group, wherein the parameter value is unique over a lifetime of said computer; and
      means for forming, using said parameter value, a unique association, within the third one of said systems, said function dataset and said fencing facility, that identifies all the members of said desired fence group to each of said systems; and
   means for adding said given process as a member to said desired fence group, if said desired fence group already exists, by extending the association for the desired fence group, through the parameter value therefor, to encompass the given process as a member of the desired fence group.

23. The apparatus in claim 22 wherein the fence group comprises a resource manager, as a member thereof, wherein said resource manager has its own fence member token and performs I/O accesses or accesses through an external structured external storage device using said fence member token.

24. The apparatus in claim 23 wherein the resource manager, in the event said fence is imposed, prevents or quiesces all I/O and structured external storage device accesses on behalf of the fence group member being fenced.

25. The apparatus in claim 22 wherein said third system further comprises:
   a software fence table;
   a hardware fence table; and
   wherein said hardware fencing facility has an authorization vector, said software and hardware fence tables having corresponding pluralities of software and hardware fence table entries and said vector having a plurality of elements; and
   wherein said organizing means further comprises:
      means for assigning an available one of said software fence table entries to said given process; said software fence table storing a different corresponding entry for each different member of every fence group executing on the third system;
      means, if said given process member is a first member executing on said third system in the desired fence group, for:
         assigning an available one of the hardware fence table entries to the desired fence group; said hardware fence table storing a different corresponding entry for each different fence group that has a member which executes on the third system;
         assigning an available one of the authorization vector elements to the desired fence group; said authorization vector having a different corresponding element for each different fence group that has members which access the data through the fencing facility;
         setting the available one software fence table entry to point to the available one hardware fence table entry;
         storing, into corresponding fields within the available one hardware fence table entry, both the parameter value for the desired fence group and an index value, said index value pointing to the available one authorization vector element; and
         storing the parameter value for the desired fence group within the available one authorization vector element; and
      means, if said given process is not the first member executing on said third system in the desired fence group, for setting the available one software fence table entry to point to a corresponding hardware fence table entry previously assigned to the desired fence group.

26. The apparatus in claim 25 wherein the function dataset also has a plurality of entries for fence group members, the association forming means further comprising:
   means for assigning an available one of the entries in the function dataset to the given process; and
   means for setting said available one entry in the function dataset to specify said given process as a member of the fence group and provide the corresponding parameter value therefor; and
   said organizing means further comprises:
      means for storing escalation rules for said given process within the function dataset.

27. The apparatus in claim 26 wherein said escalation rules for said given process specify whether escalation is permitted from a member level fence to a fence group level fence and from a fence group level fence to a system level fence, and whether the fence group level fence is to be skipped in favor of the system level fence.

28. The apparatus in claim 25 wherein said attempting means comprises:
   means for determining, in response to the fence request, whether a corresponding entry in the software fence table in said second one system is assigned to the failed one member and does not indicate that a fence has been imposed against said failed one member; and
   means, if said corresponding entry is so assigned and does not indicate that the fence has been so imposed, for:
      notifying an operating system component within said second one system to prevent any subsequent I/O requests from being communicated external to said operating system on behalf of said failed one member and to purge or complete all I/O requests on behalf of the failed one member that are then in progress or pending;
      changing said corresponding entry in the software fence table for said second one system and a corresponding entry in the function dataset for the failed one member to both indicate that a fence has been imposed against said failed one member; and
      notifying all remaining members of the fence group containing said failed one member that the fence has been imposed against said failed one member.

* * * * *